(12) United States Patent
Fujiyoshi et al.

(10) Patent No.: US 7,427,307 B2
(45) Date of Patent: Sep. 23, 2008

(54) ELECTRIC VACUUM CLEANER

(75) Inventors: Toshiyuki Fujiyoshi, Himeji (JP);
Hiromichi Matsuhashi, Hyogo (JP);
Hideya Tsuchida, Kakogawa (JP); Kei Takai, Kasai (JP); Shozo Ushio, Kasai (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 548 days.

(21) Appl. No.: 11/121,983

(22) Filed: May 5, 2005

(65) Prior Publication Data

US 2005/0247036 A1    Nov. 10, 2005

(30) Foreign Application Priority Data

May 6, 2004    (JP) ............................. 2004-137057

(51) Int. Cl.
*B01D 50/00*    (2006.01)
(52) U.S. Cl. ............................. 55/429; 55/471; 55/482; 55/486; 55/DIG. 3
(58) Field of Classification Search .................. 55/429, 55/467, 471, 482, 486, 503, DIG. 3; 15/353
See application file for complete search history.

(56) References Cited

U.S. PATENT DOCUMENTS 7,144,438 B2 * 12/2006 Lee et al. ....................... 55/429

FOREIGN PATENT DOCUMENTS

| JP | 48-5540 | 2/1973 |
| JP | 61-164537 | 7/1986 |
| JP | 61-137355 | 8/1986 |
| JP | 61-222431 | 10/1986 |
| JP | 63-36446 | 3/1988 |
| JP | 63-51818 | 3/1988 |
| JP | 2005-230253 | 9/2005 |

OTHER PUBLICATIONS

Japanese Office Action dated Mar. 6, 2007, Application No. 2004-137057.

* cited by examiner

*Primary Examiner*—Robert A Hopkins
(74) *Attorney, Agent, or Firm*—Westerman, Hattori, Daniels & Adrian, LLP.

(57)    ABSTRACT

An electric vacuum cleaner has a dust collecting section for removing dust and an electric air blower mounted in its main body and comprises a filter for removing dust from air sucked into the dust collecting section by driving the electric air blower, and a disposable filter can be arranged on the upstream side of the filter.

11 Claims, 59 Drawing Sheets

ELECTRIC VACUUM CLEANER

BACKGROUND OF THE INVENTION

1. Field of the Invention

The present invention relates to an electric vacuum cleaner having a filter in its dust collecting section.

2. Description of Related Art

The inventors of the present application have proposed, in an electric vacuum cleaner having a dust collecting section for removing dust and an electric air blower mounted in its main body case and comprising a filter for removing dust from air sucked into the dust collecting section by driving the electric air blower in the dust collecting section, an electric vacuum cleaner in which a projection for sweeping out the dust is attached to an opening of the dust collecting section so that the dust in the dust collecting section can be swept by the projection in throwing away the dust, which allows time and labor required to throw away the dust to be reduced (see Japanese Patent Application No. 2004-43106 filed with the Japanese Patent Office).

However, the filter in the dust collecting section is easily clogged because the dust sucked into the dust collecting section adheres thereto. Therefore, the filter needs frequent maintenance such as cleaning.

SUMMARY OF THE INVENTION

An object of the present invention is to provide an electric vacuum cleaner capable of reducing time and labor required to maintain a filter.

In order to attain the above-mentioned object, an electric vacuum cleaner according to the present invention has a dust collecting section for removing dust and an electric air blower mounted in its main body and comprises a filter for removing dust from air sucked into the dust collecting section by driving the electric air blower, wherein a disposable filter composed of a paper filter such as a tissue can be arranged on the upstream side of the filter.

Since the clogging of the filter can be restrained by disposing the disposable filter on the upstream side of the filter, some effects are produced. For example, time and labor required to maintain the filter can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
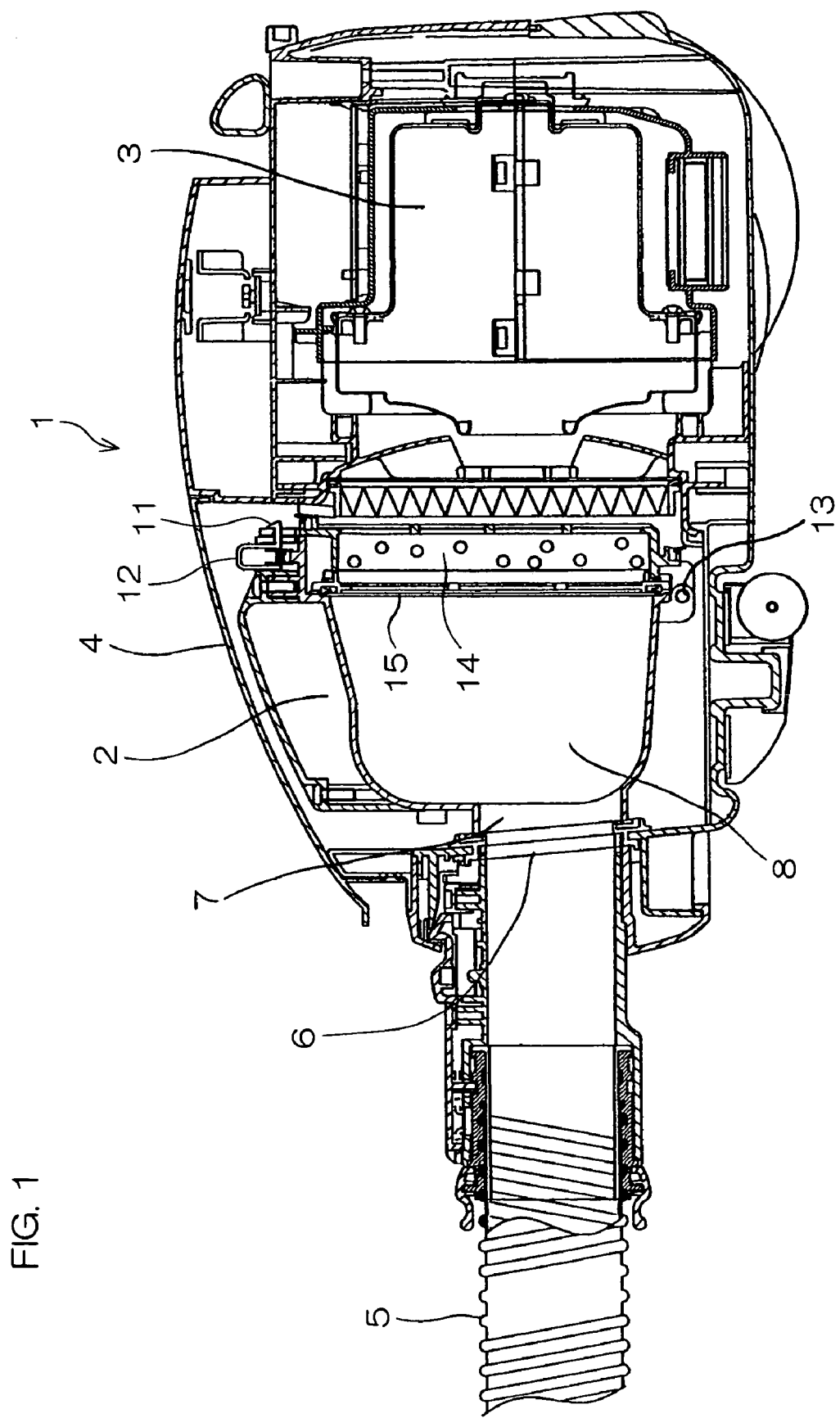
FIG. 1 is a side sectional view of an electric vacuum cleaner according to a first embodiment of the present invention.
Figure 2:
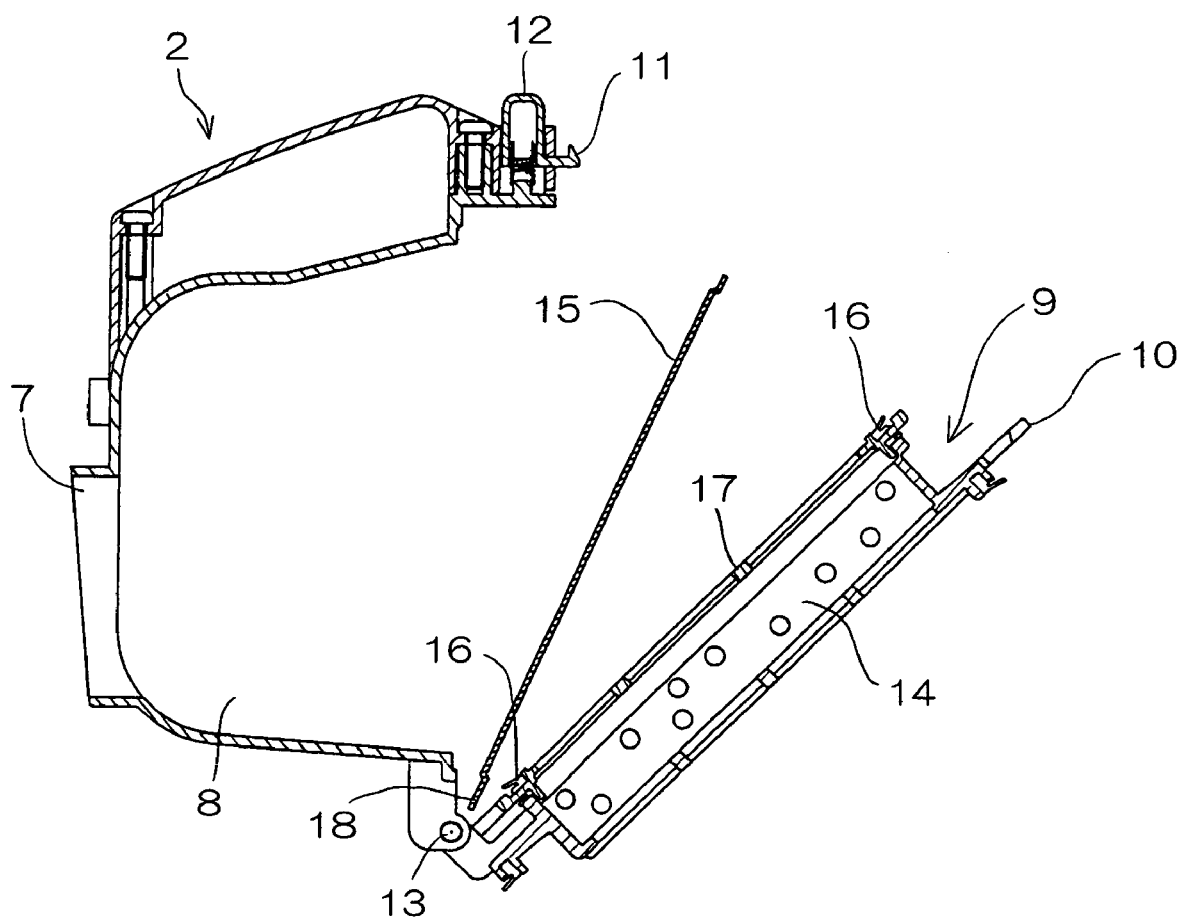
FIG. 2 is an exploded sectional view of a dust collecting section in the electric vacuum cleaner.
Figure 3:
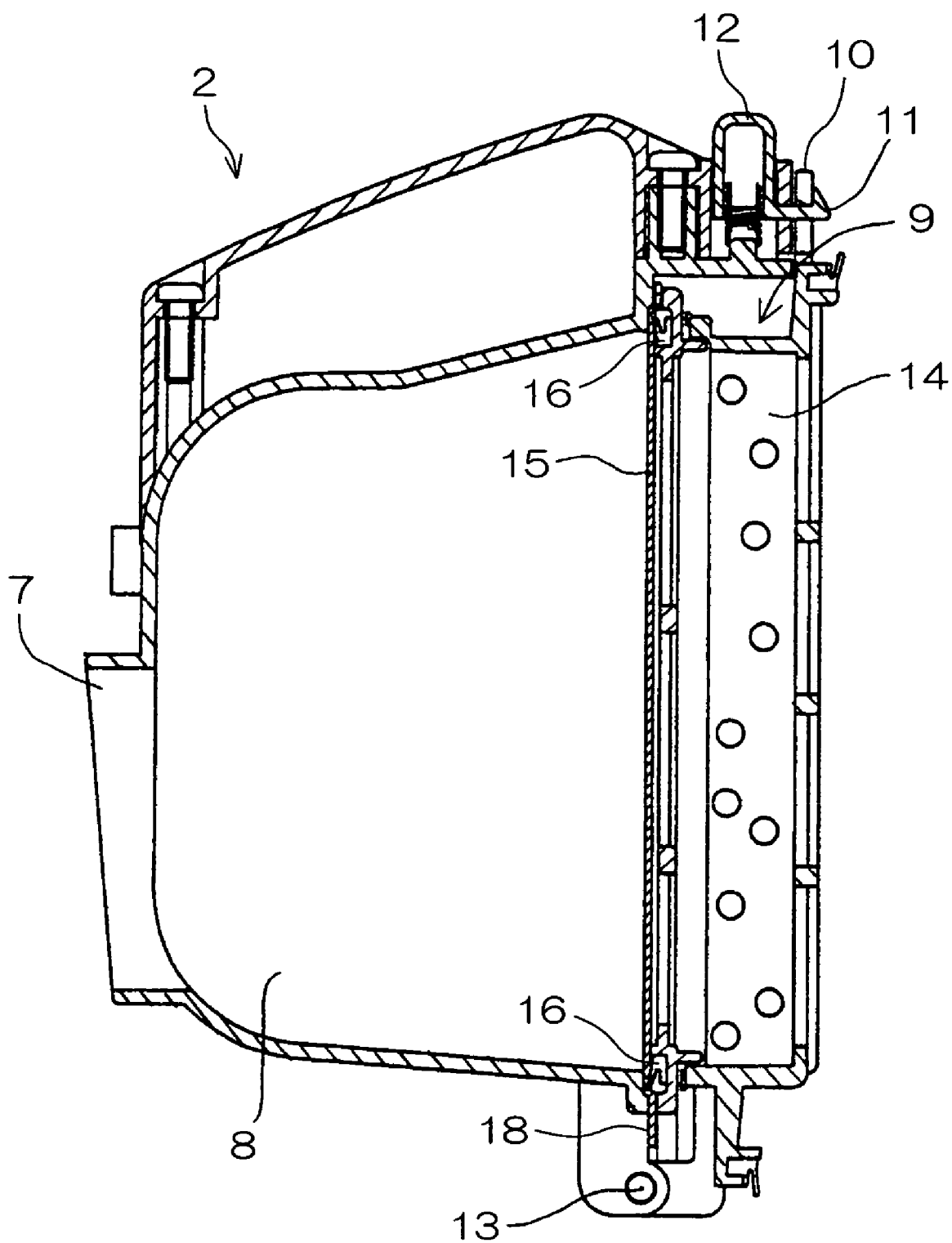
FIG. 3 is a cross-sectional view of the dust collecting section in the electric vacuum cleaner.
Figure 4:
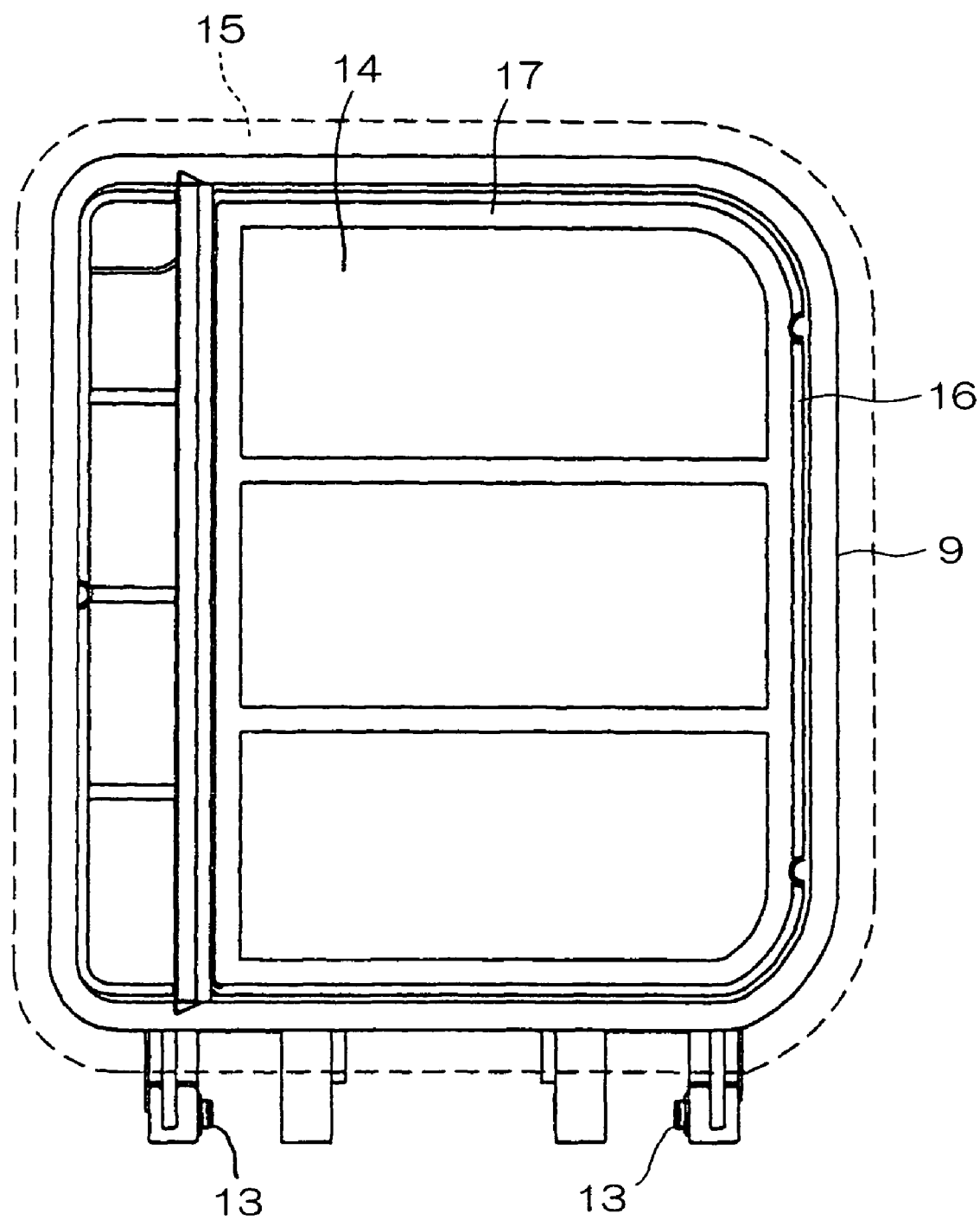
FIG. 4 is a plan view of an opening/closing section in the dust collecting section in the electric vacuum cleaner, showing a state as viewed from its mounting surface.

A first embodiment of an electric vacuum cleaner according to the present invention will be described in detail below on the basis of FIGS. 1 to 4. A cleaner main body 1 of the electric vacuum cleaner comprises a dust collecting section 2 for collecting dust and an electric air blower 3 in its inner part. An upper part of the dust collecting section 2 is covered with a main body dust cover 4 provided in the cleaner main body 1 so as to be capable of being opened and closed. The dust collecting section 2 can be attached to and detached from the cleaner main body 1 with the main body dust cover 4 opened. A suction flow inlet 6 communicating with the dust collecting section 2 is formed in the cleaner main body 1 (see FIG. 1), and a hose 5 is detachably connected to the suction flow inlet 6.

The dust collecting section 2 comprises a suction port 7 communicating with the suction flow inlet 6, a dust collecting chamber 8 storing dust sucked from the suction port 7, an opening/closing section 9 that is opened and closed in throwing away the dust stored in the dust collecting chamber 8, a handle 10 formed in the opening/closing section 9 and operated in opening and closing the opening/closing section 9, a locking section 11 that is engaged with the handle 10 to hold the opening/closing section 9 in a closed state, an operation section 12 for operating the locking section 11, and a rotating shaft 13 for rotatably holding the opening/closing section 9.

A filter 14 composed of urethane or the like is disposed in the opening/closing section 9, and dust is removed from air exhausted from the dust collecting section 2 by the filter 14. A disposable filter 15 composed of a paper filter such as a tissue is held on the upstream side of the filter 14 between the opening/closing section 9 and the dust collecting chamber 8 (see FIGS. 2 and 3). A mounting surface 17 to which the disposable filter 15 is attached is formed on a surface, opposed to the disposable filter 15, of the opening/closing section 9, and is formed of a flat surface having few irregularities. An annular packing 16 is mounted on a peripheral edge of the mounting surface 17 of the opening/closing section 9, and the disposable filter 15 is sealed by holding its peripheral edge 18 in the opening/closing section 9 through the packing 16.

In the electric vacuum cleaner thus configured, air flows into the suction port 7 in the dust collecting section 2 from the suction flow inlet 6 through the hose 5 by driving the electric air blower 3, and the air is exhausted outward from the cleaner main body 1 by cooling the electric air blower 3 when it passes through the electric air blower 3 after dust is removed therefrom by the disposable filter 15 and the filter 14. The dust removed by the disposable filter 15 and the filter 14 is stored within the dust collecting chamber 8.

If the dust collecting section 2 is removed from the cleaner main body 1 and is opened by operating the operation unit 12 to release a state where the locking section 11 locks the opening/closing section 9, and then rotating the opening/closing section 9 around the rotating shaft 13, the dust stored in the dust collecting chamber 8 can be thrown away.

In the electric vacuum cleaner, the clogging of the filter 14 can be restrained by disposing the disposable filter 15 on the upstream side of the filter 14, thereby allowing time and labor required to maintain the filter 14 to be reduced.

The disposable filter 15 is mounted by being held in the opening/closing section 9, thereby allowing the mounting properties of the disposable filter 15 to be improved.

The rotating shaft 13 in the opening/closing section 9 is disposed at a position spaced outwardly from an outer peripheral surface of the dust collecting section 2. Therefore, the distance between the rotating shaft 13 and the dust collecting chamber 8 can be increased, thereby making it possible to reliably hold the peripheral edge 18 of the disposable filter 15 between the opening/closing section 9 and the dust collecting chamber 8 to reliably cover the filter 14 with the disposable filter 15.

Furthermore, the mounting surface 17 of the opening/closing section 9 is made flat, thereby making it possible to prevent the disposable filter 15 from being damaged by a suction force of the electric air blower 3.

Figure 5:
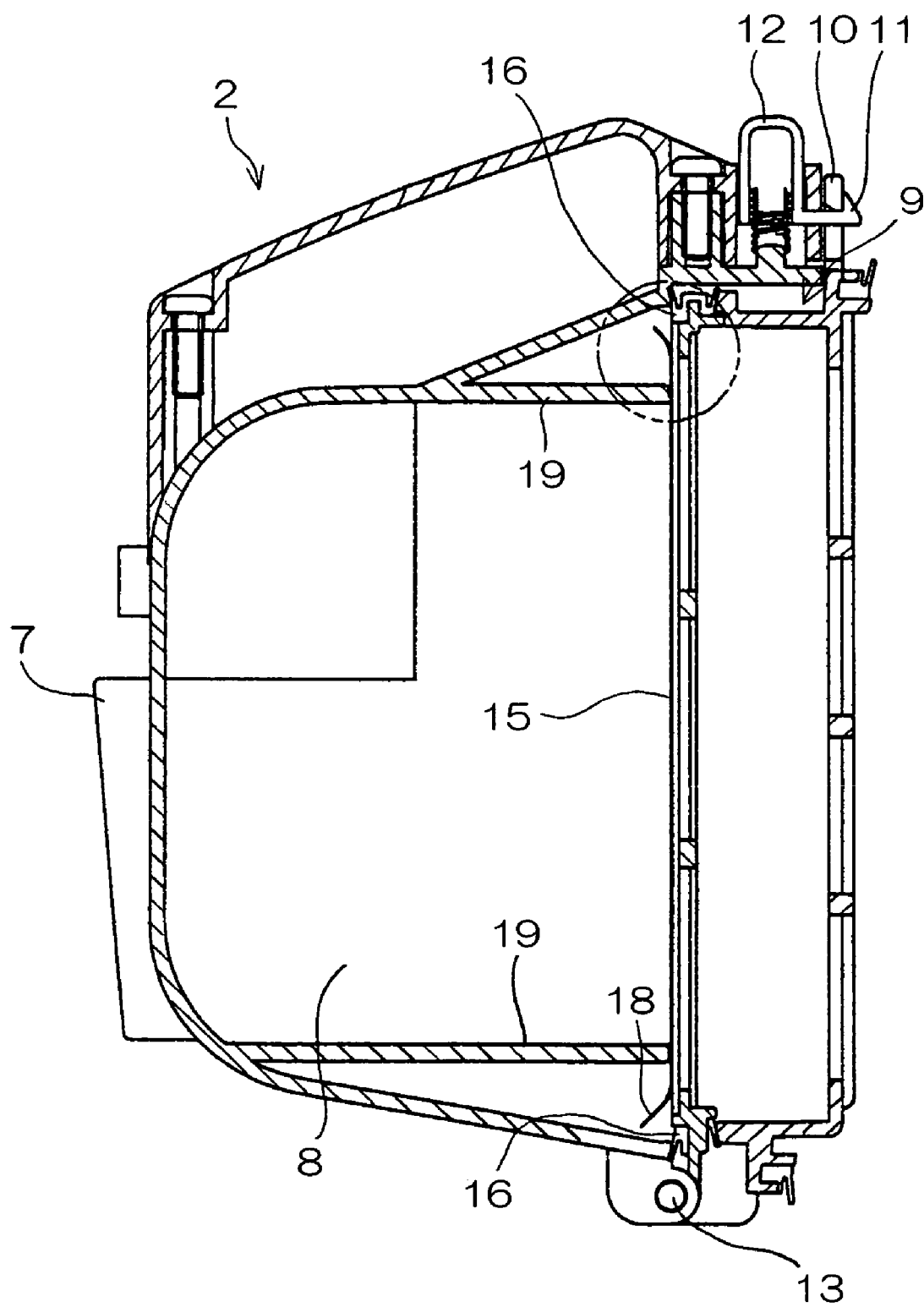
FIG. 5 is a cross-sectional view of the dust collecting section in the electric vacuum cleaner, showing a modified example.
Figure 6:
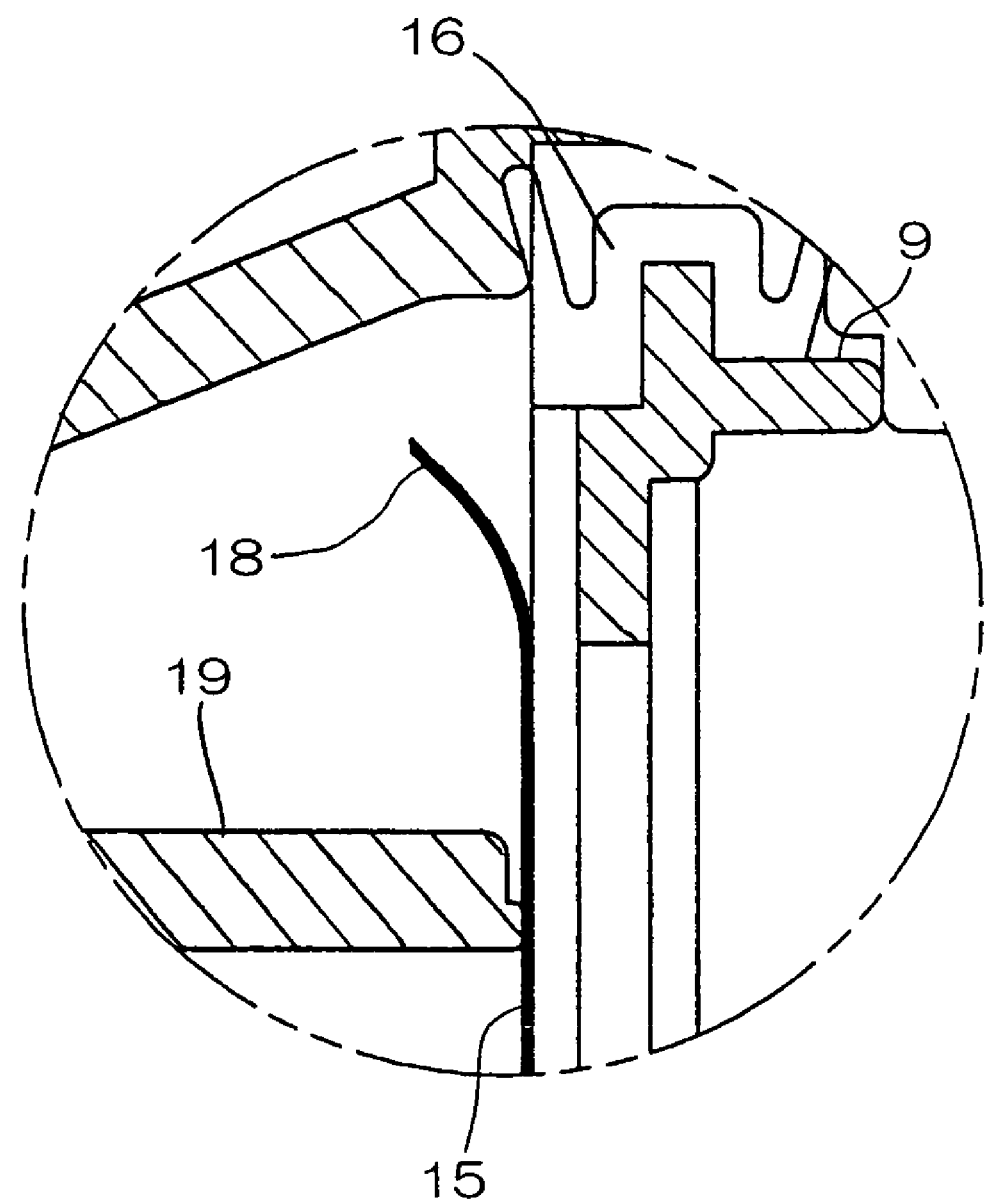
FIG. 6 is a cross-sectional view of a principal part of FIG. 5, showing an enlarged state.

In the first embodiment, such a configuration may be used that a cylindrical filter pressing section 19 is formed at a position corresponding to a portion, inside the packing 16, of the dust collecting chamber 8, and the peripheral edge 18 of the disposable filter 15 is held by an edge of the filter pressing section 19, as shown in FIGS. 5 and 6. This configuration can prevent slack in the packing 16 by the disposable filter 15, and can improve the sealing properties of the packing 16 in a case where the use of the disposable filter 15 is stopped.

Figure 7:
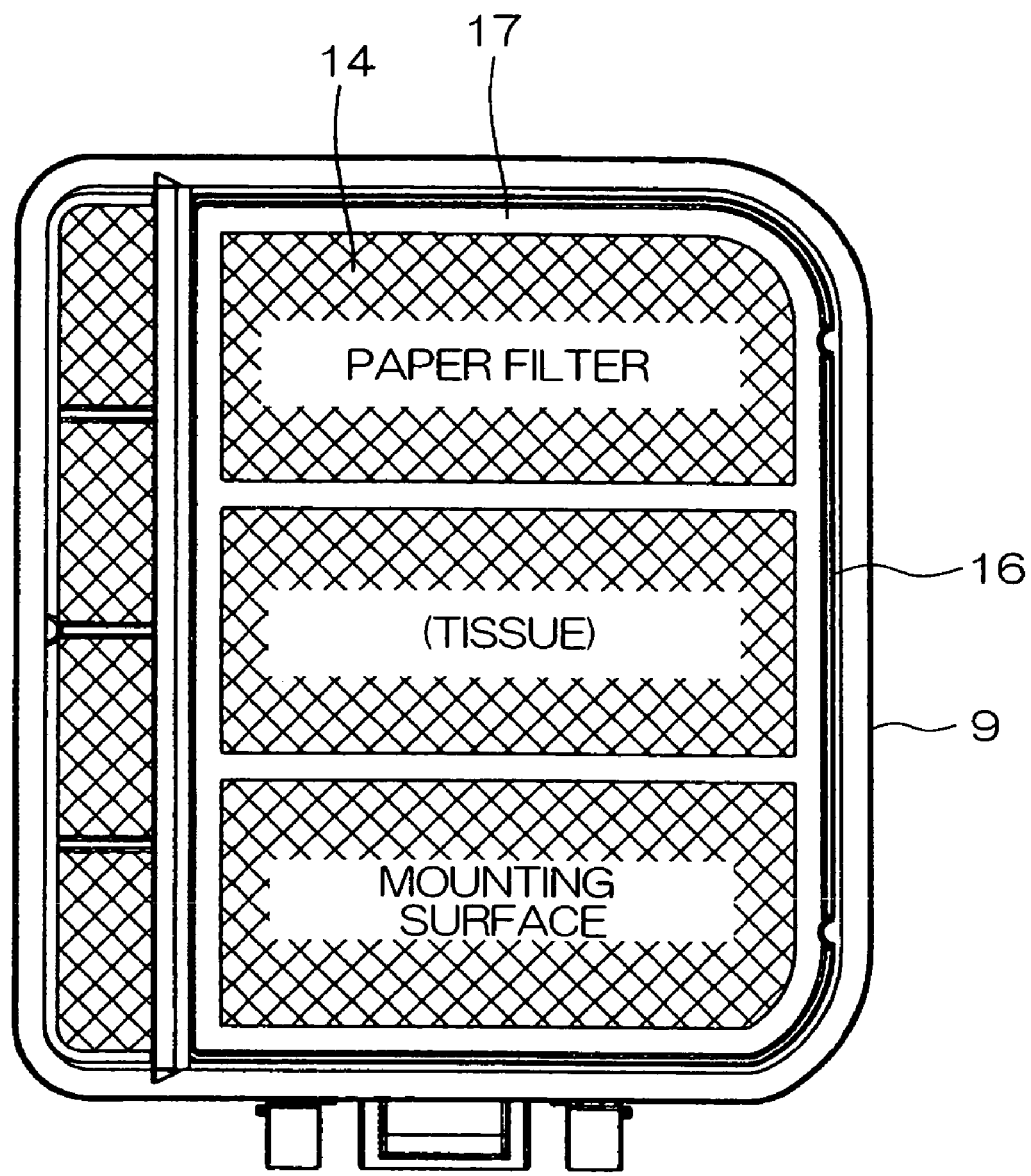
FIG. 7 is a plan view of the opening/closing section in the dust collecting section in the electric vacuum cleaner, showing another modified example.

In the first embodiment, the mounting surface 17 of the opening/closing section 9 may be subjected to printing indicating the position where the disposable filter 15 is mounted, as shown in FIG. 7. This configuration makes it possible to make a user to easily understand the position where the disposable filter 15 is mounted.

Second Embodiment

FIGS. 8 to 13 illustrate a second embodiment of the present invention. The same constituent elements as those in the first embodiment are assigned the same reference numerals and hence, the description thereof is not repeated.

Figure 8:
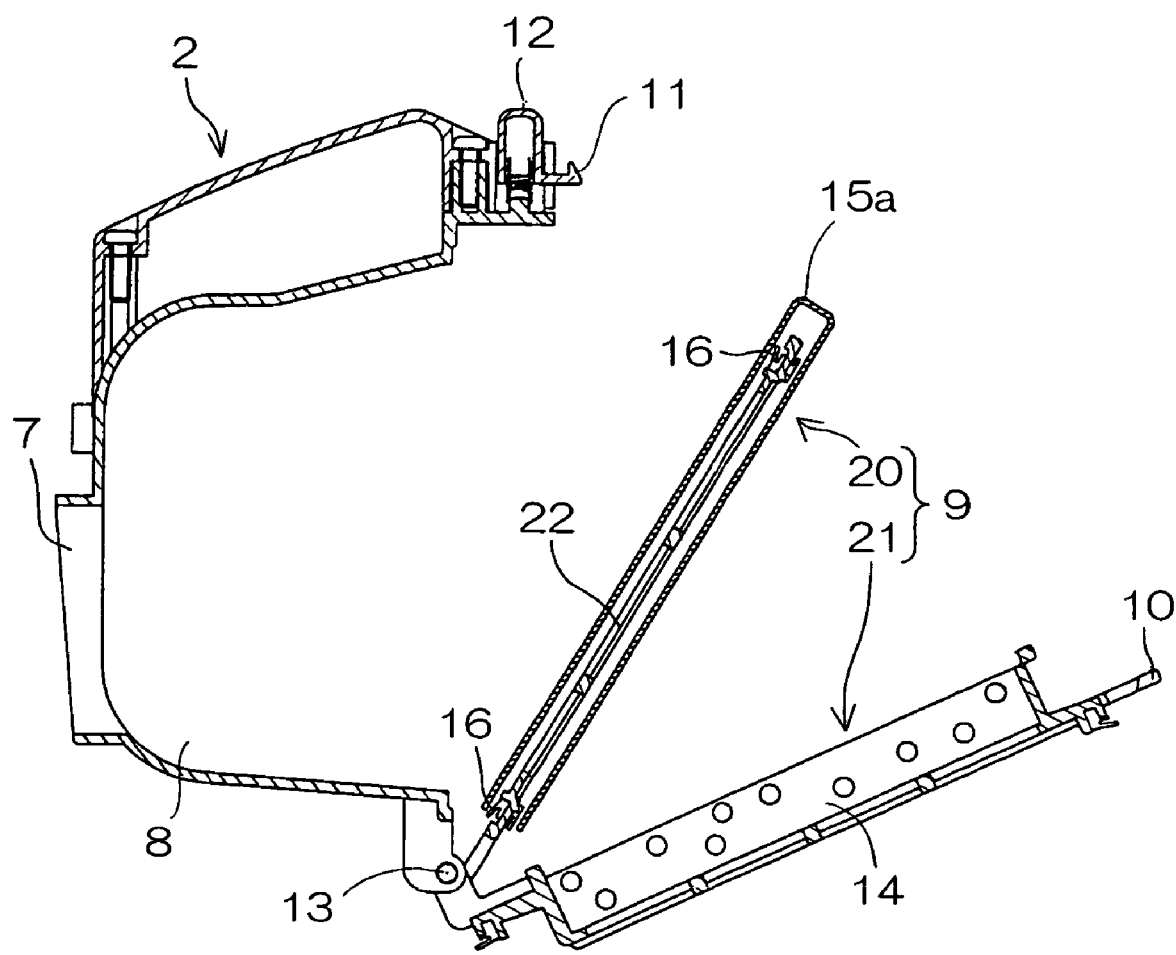
FIG. 8 is a side sectional view of a dust collecting section in an electric vacuum cleaner according to a second embodiment of the present invention, showing an expanded state.
Figure 9:
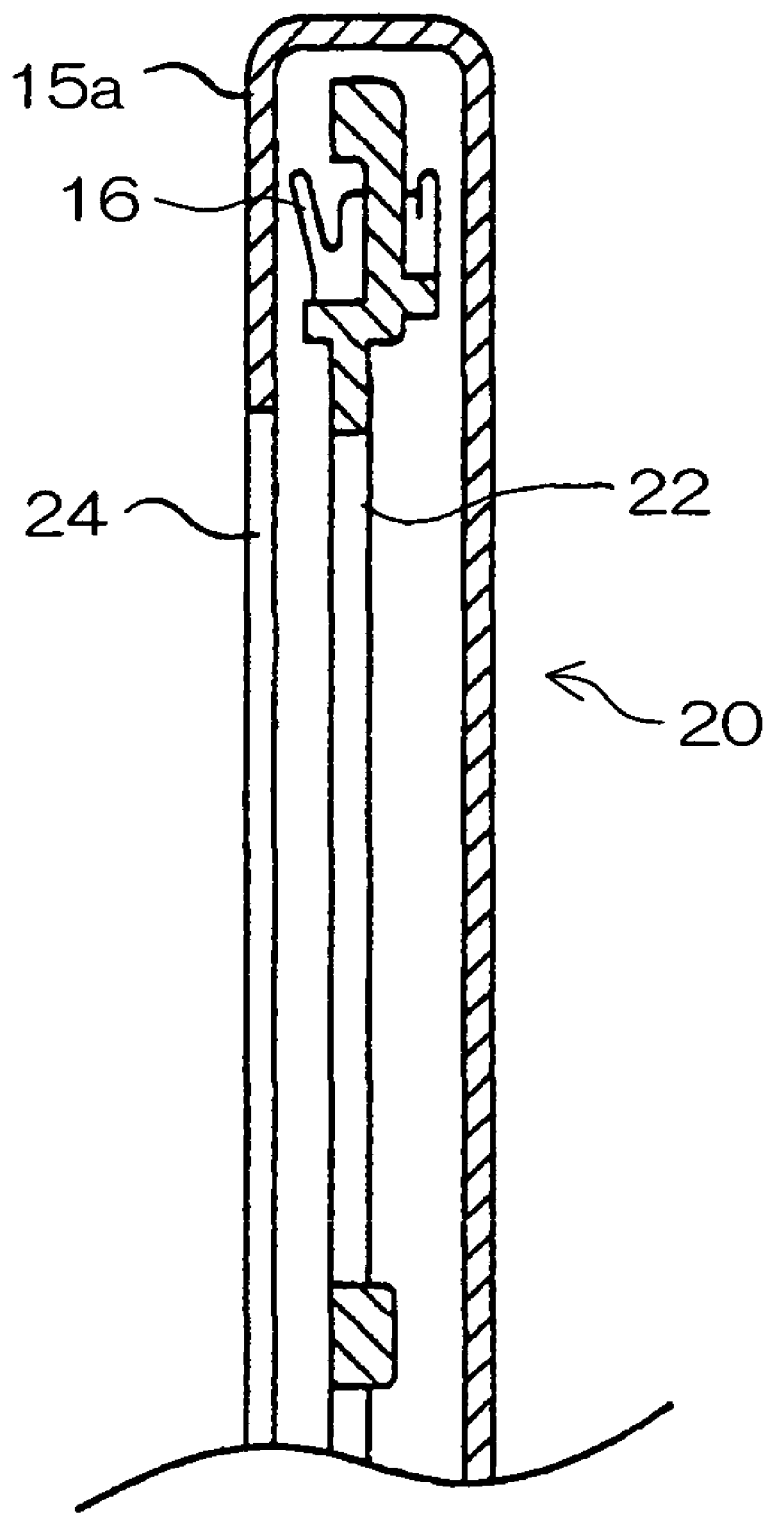
FIG. 9 is a cross-sectional view of a principal part of FIG. 8, showing an enlarged state.
Figure 10:
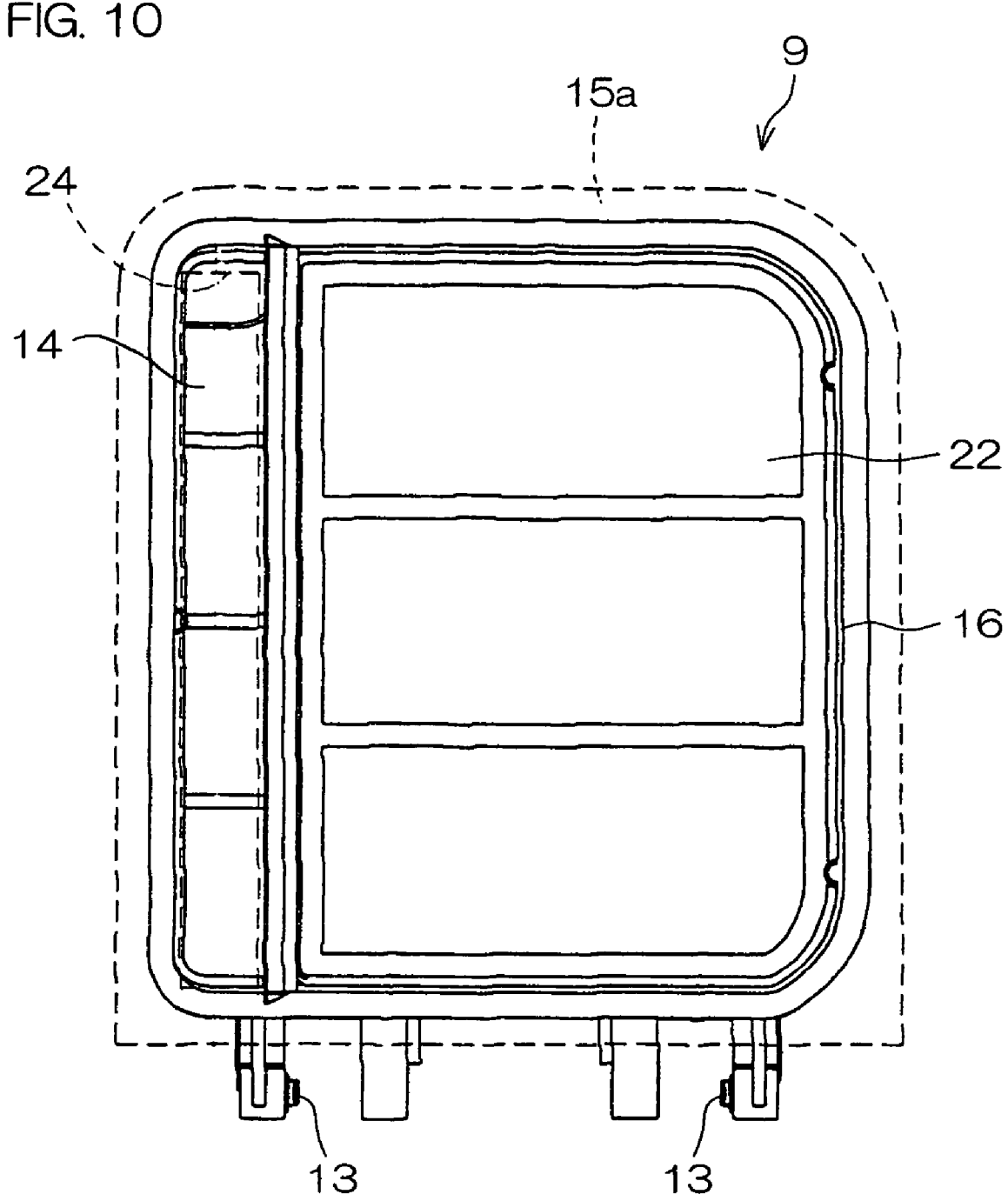
FIG. 10 is a plan view of an opening/closing section in the dust collecting section in the electric vacuum cleaner, showing a state as viewed from its mounting surface.
Figure 11:
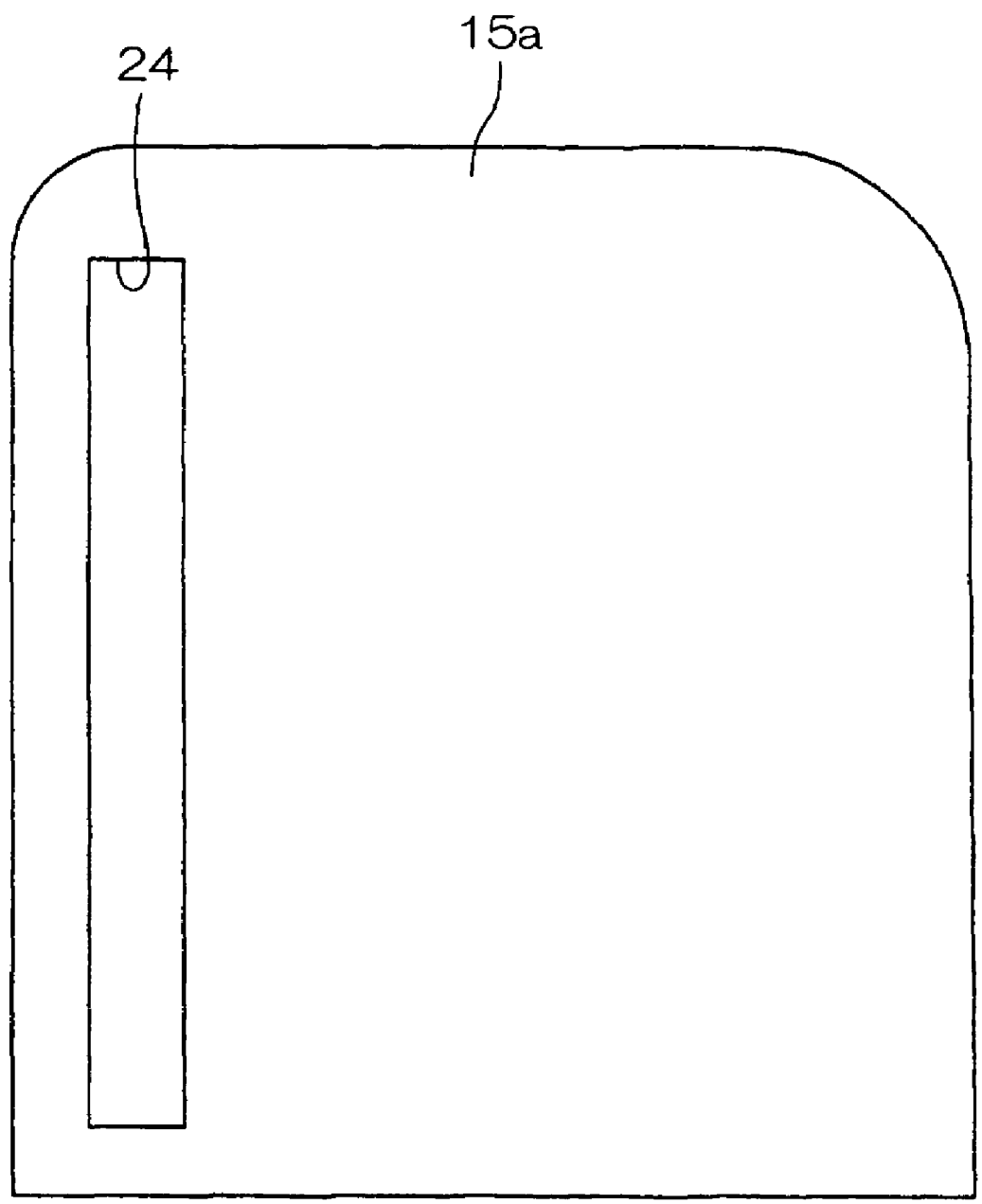
FIG. 11 is a plan view of a disposable filter in the dust collecting section in the electric vacuum cleaner.

A disposable filter 15a in the second embodiment is formed in a bag shape, as shown in FIG. 8. An opening/closing section 9 is separable into a pre-filter section 20 and a main filter section 21. A coarse-meshed pre-filter 22 is disposed in the pre-filter section 20. A filter 14 composed of urethane or the like is disposed in the main filter section 21. The pre-filter section 20 and the main filter section 21 are rotatable around a rotating shaft 13, and the pre-filter section 20 and the main filter section 21 cover a dust collecting chamber 8 in a state where they are opposed to each other with the opening/closing section 9 closed.

The bag-shaped disposable filter 15a overlays the pre-filter section 20 from the opposite side of the rotating shaft 13 to cover the pre-filter 22. The disposable filter 15a can be easily mounted only by overlaying the pre-filter section 20. A rectangular opening 24 extending in a direction perpendicular to the direction in which the rotating shaft 13 extends is formed on one side of a front surface (on the upstream side) of the disposable filter 15a. The pre-filter 22 is not disposed at a position corresponding to the opening 24 in the pre-filter section 20, and the opening 24 directly communicates with the filter 14.

The disposable filter 15a thus configured is formed in a bag shape, so that the disposable filter 15a can be mounted only by overlaying the pre-filter section 20, thereby allowing the mounting properties of the disposable filter 15a to be improved.

The disposable filter 15a is made double by being formed in a bag shape. Therefore, a large surface area of the disposable filter 15a can be ensured, thereby allowing the life of the disposable filter 15a to be extended. As a result, time and labor required to maintain the filter 14 can be further reduced.

Furthermore, when the front surface (on the upstream side) of the disposable filter 15a is clogged, the amount of air flowing toward the electric air blower 3 is reduced. Therefore, the temperature of the electric air blower 3 is raised, which may adversely affect the life of the electric air blower 3. On the other hand, in the second embodiment, the opening 24 is provided on the front surface of the disposable filter 15a, so that air can flow into the electric air blower 3 through the opening 24, which may not adversely affect the life of the electric air blower 3. At this time, dust can be removed by the disposable filter 15a on the rear side (on the downstream side), thereby making it possible to prevent the life of the filter 14 from being reduced.

Figure 12:
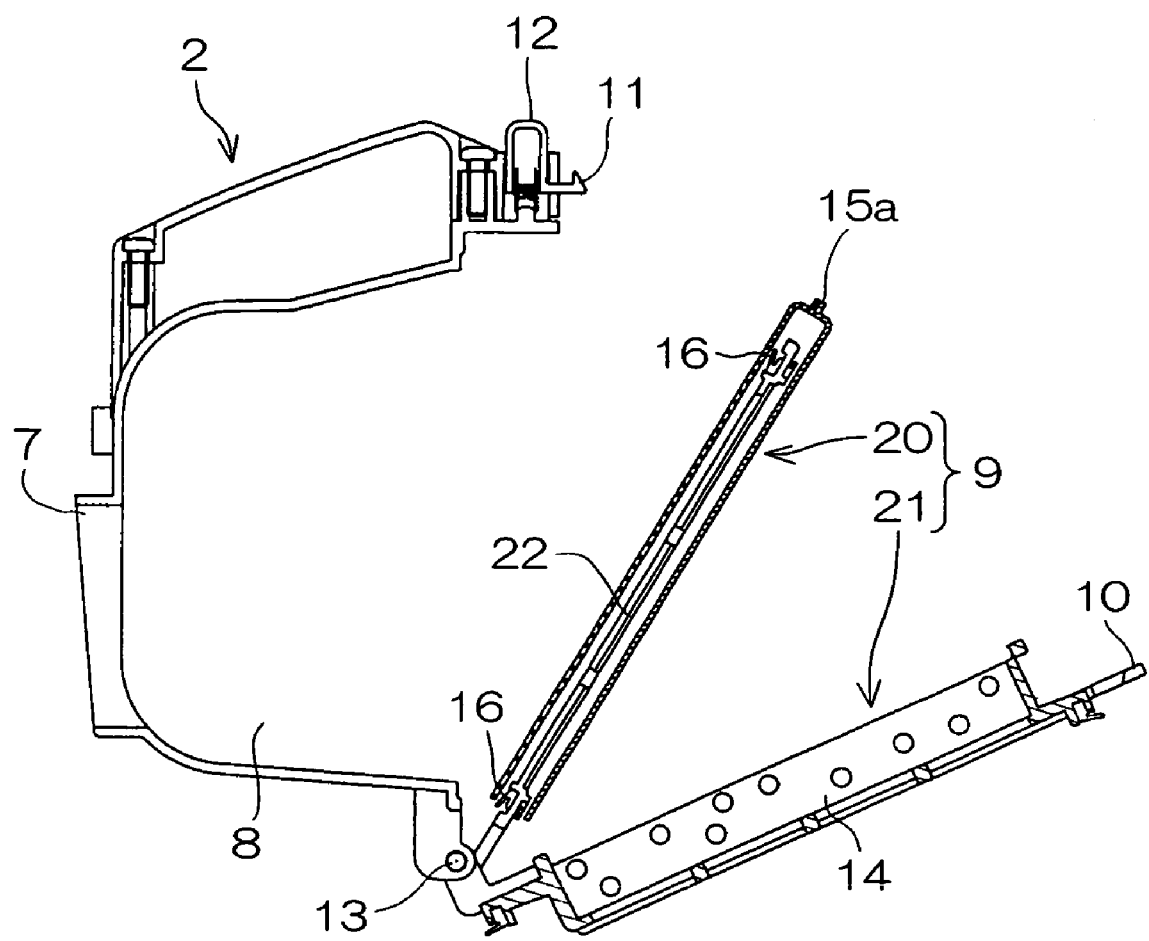
FIG. 12 is an exploded sectional view of the dust collecting section in the electric vacuum cleaner, showing a modified example.
Figure 13:
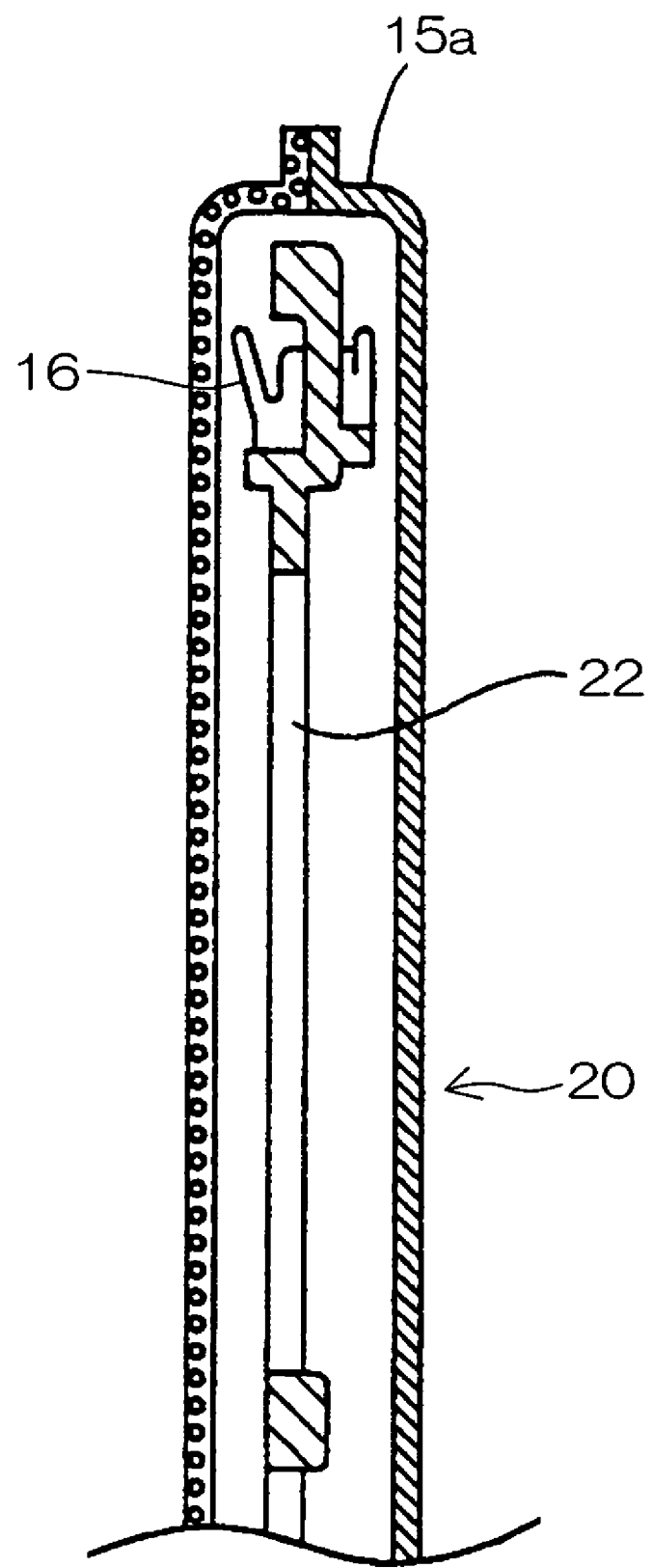
FIG. 13 is a cross-sectional view of a principal part of FIG. 12, showing an enlarged state.

Furthermore, in the second embodiment, materials on the upstream side (on the left side in FIG. 12) and the downstream side (on the right side in FIG. 12) of the disposable filter 15a may be changed, as shown in FIGS. 12 and 13. In this case, a portion on the upstream side (the first layer) of the disposable filter 15a may be coarse, and a portion on the downstream side (the second layer) of the disposable filter 15a may be fine.

When the dust collecting section 2 is compact, the surface area of the filter 14 is limited, and the life of the filter 14 may be reduced by the clogging of the filter 14. On the other hand, in this modified example, the portion on the upstream side of the disposable filter 15a is coarse, and the portion on the downstream side of the disposable filter 15a is fine. Therefore, coarse-grained dust is captured on the upstream side of the disposable filter 15a, and fine-grained dust is captured on the downstream side of the disposable filter 15a. In such a manner, the fine-grained dust is passed on the upstream side of the disposable filter 15a, and is captured on the downstream side of the disposable filter 15a. Therefore, the clogging on the upstream side of the disposable filter 15a can be restrained, thereby allowing the life of the disposable filter 15a to be extended.

Although in the second embodiment, the opening 24 is formed on the upstream side of the disposable filter 15a, the present invention is not limited to this configuration. Such a configuration may be used that a projection (not shown) is formed at a position, corresponding to the opening 24, of the pre-filter section 20, and a bag-shaped disposable filter 15a having no opening/closing section 9 formed therein is mounted on the pre-filter section 20, and a portion on the upstream side of the disposable filter 15a is broken by coming into contact with the projection to form an opening/closing section 9.

Figure 14:
FIG. 14 shows a modified example of the disposable filter in the dust collecting section in the electric vacuum cleaner.

Although in the second embodiment, the disposable filter 15a is formed in a bag shape, the present invention is not limited to this configuration. One disposable filter 15*a*' may be folded in an approximately U shape, as shown in FIG. 14.

Third Embodiment

FIGS. 15 to 31 illustrate a third embodiment of the present invention. The same constituent elements as those in the first and second embodiments are assigned the same reference numerals and hence, the description thereof is not repeated. In the third embodiment, an example of the configuration of positioning means in a disposable filter 15 will be described.

Figure 15:
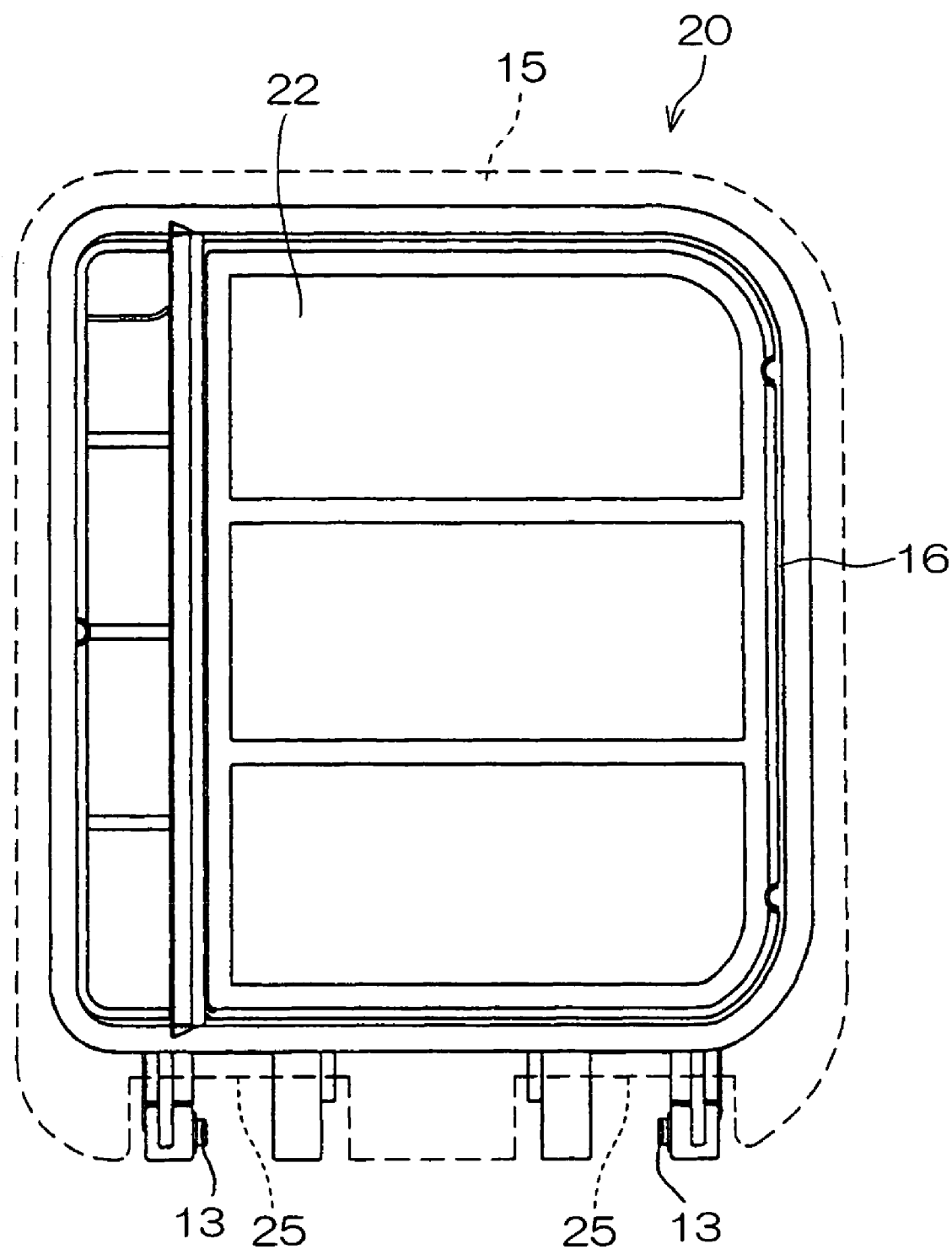
FIG. 15 is a plan view of an opening/closing section in a dust collecting section in an electric vacuum cleaner according to a third embodiment of the present invention, showing a state as viewed from its mounting surface.
Figure 16:
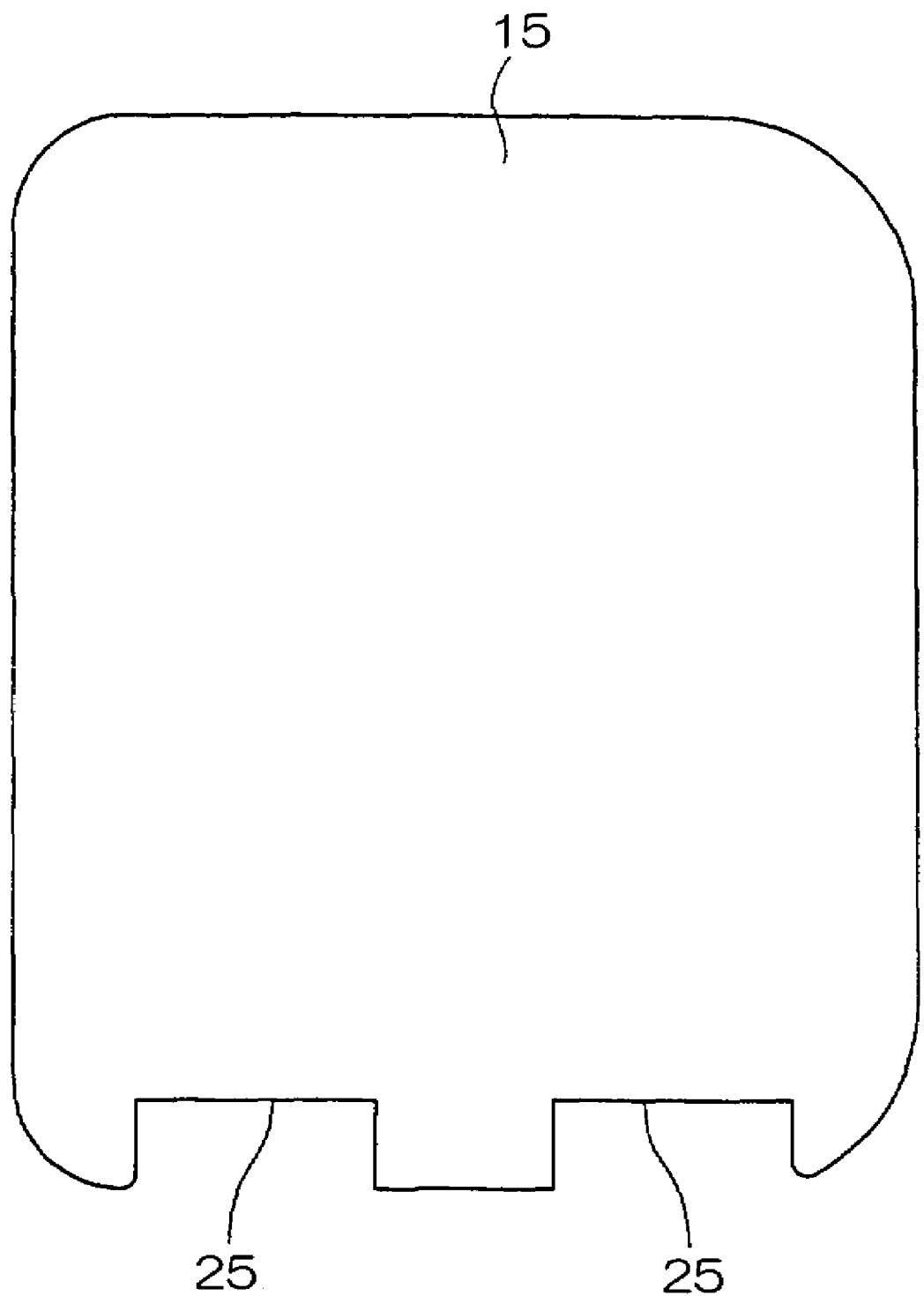
FIG. 16 is a plan view of a disposable filter in the dust collecting section in the electric vacuum cleaner.
Figure 17:
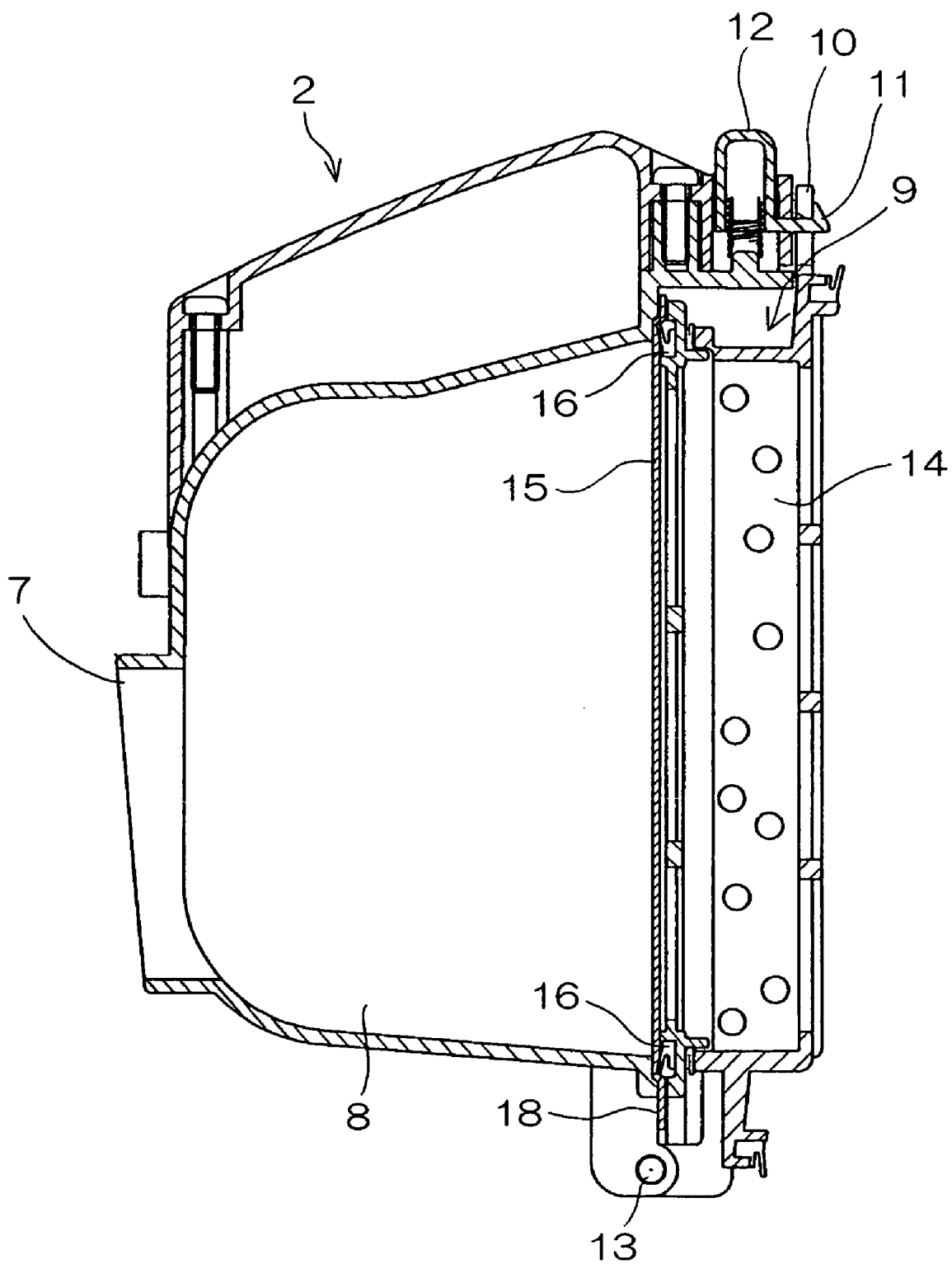
FIG. 17 is a cross-sectional view of the dust collecting section in the electric vacuum cleaner.

In a configuration shown in FIGS. 15 to 17, a disposable filter 15 is formed with an approximately rectangular notch 25 in correspondence with a rotating shaft 13 in an opening/closing section 9. As shown in FIG. 15, the disposable filter 15 is positioned by the rotating shaft 13 by being so arranged that the rotating shaft 13 enters the notch 25, and the position of the disposable filter 15 is determined. Therefore, the disposable filter 15 can be reliably positioned on the upstream side of the filter 14 without shifting the position thereof. Further, the rotating shaft 13 for rotating the opening/closing section 9 can be also used for positioning the disposable filter 15, thereby allowing the configuration to be simplified.

Figure 18:
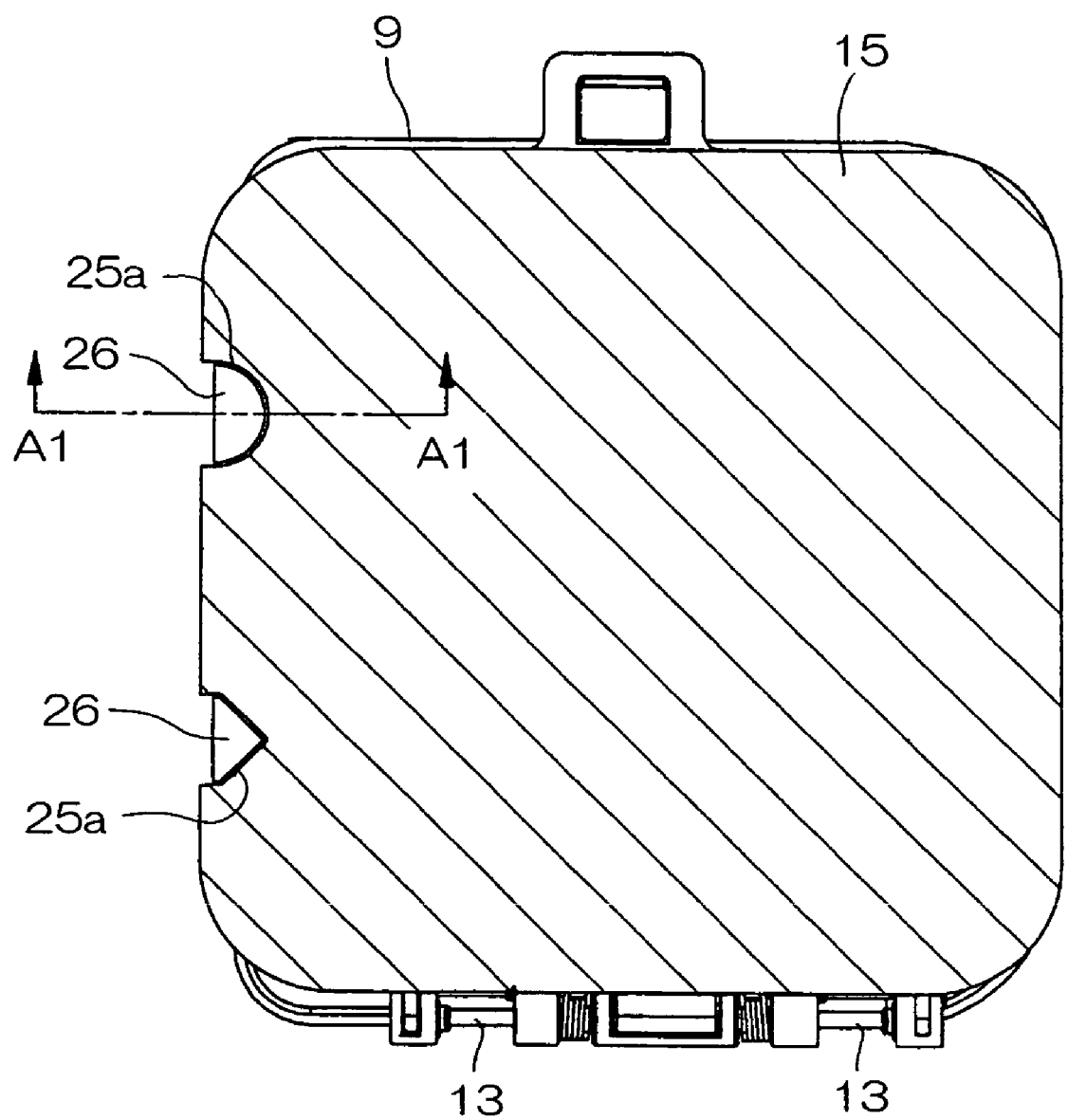
FIG. 18 is a plan view of the opening/closing section in the dust collecting section in the electric vacuum cleaner, showing a modified example.
Figure 19:
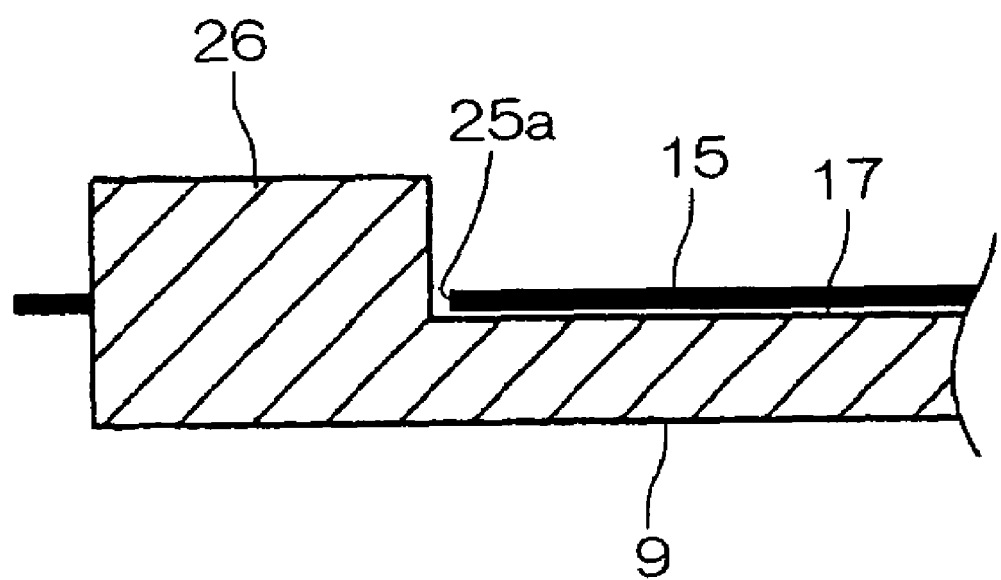
FIG. 19 is a cross-sectional view taken along a line A1-A1 in FIG. 12.

As shown in FIGS. 18 and 19, such a configuration may be used that the disposable filter 15 is formed with two notches 25*a* having different shapes, a mounting surface 17 of the opening/closing section 9 is formed with two projections 26 respectively having shapes corresponding to the notches 25*a*, and the projections 26 respectively enter the corresponding notches 25*a* to position the disposable filter 15 as well as to regulate the forward/backward directionality of the disposable filter 15. This configuration allows the life of the disposable filter 15 to be extended because the directionality of the disposable filter 15 is regulated, as in a case where the disposable filter 15 is formed in a bag shape.

Figure 20:
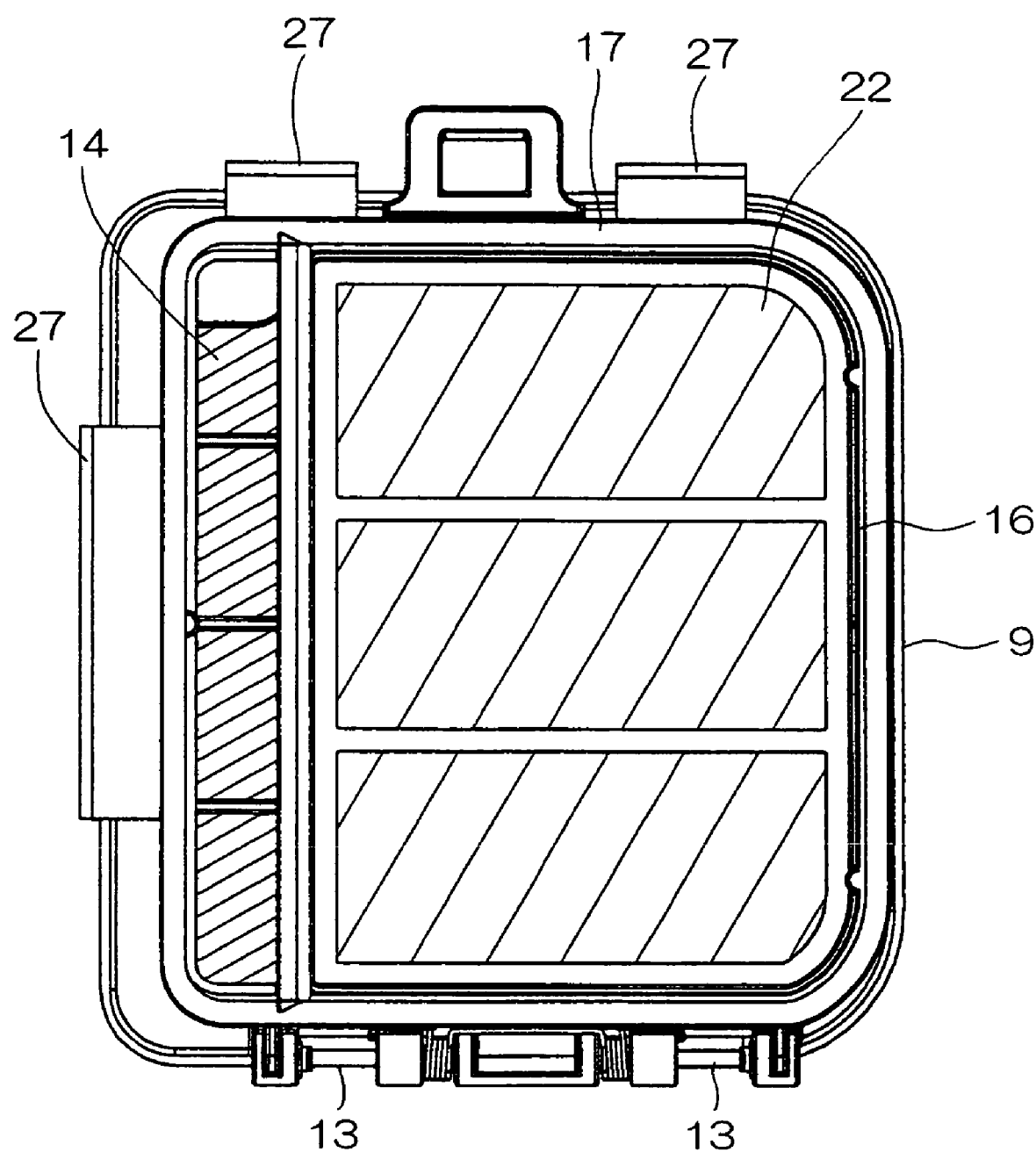
FIG. 20 is a plan view of the opening/closing section in the dust collecting section in the electric vacuum cleaner, showing another modified example.
Figure 21:
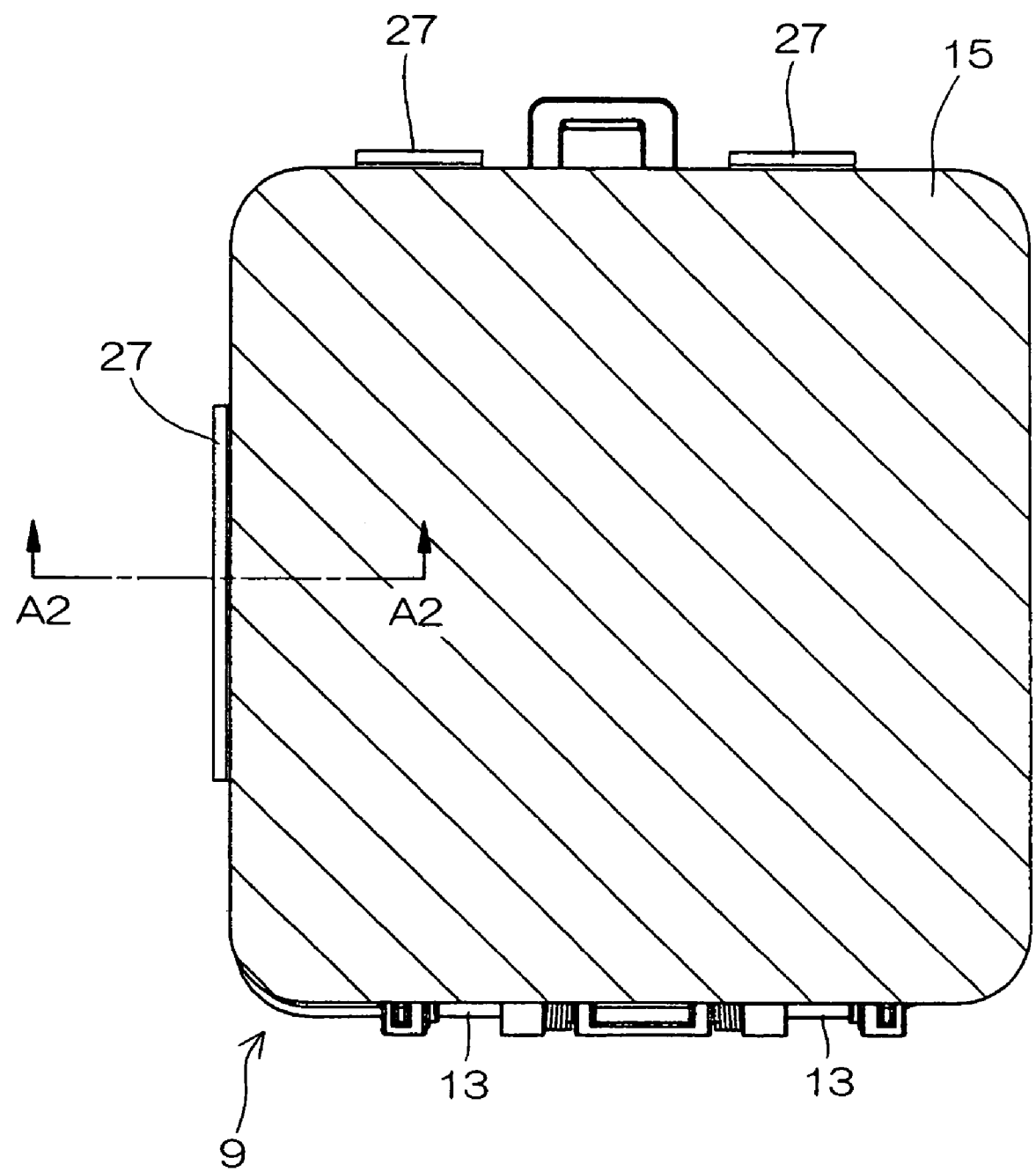
FIG. 21 is a plan view of a state where the disposable filter is mounted on the opening/closing section in the dust collecting section in the electric vacuum cleaner.
Figure 22:
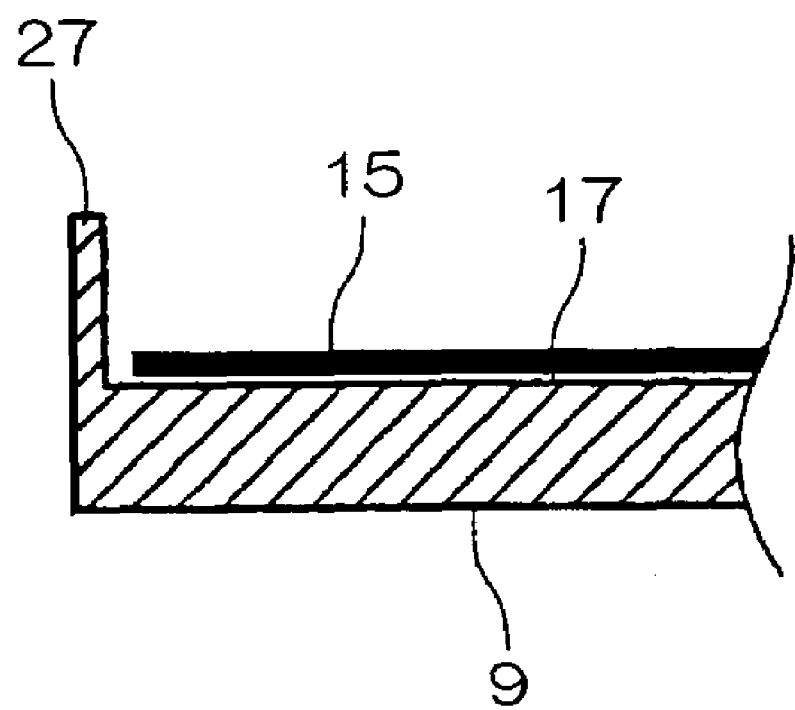
FIG. 22 is a cross-sectional view taken along a line A2-A2 in FIG. 22.

FIGS. 20 to 24 illustrate a configuration in which a projection 27 for regulating the position on the outer periphery of the disposable filter 15 is provided on the mounting surface 17 of the opening/closing section 9. FIGS. 20 to 22 illustrate a configuration in which projections 27 are provided on two adjacent sides of the mounting surface 17 of the opening/closing section 9.

This configuration allows the disposable filter 15 to be reliably positioned on the upstream side of the filter 14 without shifting the position thereof because the disposable filter 15 is positioned by abutting the outer periphery of the disposable filter 15 against the projections 27 on the two sides.

Figure 23:
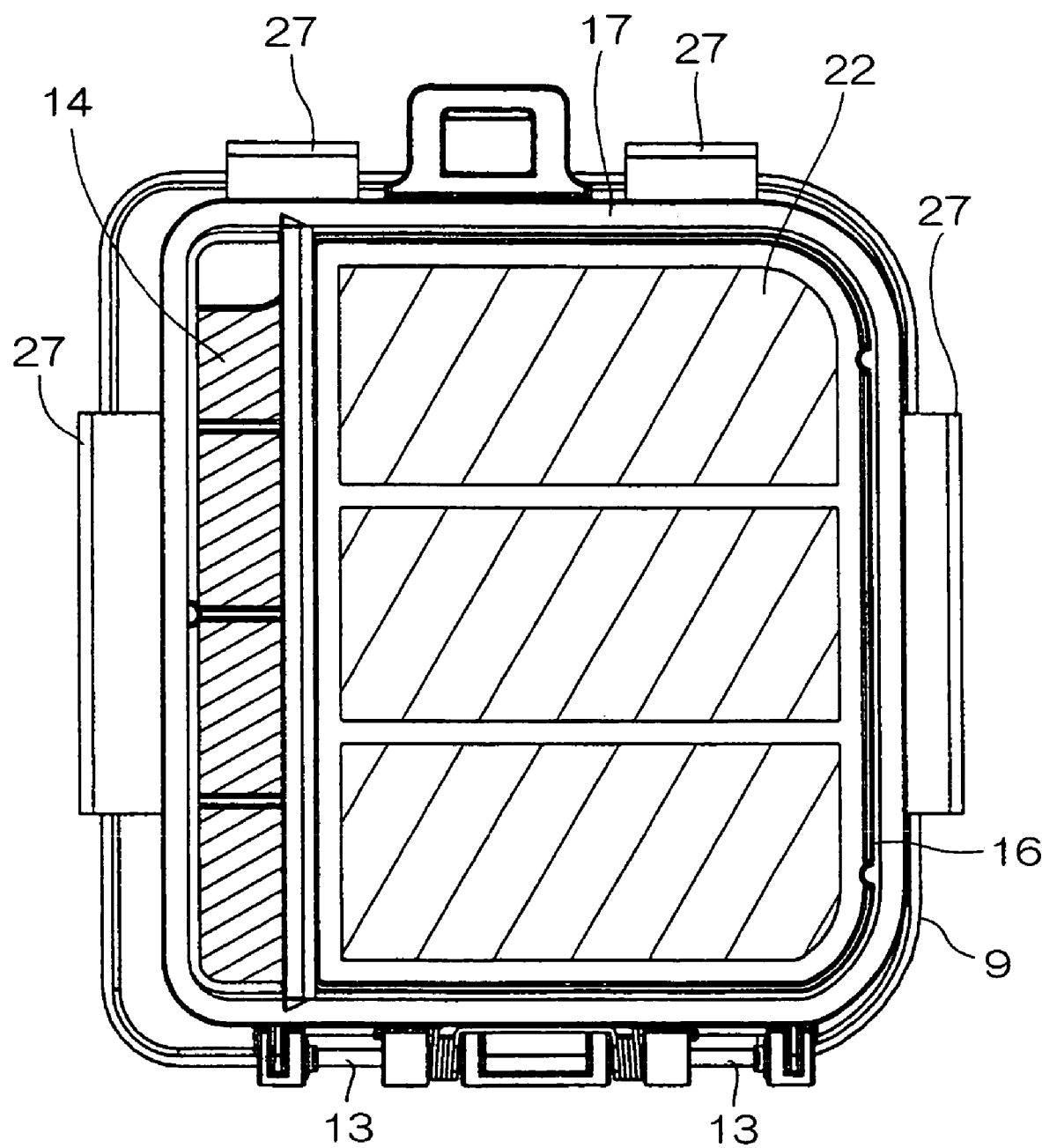
FIG. 23 is a plan view of the opening/closing section in the dust collecting section in the electric vacuum cleaner, showing still another modified example.
Figure 24:
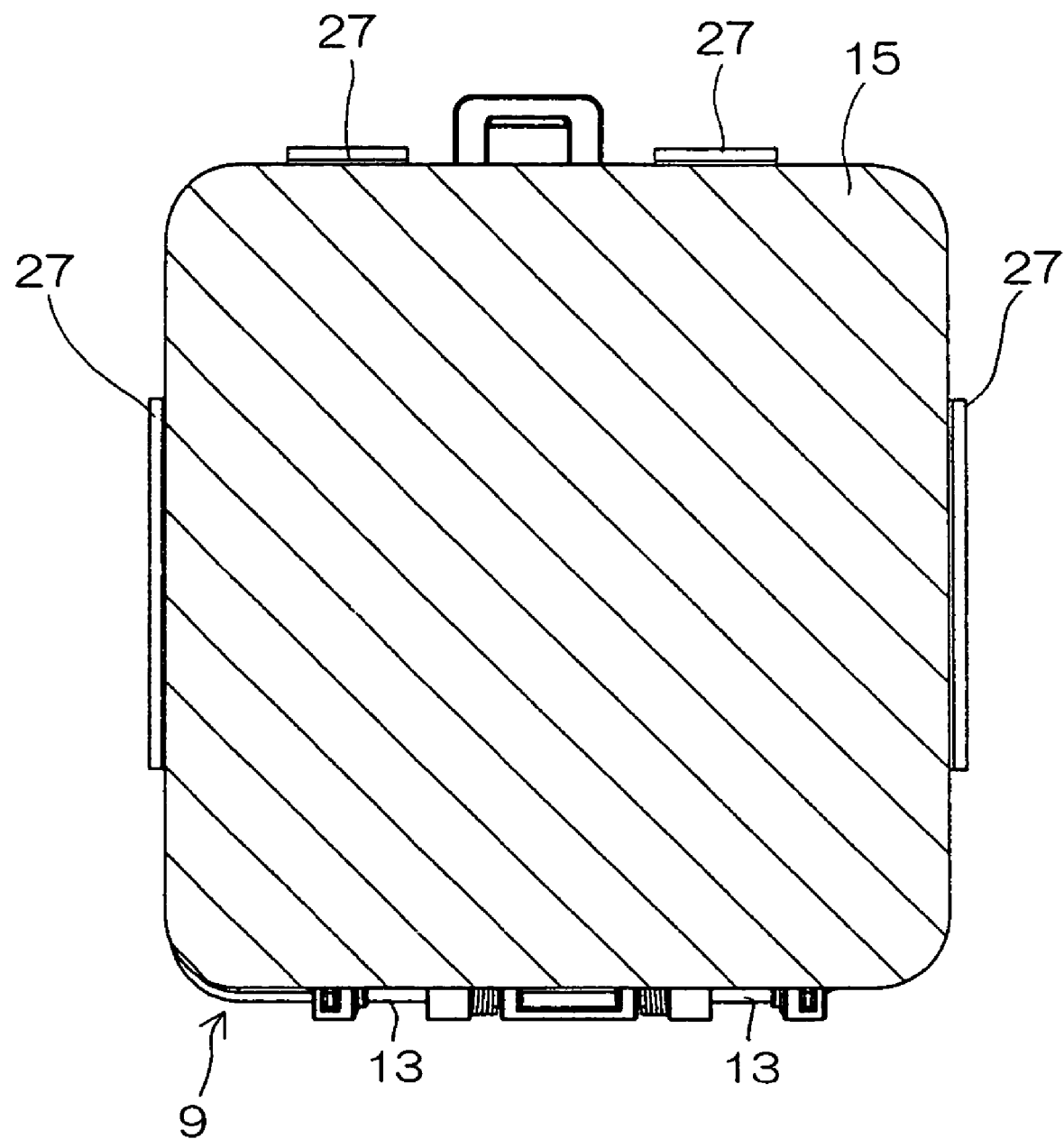
FIG. 24 is a plan view showing a state where the disposable filter is mounted on the opening/closing section in the dust collecting section in the electric vacuum cleaner.
Figure 25:
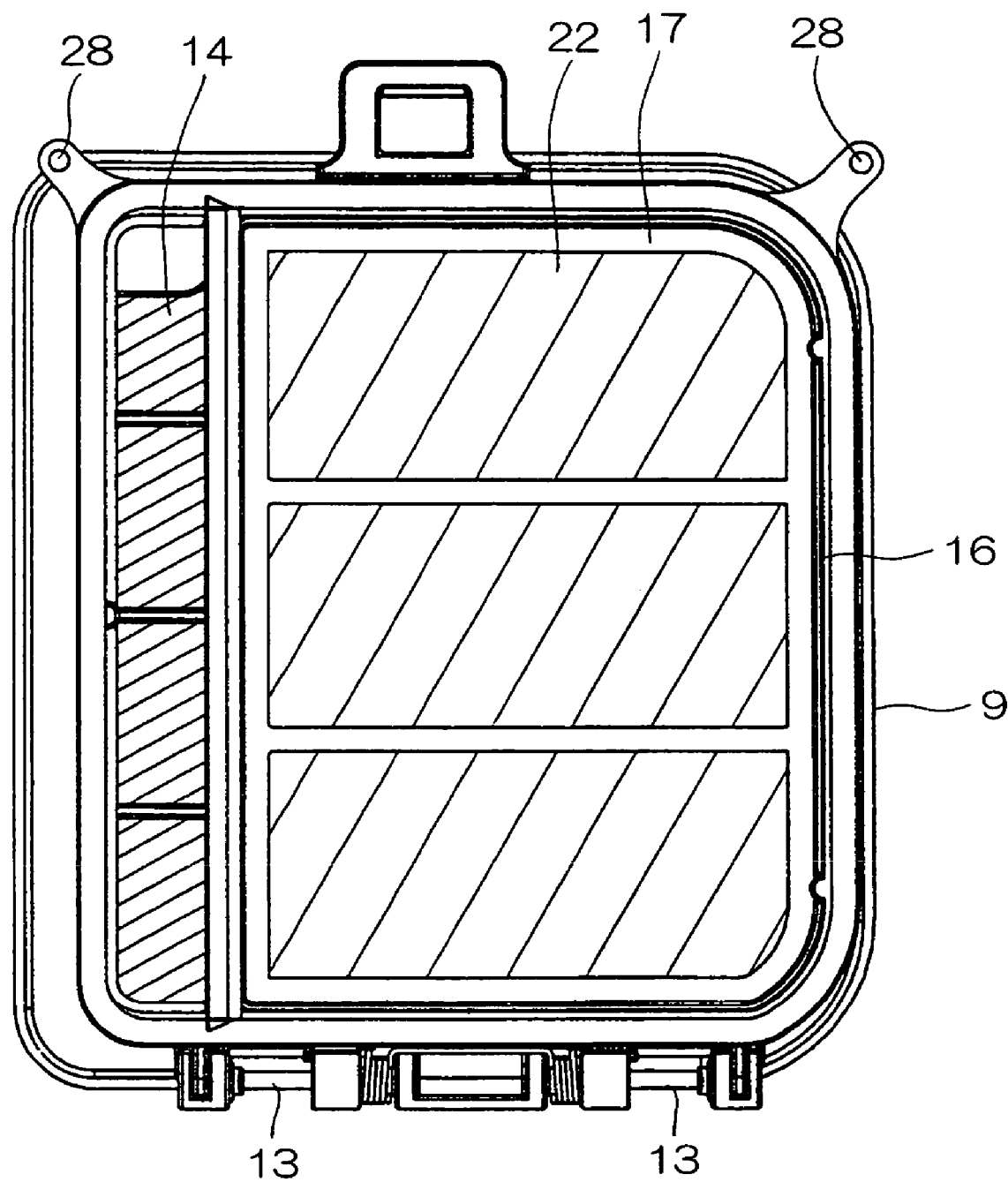
FIG. 25 is a plan view of the opening/closing section in the dust collecting section in the electric vacuum cleaner, showing a further modified example.
Figure 26:
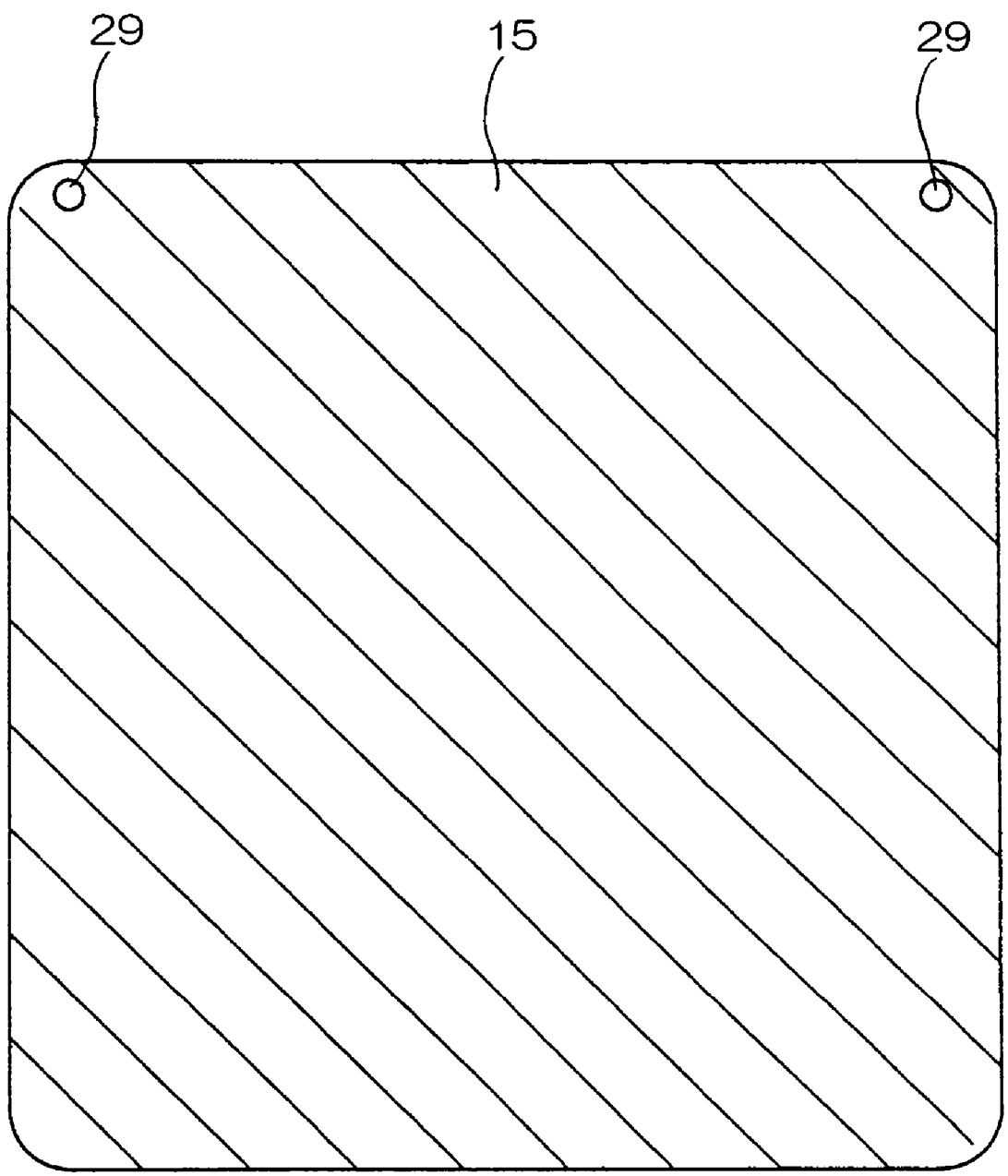
FIG. 26 is a plan view of the disposable filter in the dust collecting section in the electric vacuum cleaner.
Figure 27:
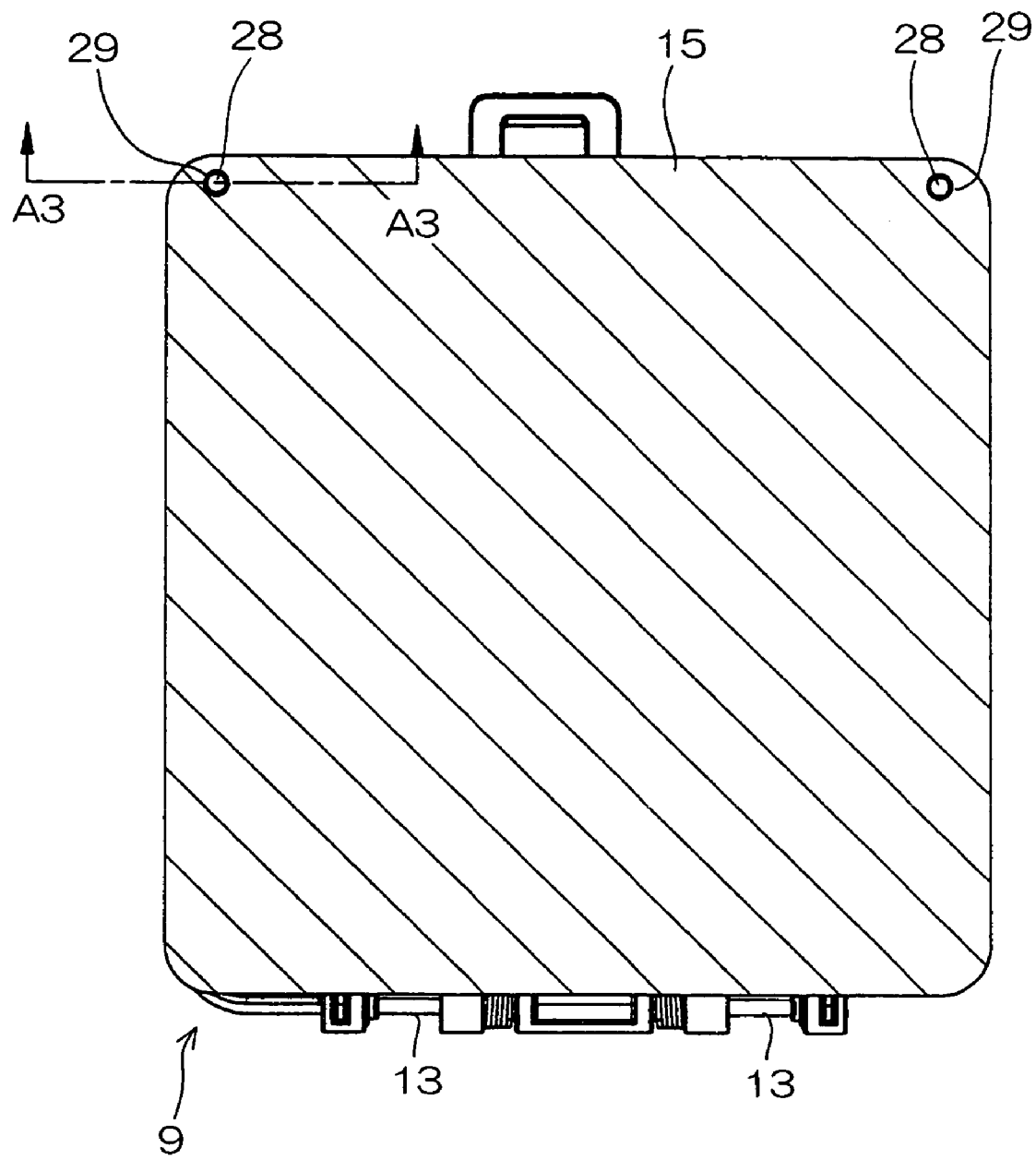
FIG. 27 is a plan view showing a state where the disposable filter is mounted on the opening/closing section in the dust collecting section in the electric vacuum cleaner.
Figure 28:
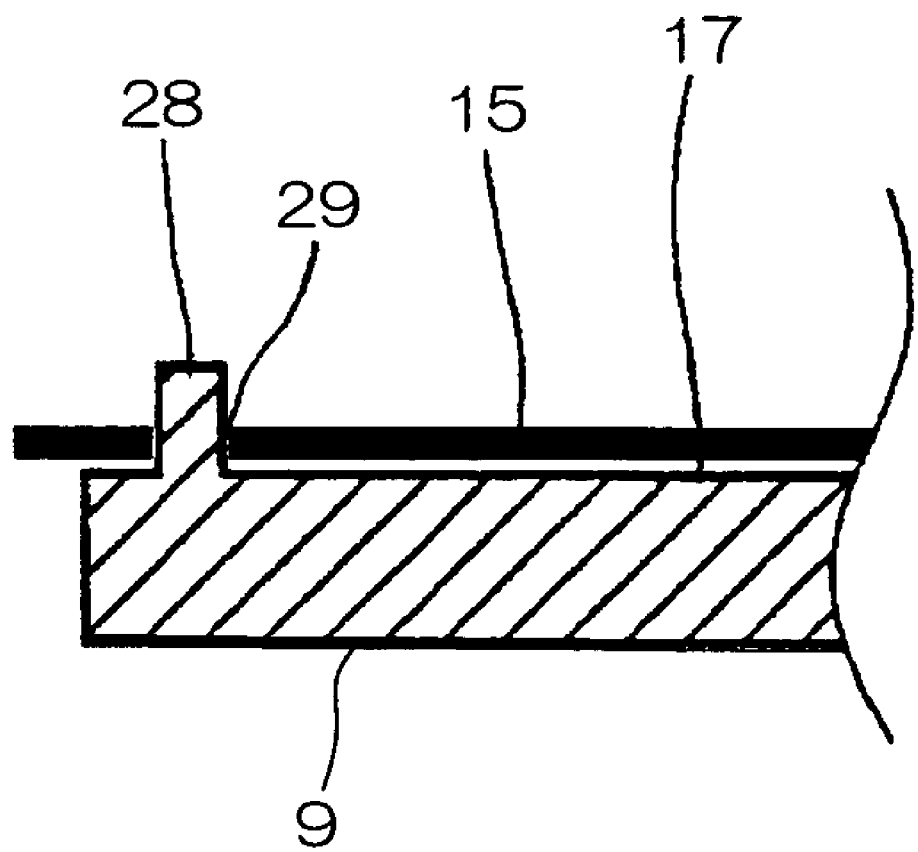
FIG. 28 is a cross-sectional view taken along a line A3-A3 in FIG. 27.

FIGS. 23 to 24 illustrate a configuration in which projections 27 are provided on three sides of the mounting surface 17 of the opening/closing section 9. This configuration allows the disposable filter 15 to be reliably and easily positioned on the upstream side of the filter 14 without shifting the position thereof because the position of the disposable filter 15 is easily determined by abutting the outer periphery of the disposable filter 15 against the projections 27 on the three sides.

FIGS. 25 to 31 illustrate a configuration in which a projection 28 for regulating the position of the disposable filter 15 is provided on the mounting surface 17 of the opening/closing section 9, and the disposable filter 15 is provided with a hole 29 that is engaged with the projection 28.

FIGS. 25 to 28 illustrate a configuration in which project ions 28 are provided at two positions (two corners) of the mounting surface 17 of the opening/closing section 9, and holes 29 are provided at two positions (two corners) of the disposable filter 15.

This configuration allows the disposable filter 15 to be reliably positioned on the upstream side of the filter 14 without shifting the position thereof because the position of the disposable filter 15 is determined by engaging the holes 29 at two positions of the disposable filter 15 with the projections 28 at two positions of the opening/closing section 9.

Figure 29:
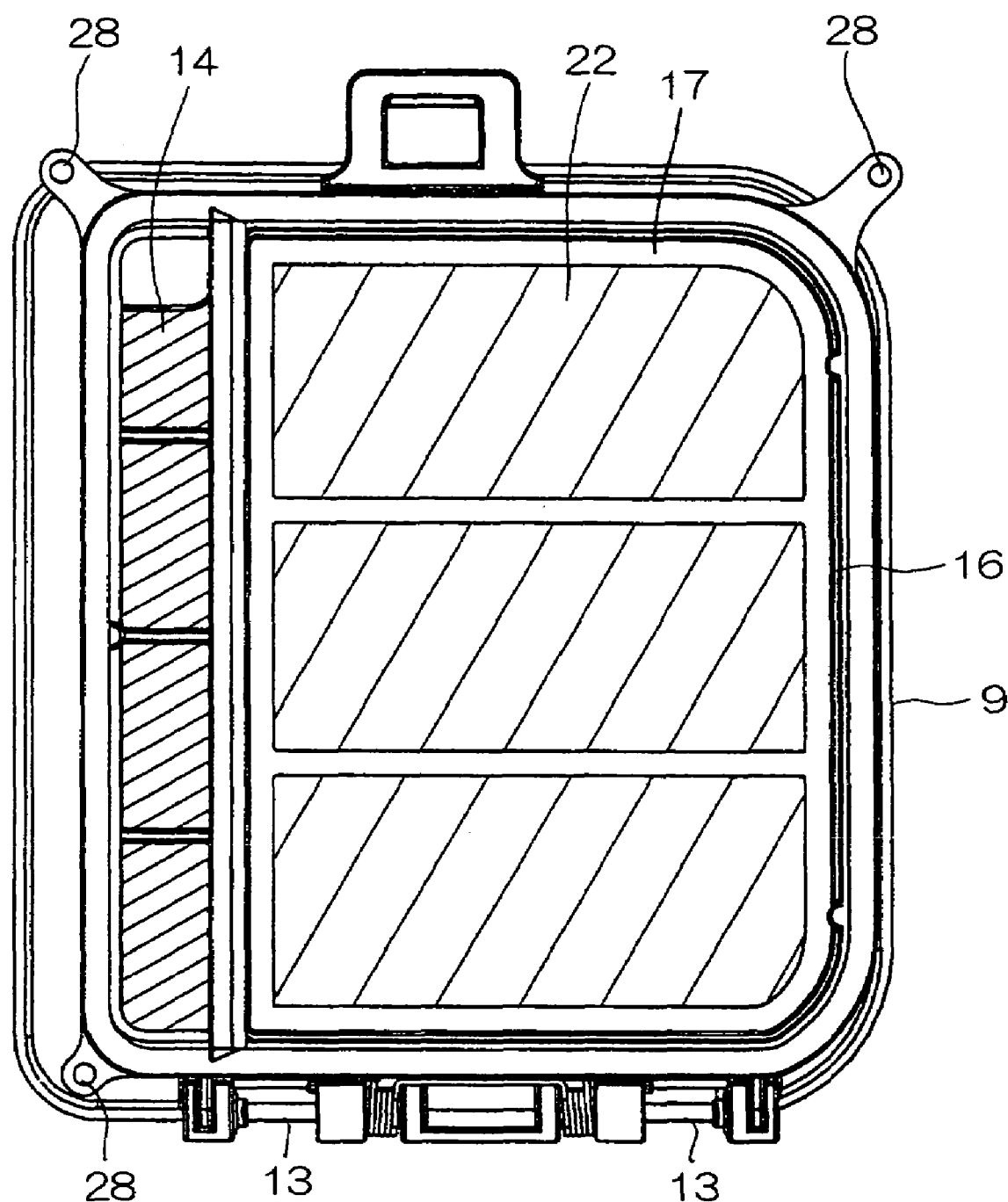
FIG. 29 is a plan view of the opening/closing section in the dust collecting section in the electric vacuum cleaner, showing a still further modified example.
Figure 30:
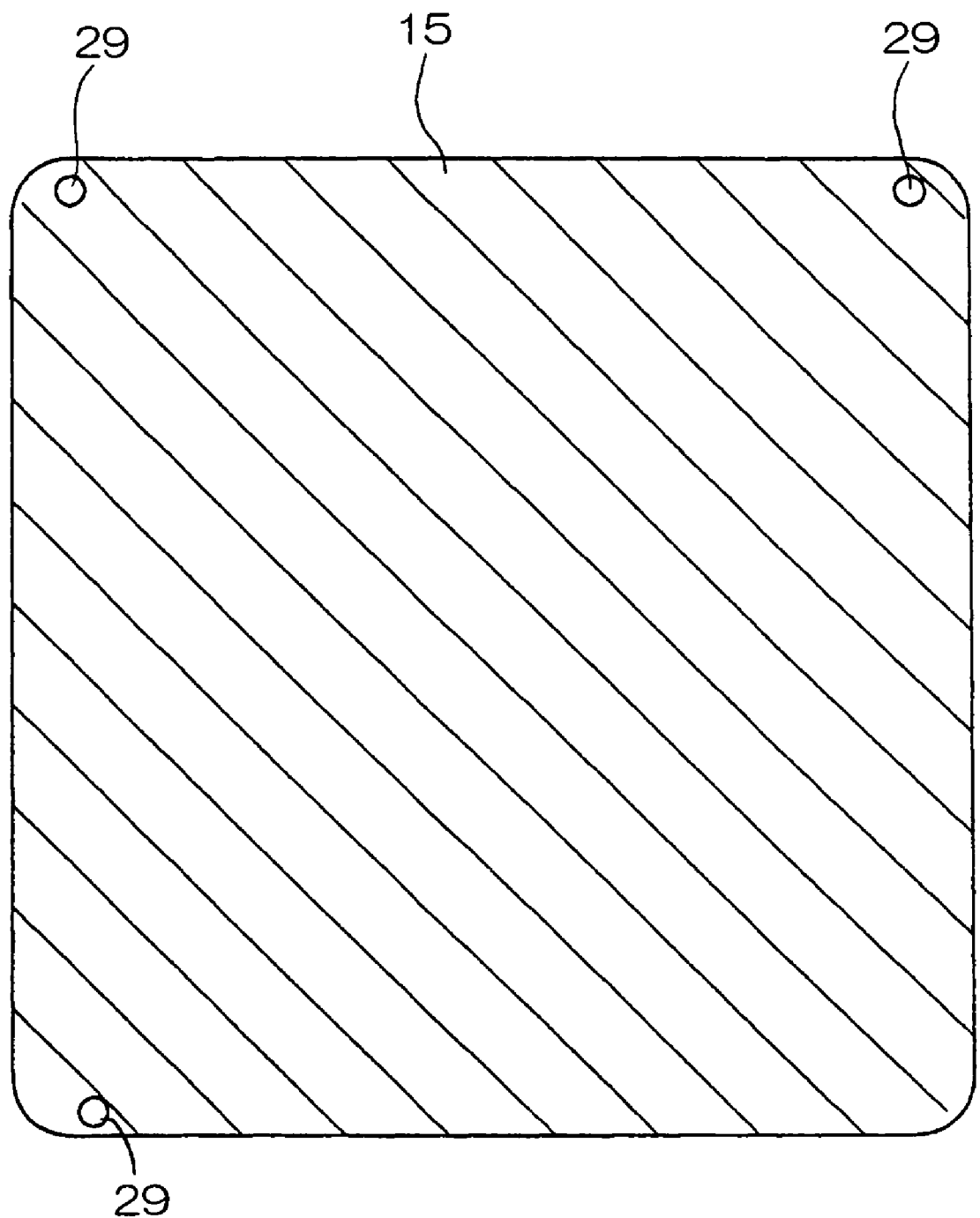
FIG. 30 is a plan view of the disposable filter in the dust collecting section in the electric vacuum cleaner.
Figure 31:
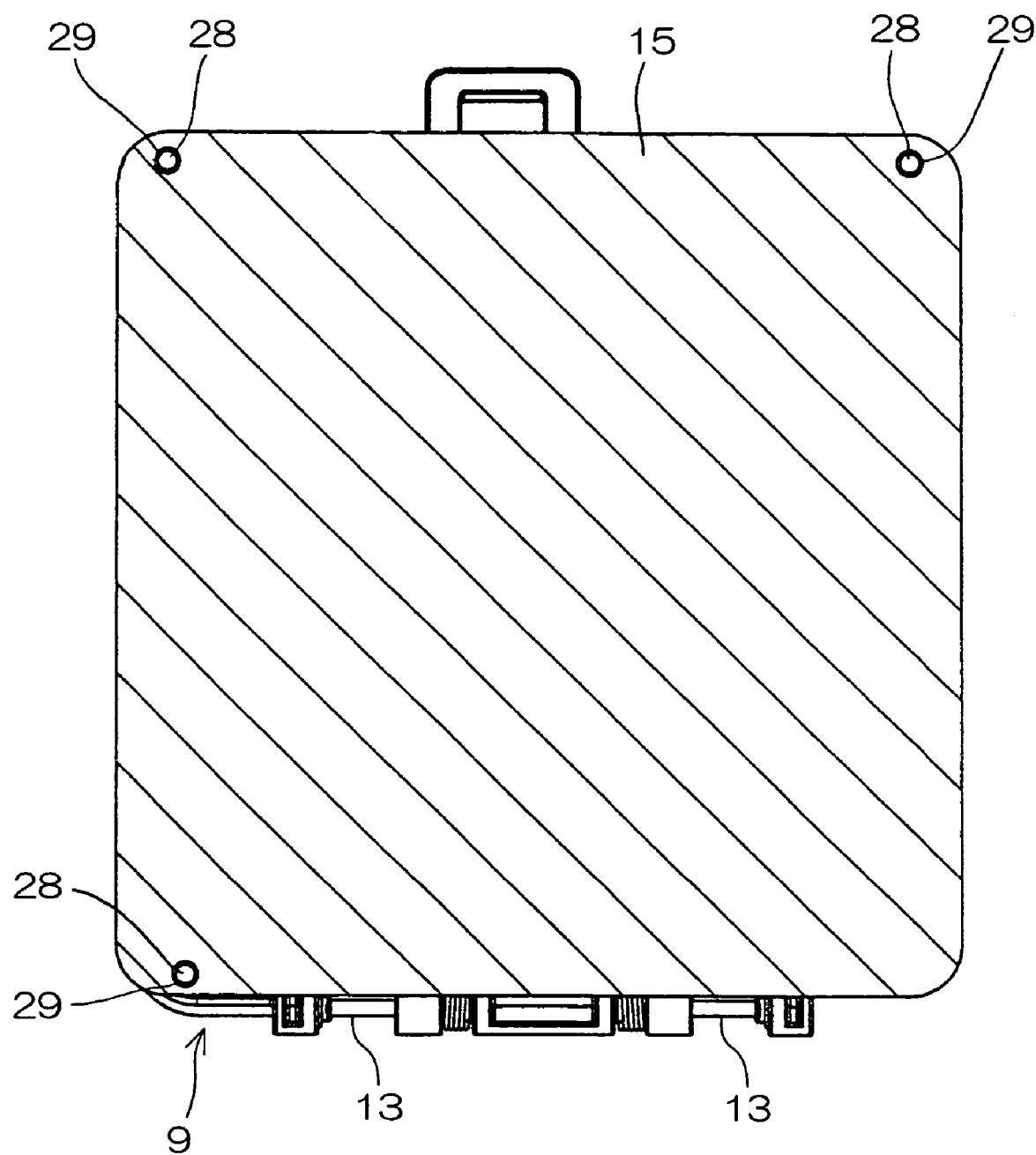
FIG. 31 is a plan view showing a state where the disposable filter is mounted on the opening/closing section in the dust collecting section in the electric vacuum cleaner.

FIGS. 29 to 31 illustrate a configuration in which projections 28 are provided at three positions (three corners) of the mounting surface 17 of the opening/closing section 9, and holes 29 are provided at three positions (three corners) of the disposable filter 15.

This configuration allows the disposable filter 15 to be reliably and easily positioned on the upstream side of the filter 14 without shifting the position thereof because the position of the disposable filter 15 is easily determined by engaging the holes 29 at three positions of the disposable filter 15 with the projections 28 at three positions of the opening/closing section 9. Further, this configuration allows the forward/backward directionality of the disposable filter 15 to be regulated.

Fourth Embodiment

FIGS. 32 to 35 illustrate a fourth embodiment of the present invention. The same constituent elements as those in the first to third embodiments are assigned the same reference numerals and hence, the description thereof is not repeated.

In the fourth embodiment, a filter frame 30 rotatably held by a rotating shaft 13 is provided on the upstream side of an opening/closing section 9. A disposable filter 15 is detachably mounted on the filter frame 30. A filter pressing section 32 is rotatably held by a shaft 31 extending parallel to the rotating shaft 13 at a front end, on the opposite side of the rotating shaft 13, of the filter frame 30. Further, the rotating shaft 13 is arranged on the opposite side of a handle 33 of a dust collecting section 2 (see FIG. 32).

Figure 33:
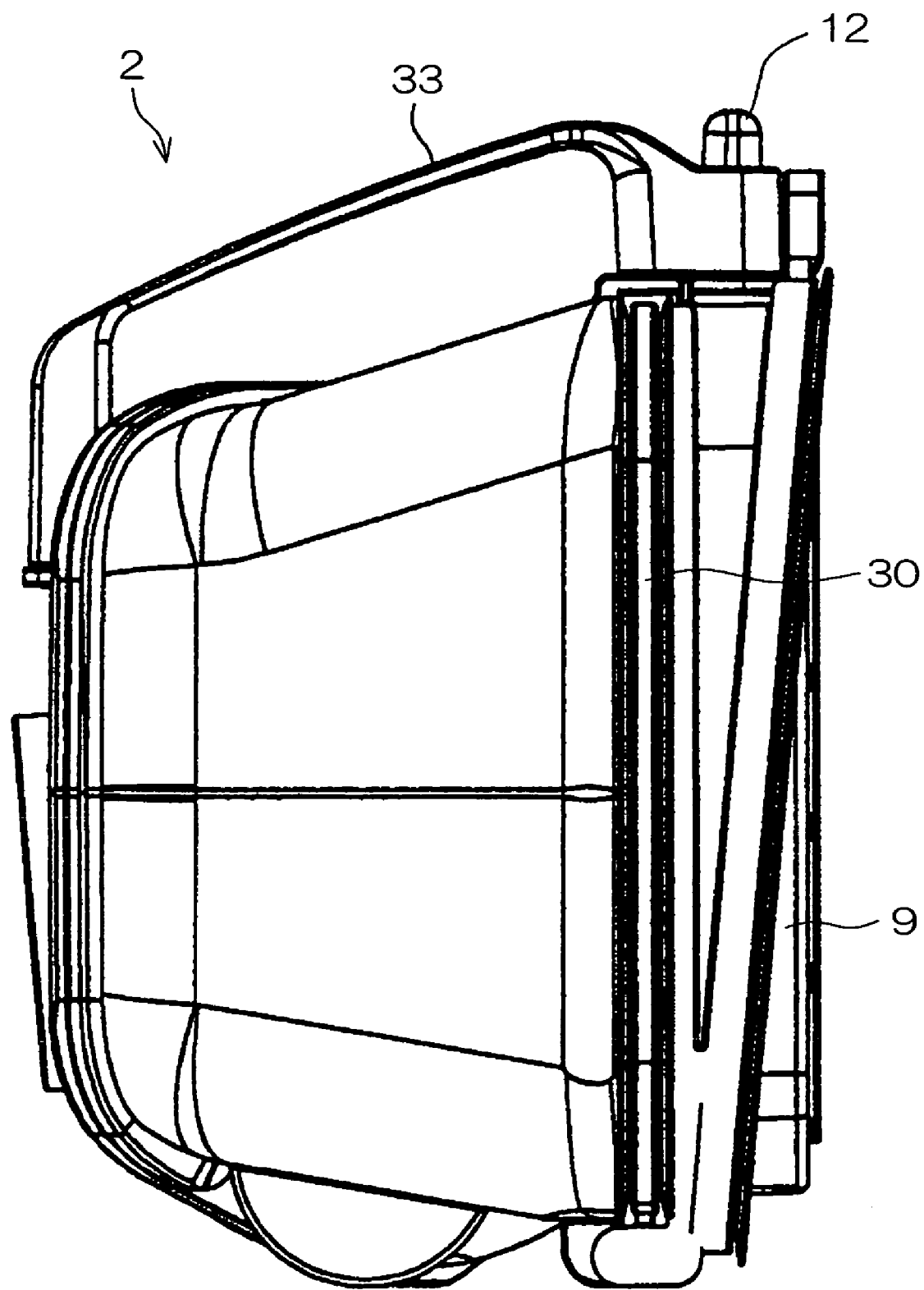
FIG. 33 is a side view of the dust collecting section in the electric vacuum cleaner.
Figure 34:
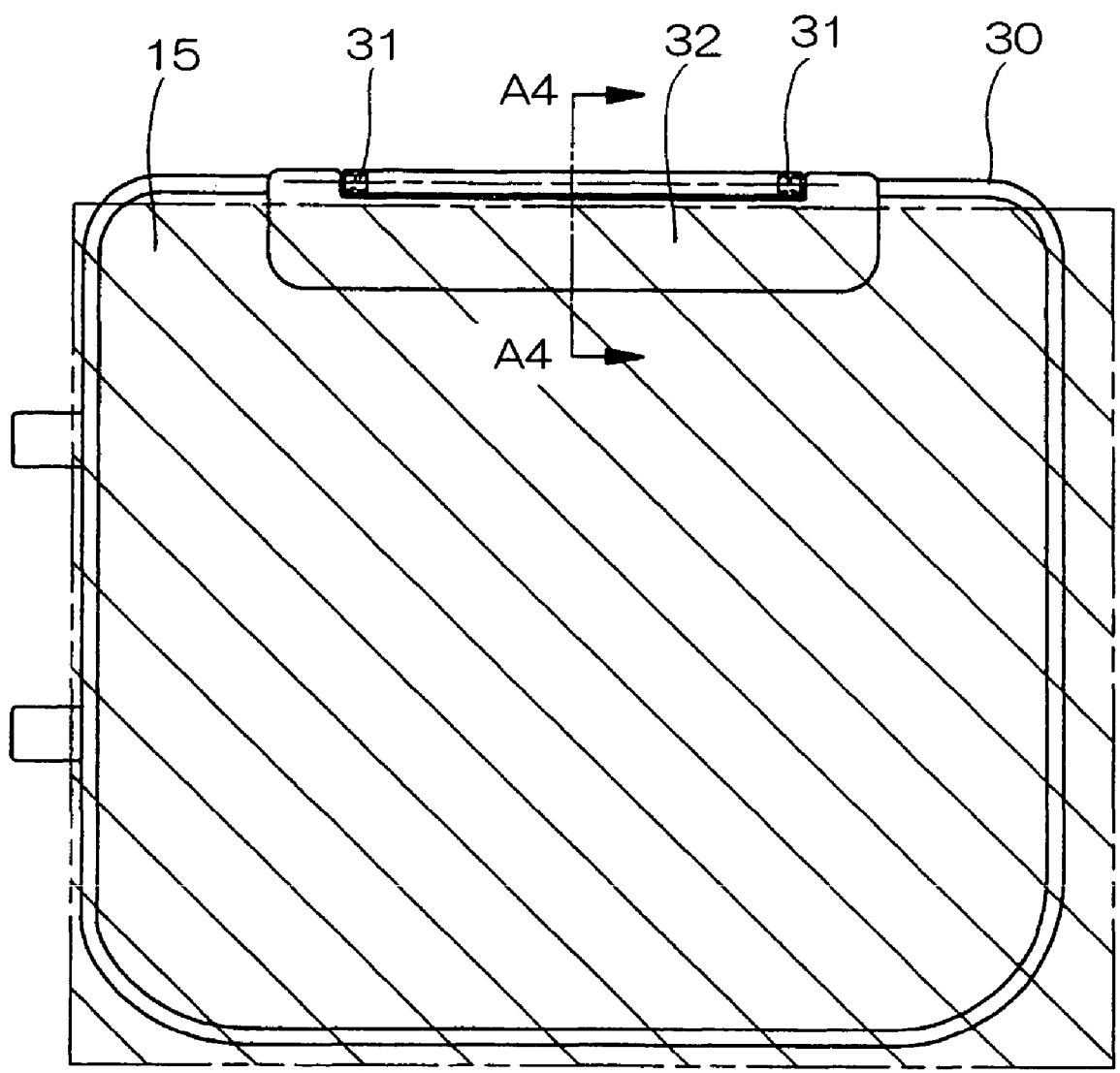
FIG. 34 is a plan view of a filter frame in the dust collecting section in the electric vacuum cleaner.
Figure 35:
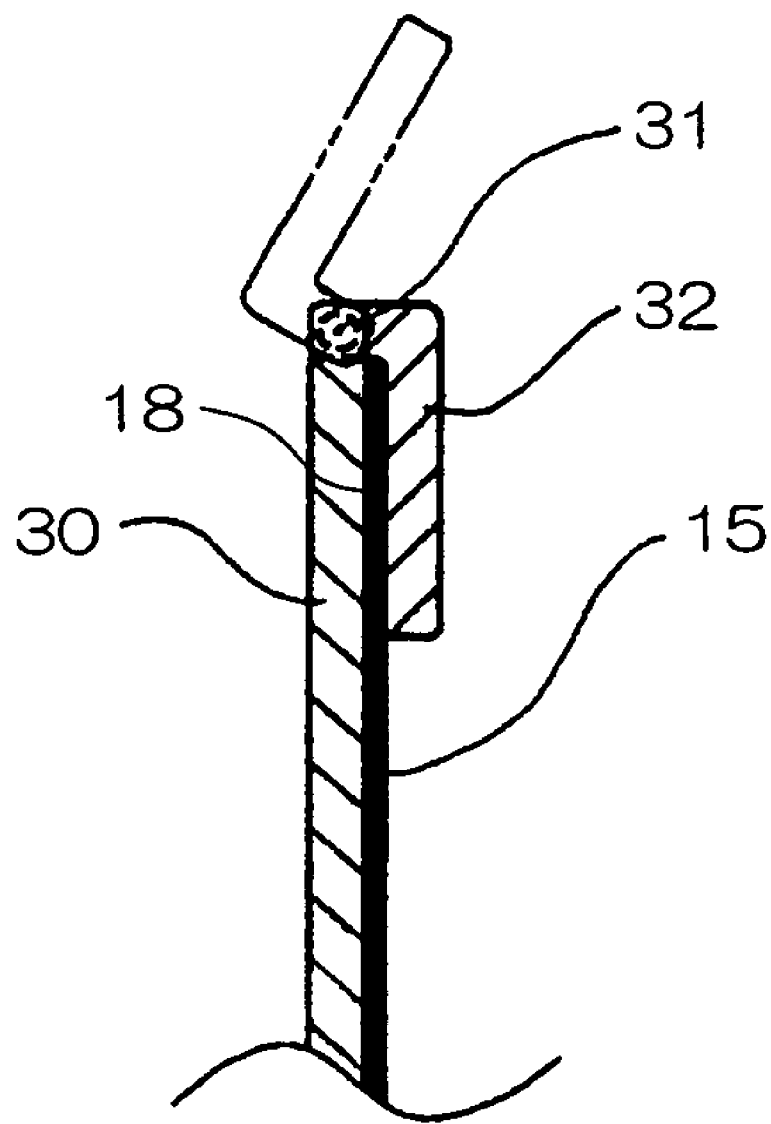
FIG. 35 is a cross-sectional view taken along a line A4-A4 in FIG. 34.

In the dust collecting section 2 thus configured, the disposable filter 15 is arranged in the filter frame 30, and the filter pressing section 32 is rotated to hold a peripheral edge 18 of the disposable filter 15 between the filter pressing section 32 and the filter frame 30 so that the disposable filter 15 is mounted. As shown in FIG. 33, the filter frame 30 is held between the opening/closing section 9 and the dust collecting section 2, and the filter pressing section 32 in the filter frame 30 is fixed with the peripheral edge 18 of the disposable filter 15 held. As a result, the deposition of dust on a filter 14 can be restrained by the disposable filter 15, thereby allowing the life of the filter 14 to be extended.

Figure 32:
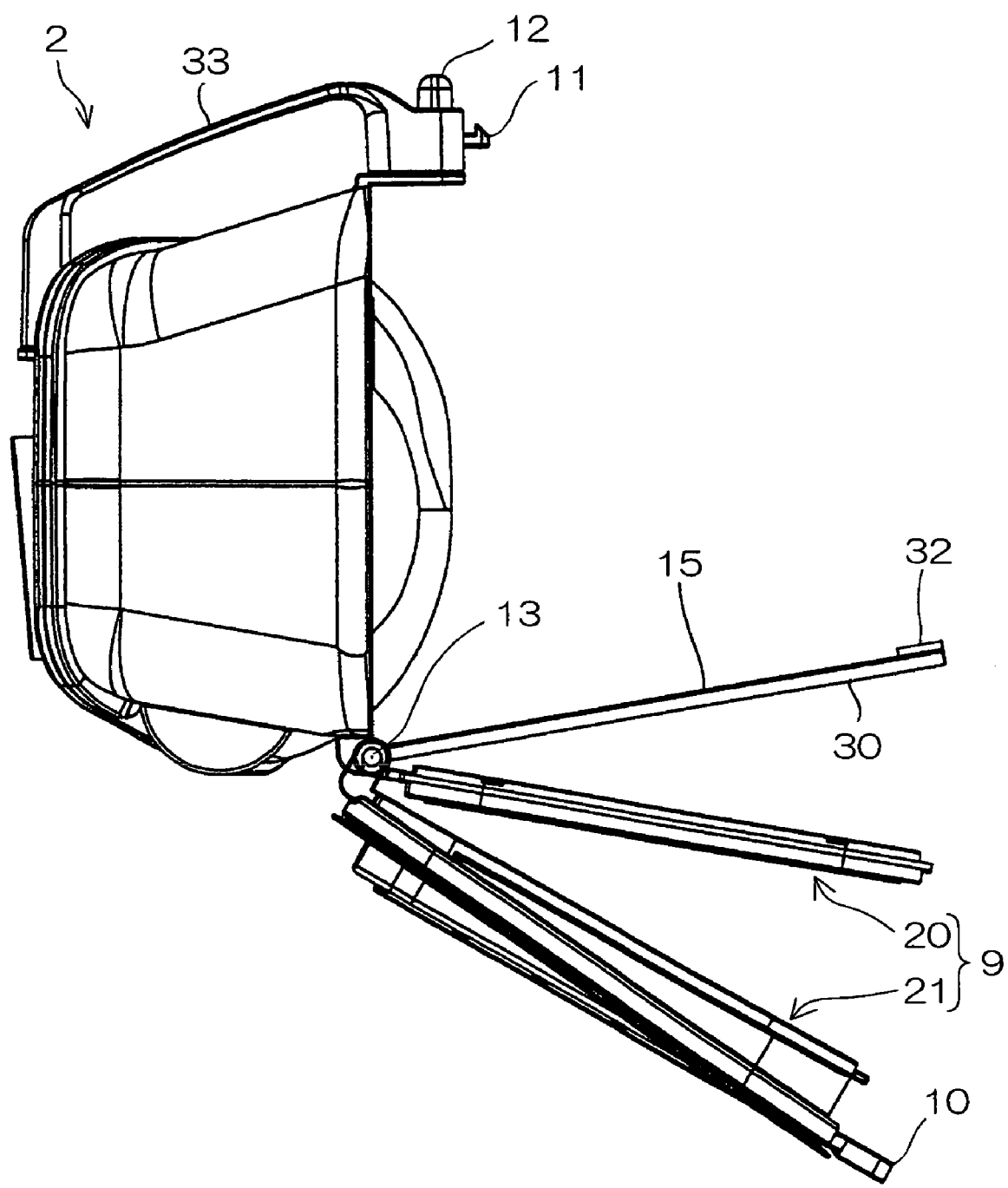
FIG. 32 is a side sectional view of a dust collecting section in an electric vacuum cleaner according to a fourth embodiment of the present invention, showing an expanded state.

When the dust stored in a dust collecting chamber 8 is discarded, the filter frame 30 is also opened when the opening/closing section 9 is opened. At this time, the handle 33 is positioned above, and the rotating shaft 13 is positioned below, as shown in FIG. 32. Therefore, the filter pressing section 32 is rotated in the direction in which the disposable filter 15 is released by gravity, thereby allowing the disposable filter 15, together with dust, to be easily discarded. When the discard of dust is terminated, a new disposable filter 15 may be mounted on the filter frame 30. At this time, the disposable filter 15 can be easily mounted only by putting the disposable filter 15 on the filter frame 30, thereby allowing the mounting properties of the disposable filter 15 to be improved.

Figure 36:
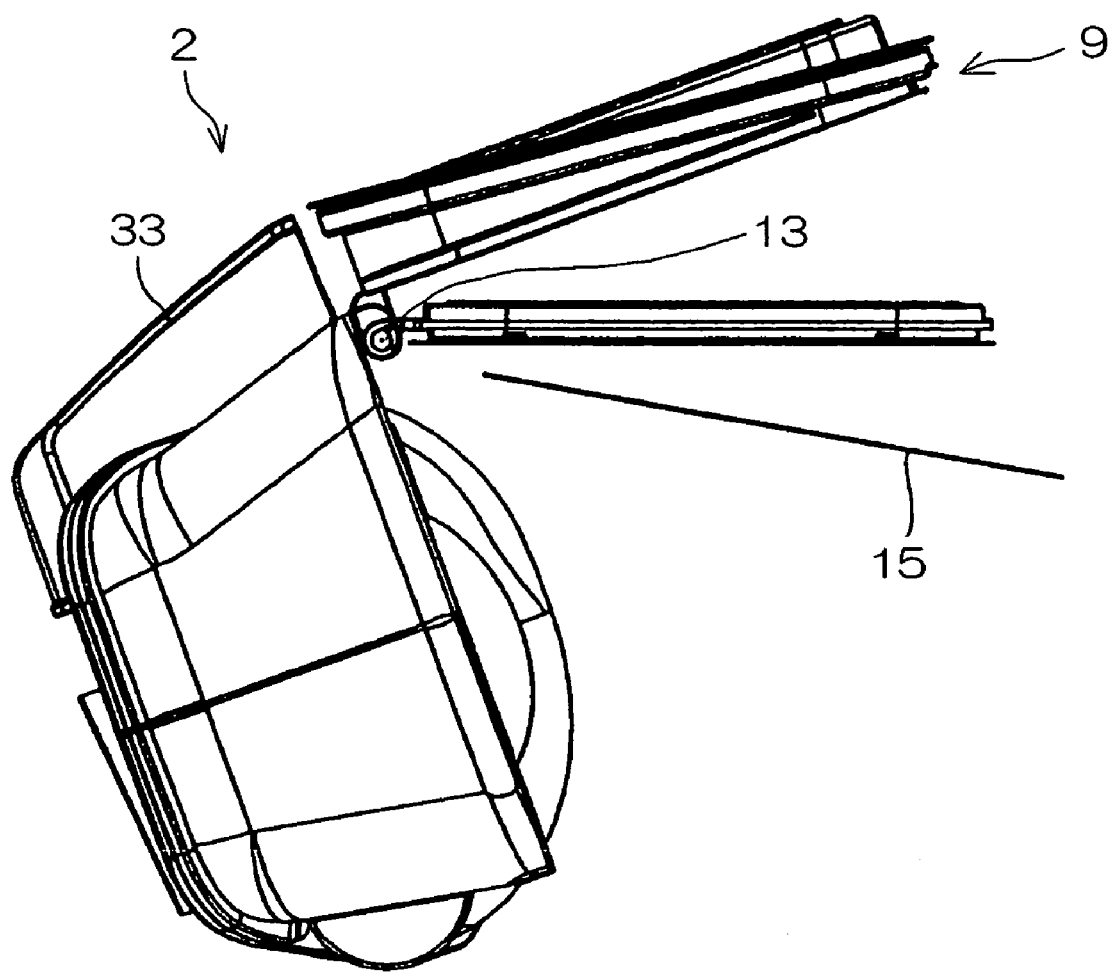
FIG. 36 is an exploded side sectional view of the dust collecting section in the electric vacuum cleaner, showing a modified example.

In the fourth embodiment, the rotating shaft 13 may be arranged on the side of the handle 33, as shown in FIG. 36. This configuration prevents an opening/closing section 9 or the like from being an obstacle when dust is discarded, thereby improving dust discarding workability.

Figure 37:
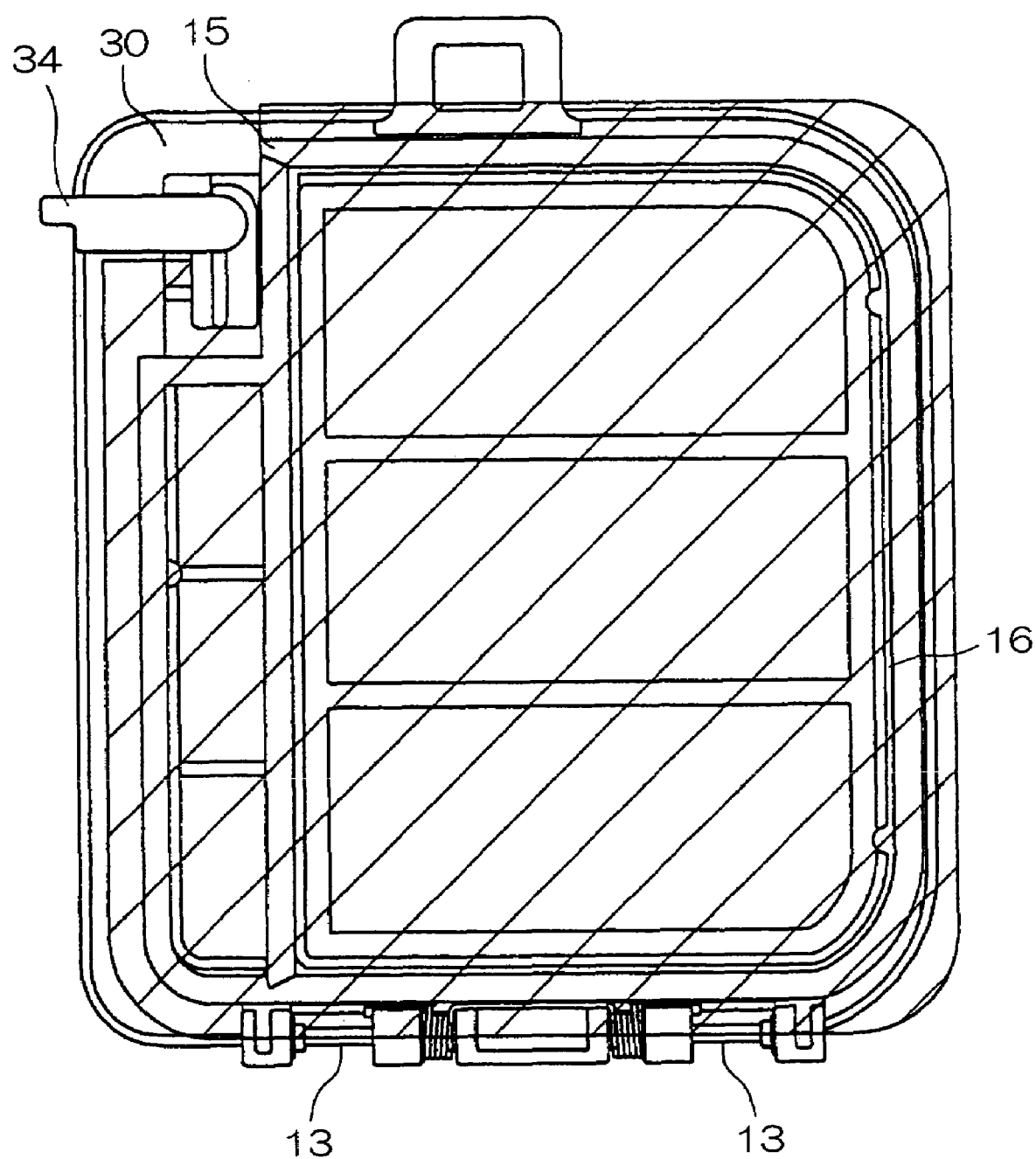
FIG. 37 is a plan view of another modified example of the filter frame in the dust collecting section in the electric vacuum cleaner, showing a state where a disposable filter is held.
Figure 38:
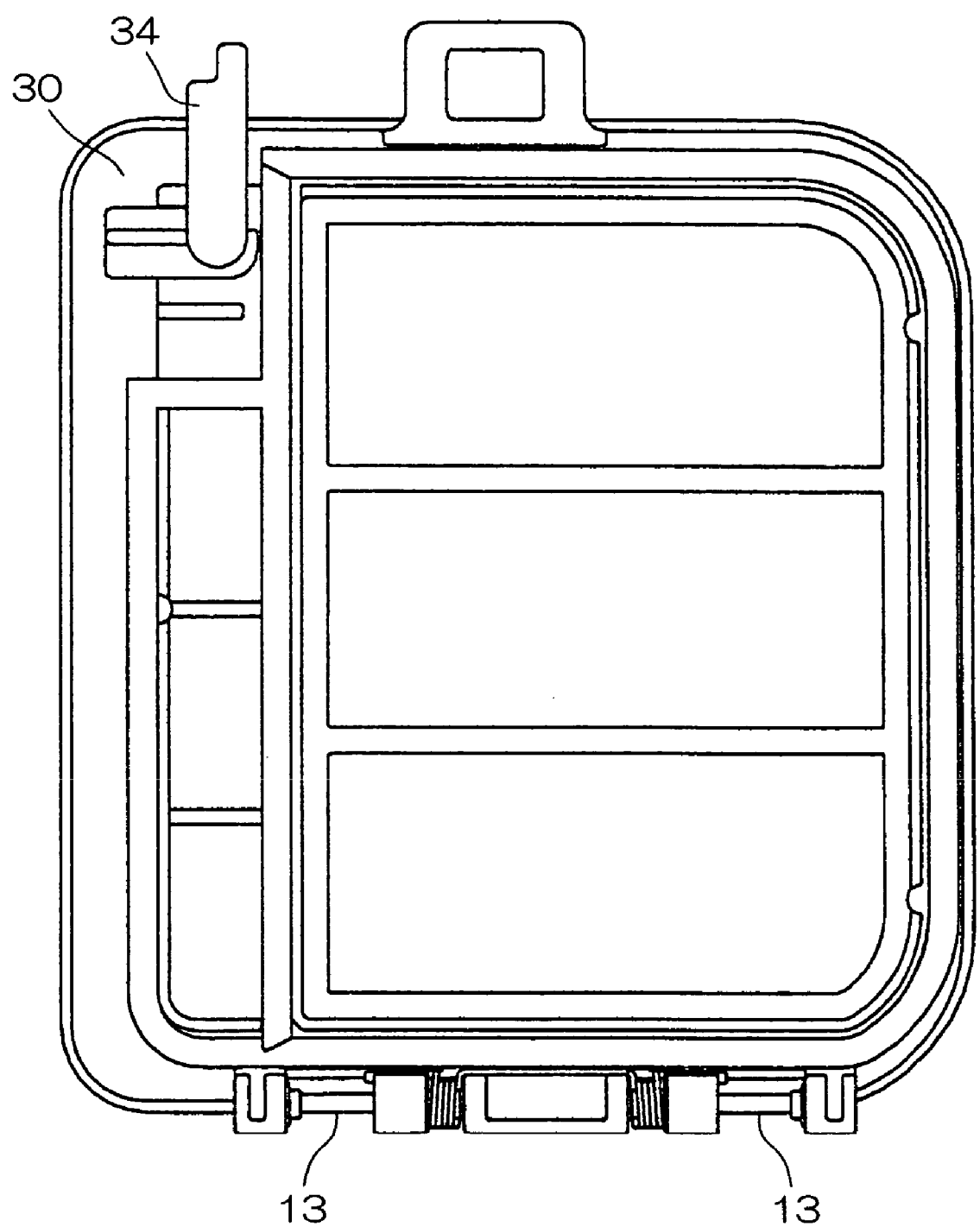
FIG. 38 is a plan view of still another modified example of the filter frame in the dust collecting section in the electric vacuum cleaner, showing a state where a disposable filter is released.
Figure 39:
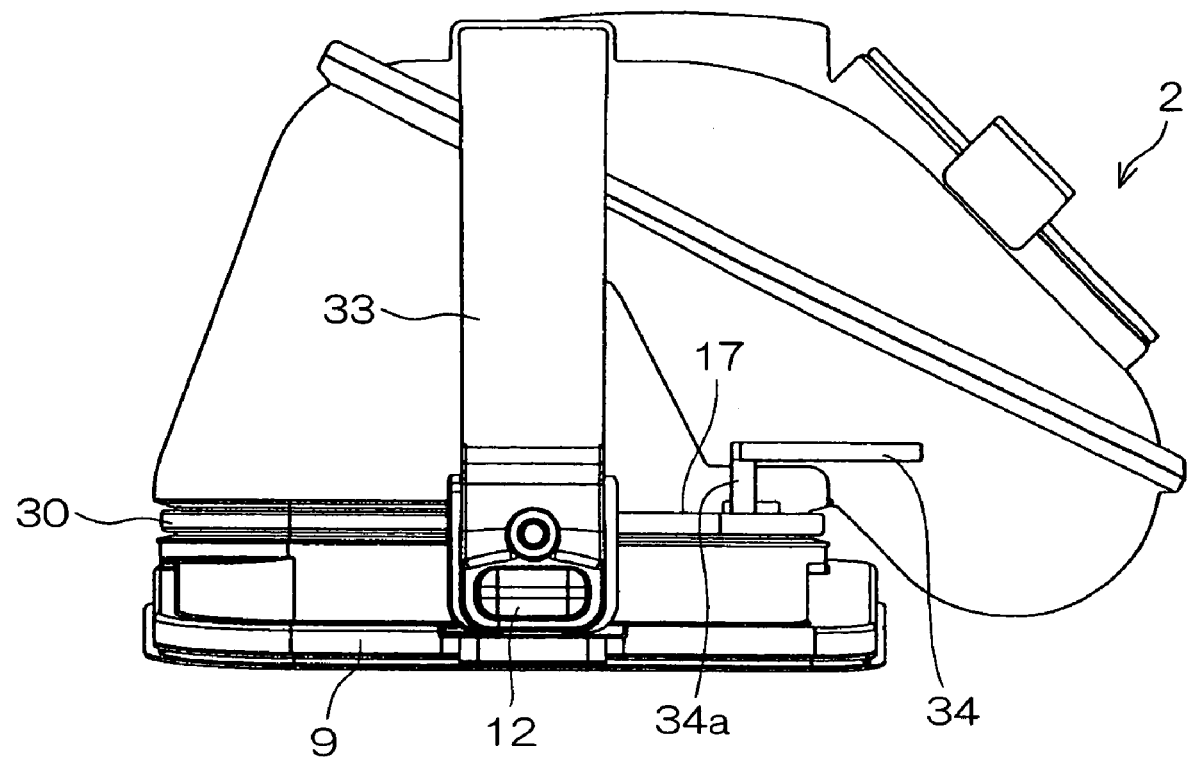
FIG. 39 is a plan view of another modified example of the dust collecting section in the electric vacuum cleaner.

In the fourth embodiment, the disposable filter 15 may be formed detachably by a lever 34, as shown in FIGS. 37 to 39.

The lever 34 is rotatably arranged, in the vicinity of an operation section 12 on a surface of the upstream side (on the front side) of the filter frame 30, around a rotating shaft 34a formed at its end. The disposable filter 15 is held, as shown in FIG. 37, when the lever 34 is rotated in one direction (in a counterclockwise direction in FIGS. 37 and 38), while being released, as shown in FIG. 38, when it is rotated in the other direction (in a clockwise direction in FIGS. 37 and 38), as shown in FIG. 38.

This configuration can prevent, in a case where dust is discarded, the disposable filter 15 from being discarded unless the lever 34 is operated with the disposable filter 15 held when there is relatively little dirt on the disposable filter 15. When the disposable filter 15 is discarded, the disposable filter 15 may be released by operating the lever 34.

In such a manner, the possibility that the disposable filter 15 which can be still used is discarded can be prevented only by operating the lever 34, thereby allowing the usability to be improved. Further, the lever 34 is arranged in the vicinity of the operation section 12, as shown in FIG. 39, so that the operations of the lever 34 and the operation section 12 can be performed with one hand, thereby allowing the operability to be improved.

Fifth Embodiment

FIGS. 40 to 48 illustrate a fifth embodiment of the present invention. The same constituent elements as those in the first to fourth embodiments are assigned the same reference numerals and hence, the description thereof is not repeated.

As the disposable filter 15 arranged on the upstream side of the filter 14 in the opening/closing section 9, not a ready-made product but a commercially available product, for example, a tissue, is used. Therefore, the peripheral edge 18 of the disposable filter 15 may, in some cases, jut out of the opening/closing section 9. As a result, when the dust collecting section 2 is accommodated in the cleaner main body 1, the peripheral edge 18 of the disposable filter 15 that has jutted out of the opening/closing section 9 may, in some cases, be caught between an inner wall of the cleaner main body 1 and an outer wall of the dust collecting section 2 to damage the disposable filter 15.

On the other hand, in the fifth embodiment, a disposable filter 15 can be prevented from being damaged by a peripheral edge 18 of the disposable filter 15 jutting out of an opening/closing section 9.

Figure 40:
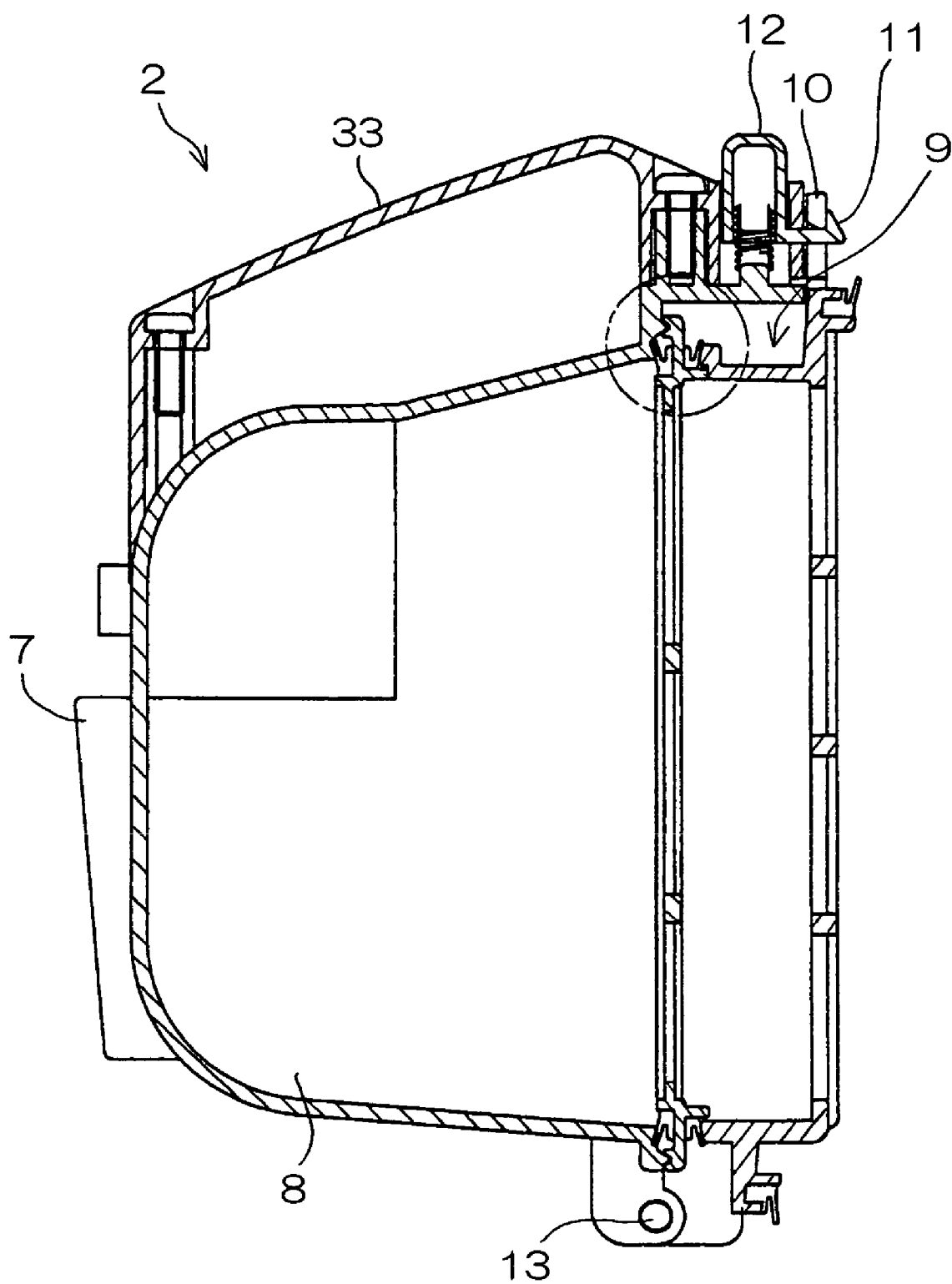
FIG. 40 is a cross-sectional view of a dust collecting section in an electric vacuum cleaner according to a fifth embodiment of the present invention.
Figure 41:
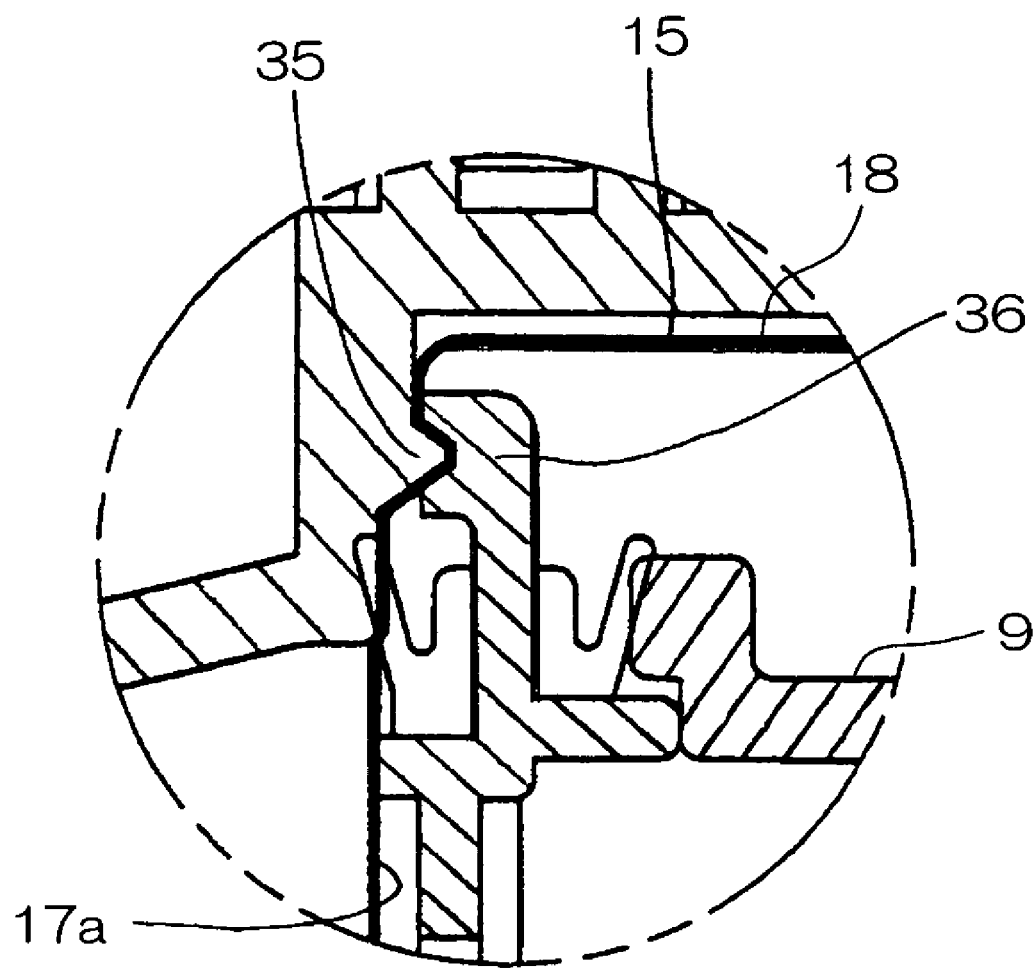
FIG. 41 is a cross-sectional view of a principal part of the dust collecting section in the electric vacuum cleaner, showing a state where a disposable filter has not been cut.
Figure 42:
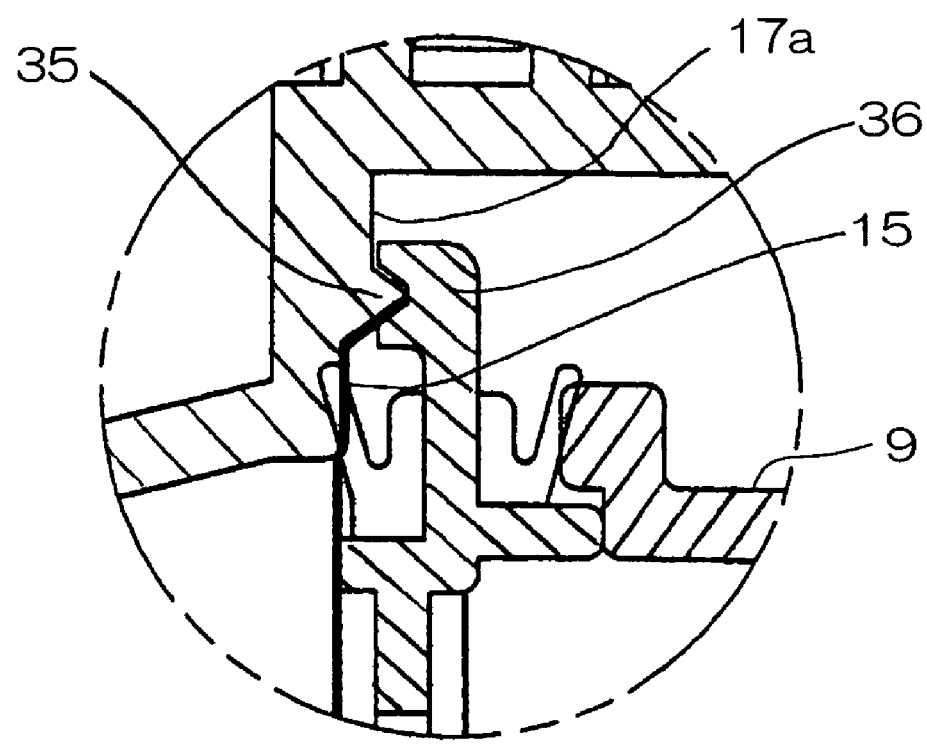
FIG. 42 is a cross-sectional view of a principal part of the dust collecting section in the electric vacuum cleaner, showing a state where the disposable filter has been cut.
Figure 43:
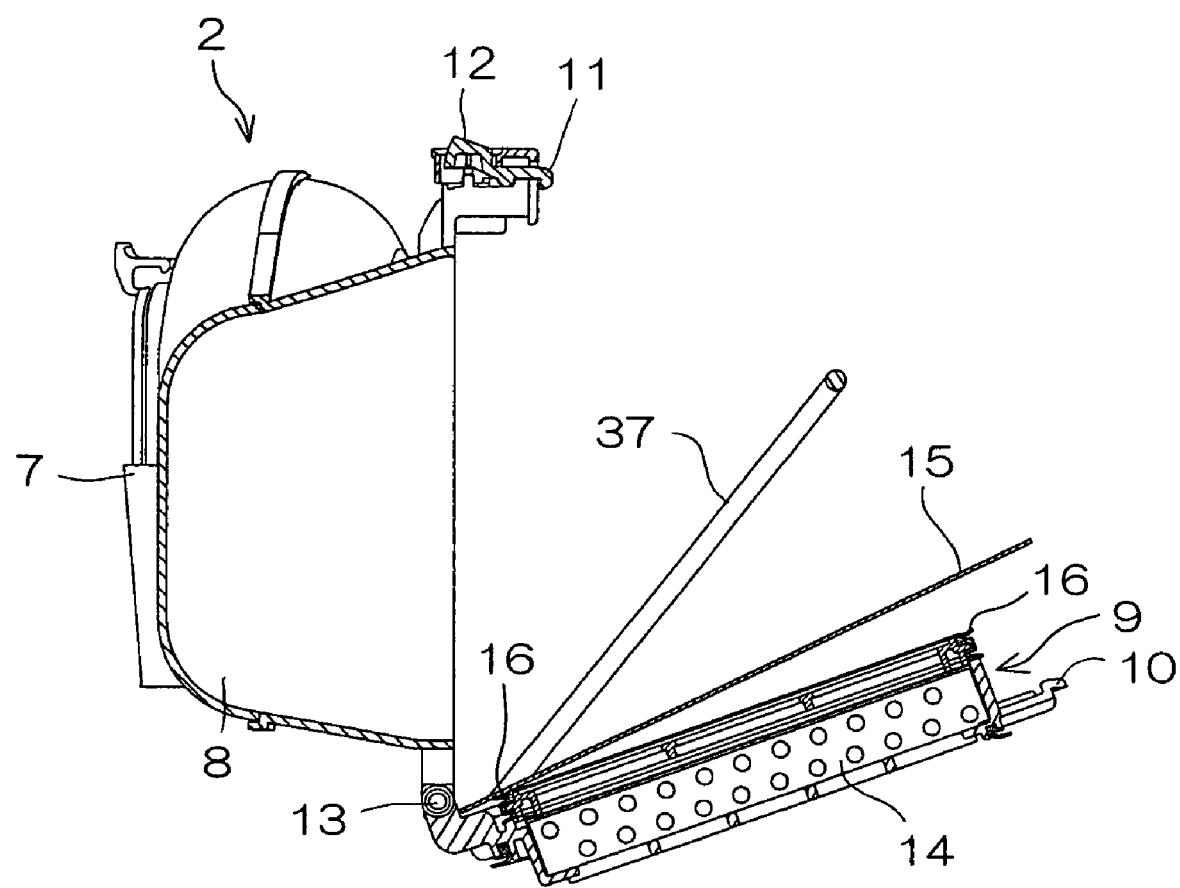
FIG. 43 is an exploded sectional view of the dust collecting section in the electric vacuum cleaner, showing a modified example.
Figure 44:
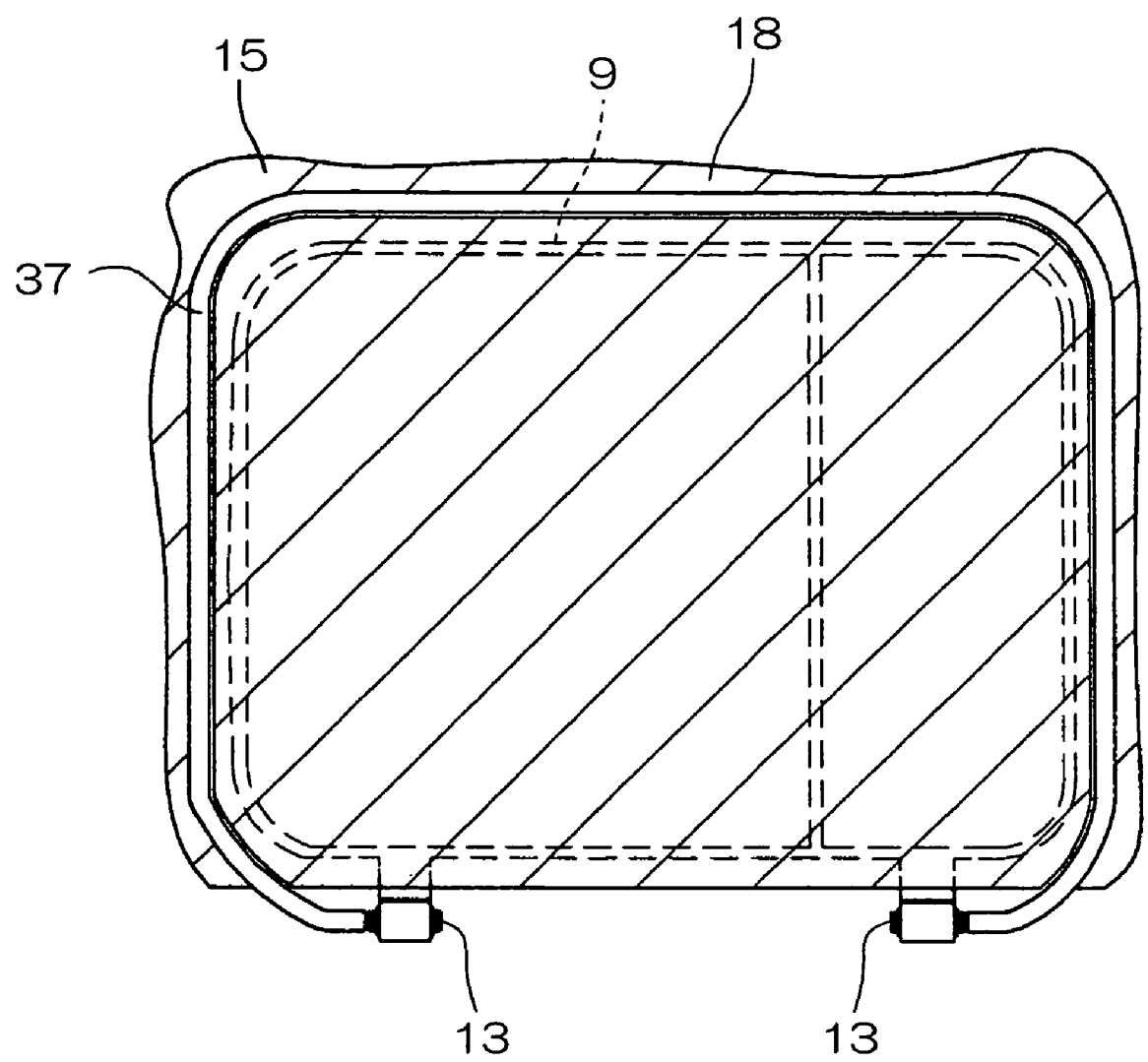
FIG. 44 is a plan view of an opening/closing section in the dust collecting section in the electric vacuum cleaner, showing a state where the disposable filter is held.
Figure 45:
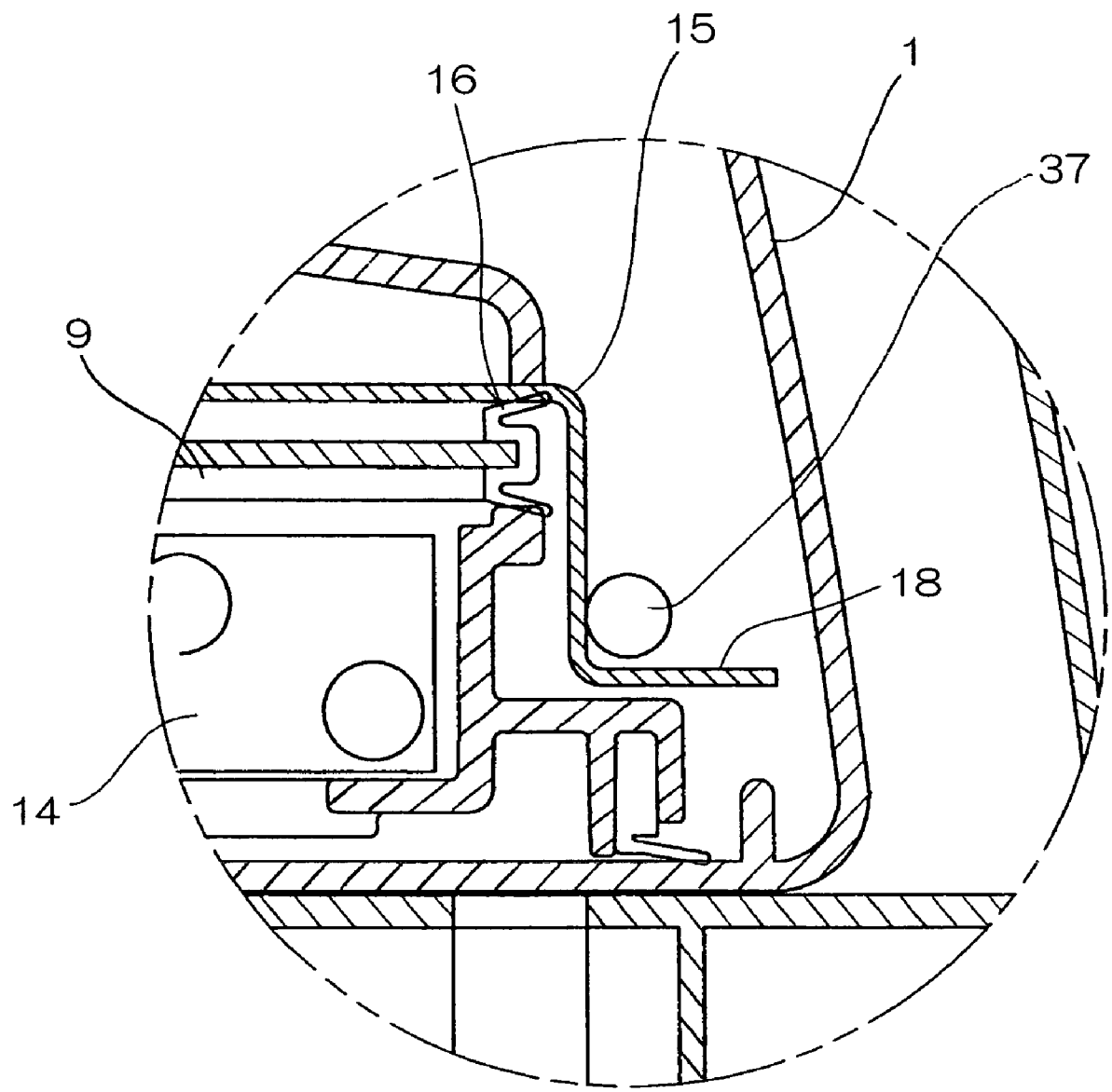
FIG. 45 is a cross-sectional view of the dust collecting section in the electric vacuum cleaner, showing an enlarged state.

FIGS. 40 to 42 illustrate a configuration in which a convex rib 35 that is approximately triangular in cross section is formed on a mounting surface 17a opposed to an opening/closing section 9 in a dust collecting section 2, and a concave section to be engaged 36 that is engaged with the rib 35 is formed in the opening/closing section 9.

This configuration can prevent the disposable filter 15 from being damaged because the peripheral edge 18 of the disposable filter 15 that has jutted out of the opening/closing section 9 can be cut by the rib 35 and the section to be engaged 36 that are engaged with each other (see FIG. 42).

FIGS. 43 to 46 illustrate a configuration in which a frame 37 is rotatably provided between the opening/closing section 9 and a dust collecting chamber 8. The frame 37 is formed in an approximately U shape, and both of its ends extend along a rotating shaft 13. An inner space of the frame 37 is larger than the opening/closing section 9, and is smaller than the disposable filter 15.

This configuration allows the peripheral edge 18 of the disposable filter 15 put on the opening/closing section 9 to be held and fixed by the frame 37, and the peripheral edge 18 of the disposable filter 15 that has jutted out of the opening/closing section 9 can be held in an accommodated state by the frame 37. As a result, the disposable filter 15 can be prevented from being damaged.

Figure 46:
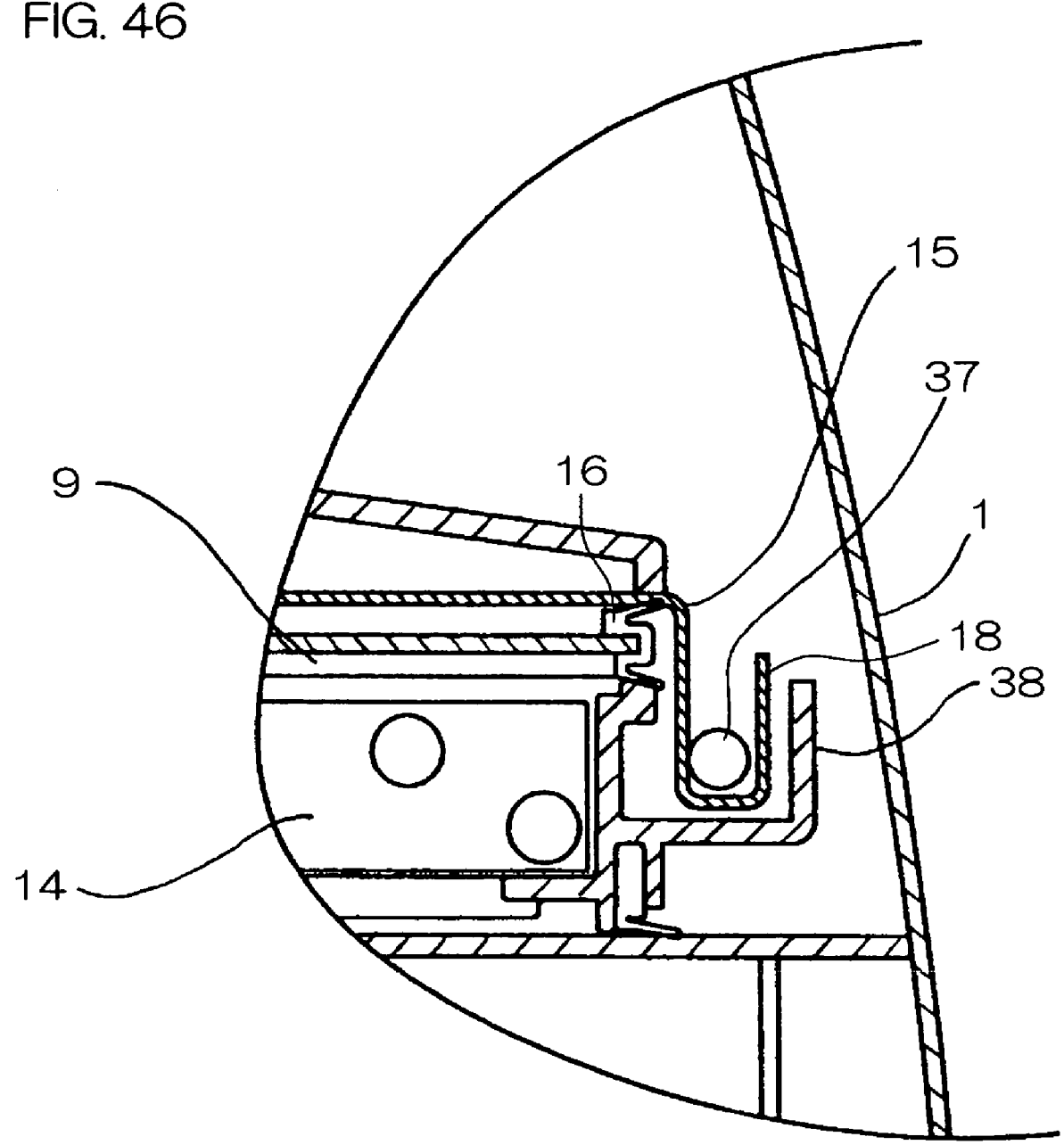
FIG. 46 is a cross-sectional view of another modified example of the dust collecting section in the electric vacuum cleaner, showing an enlarged state.

If a turnup 38 projecting toward the frame 37 (toward the upstream side) is provided at a position opposed to the frame 37 in the opening/closing section 9, as shown in FIG. 46, the peripheral edge 18 of the disposable filter 15 held by the frame 37 can be accommodated inside the turnup 38, thereby making it possible to more reliably prevent the disposable filter 15 from being damaged.

Figure 47:
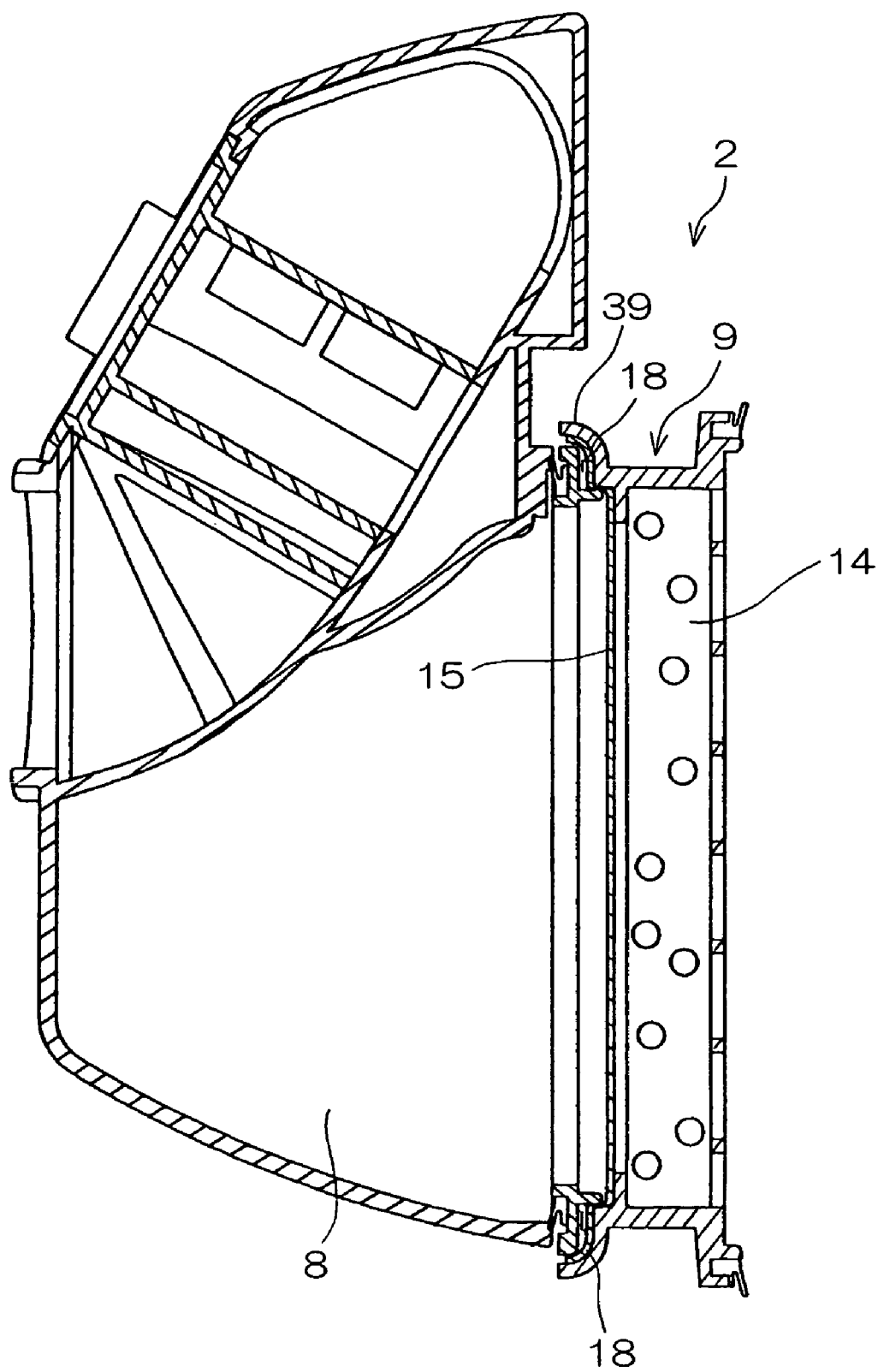
FIG. 47 is a cross-sectional view of the dust collecting section in the electric vacuum cleaner, showing another modified example.
Figure 48:
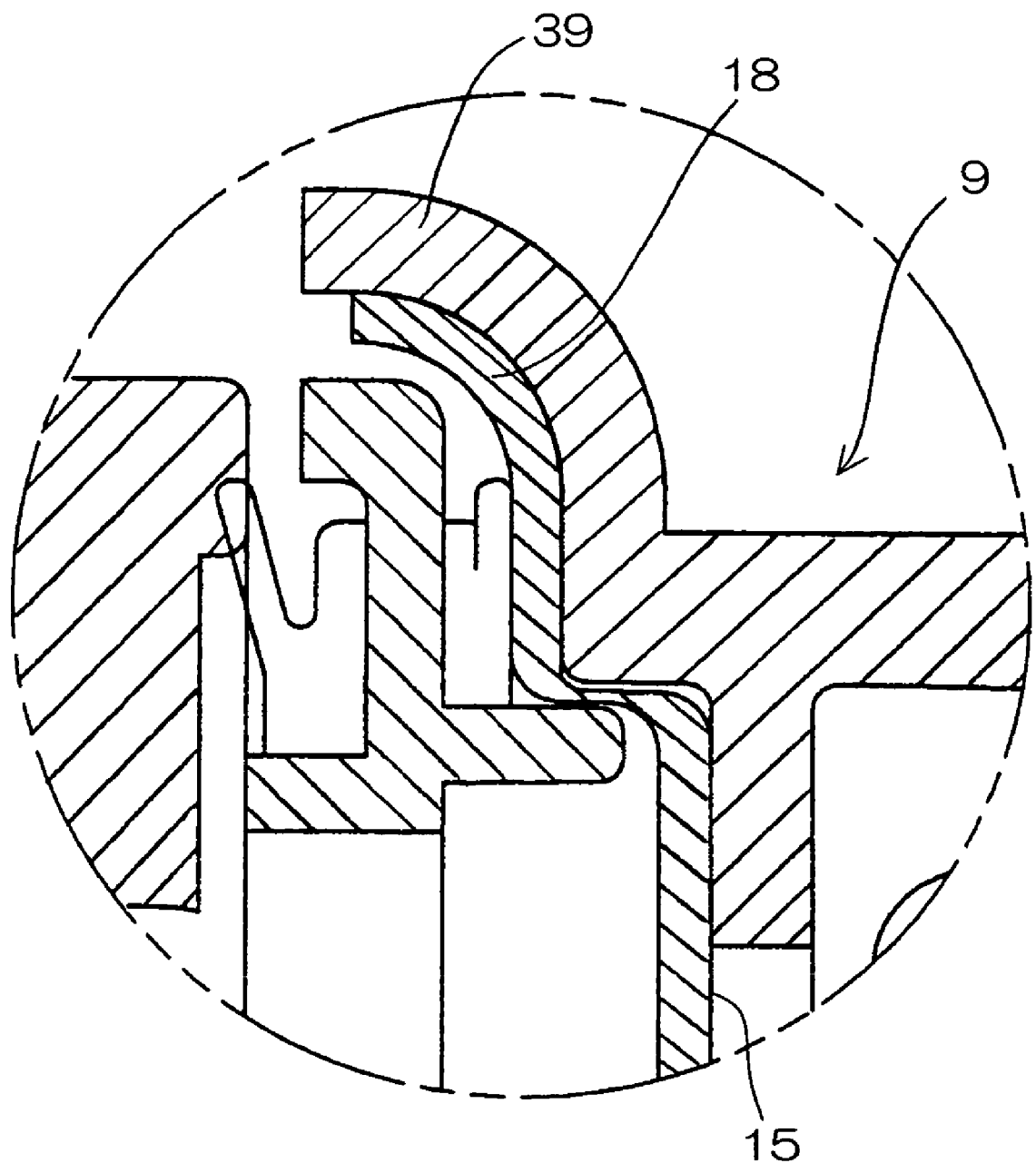
FIG. 48 is a cross-sectional view of still another modified example of the dust collecting section in the electric vacuum cleaner, showing an enlarged state.

FIGS. 47 to 48 illustrate a configuration in which a protection section 39 extending in a curved shape is formed on the side of the disposable filter 15 (on the upstream side) at a position opposed to the peripheral edge 18 of the disposable filter 15 in the opening/closing section 9, and the peripheral edge 18 of the disposable filter 15 that has jutted out of the opening/closing section 9 can be covered with the protection section 39. This configuration can prevent the disposable filter 15 from being damaged.

Sixth Embodiment

Figure 49:
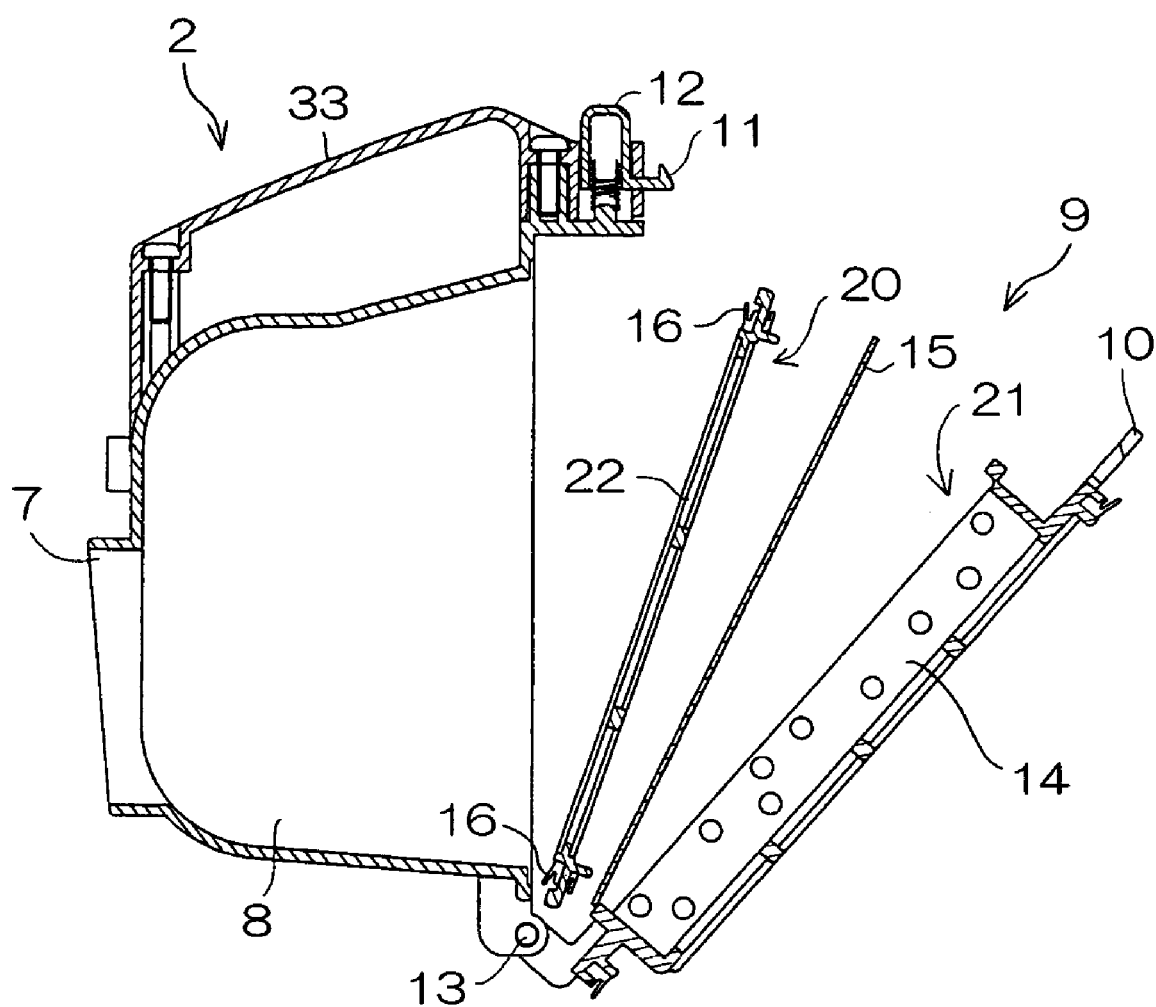
FIG. 49 is an exploded sectional view of a dust collecting section in an electric vacuum chamber according to a sixth embodiment of the present invention.
Figure 50:
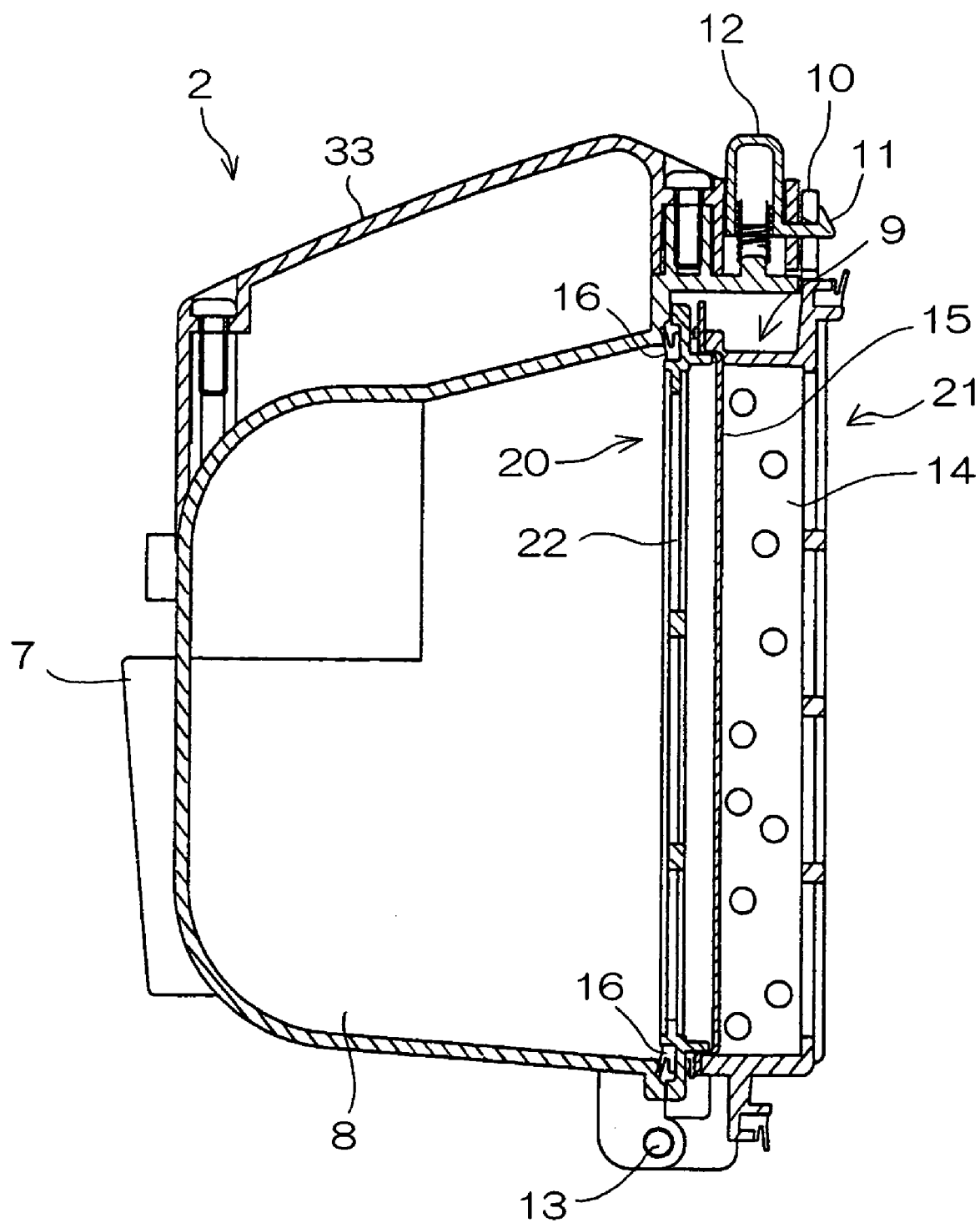
FIG. 50 is a cross-sectional view of the dust collecting section in the electric vacuum cleaner.

FIGS. 49 to 50 illustrate a sixth embodiment of the present invention. The same constituent elements as those in the first to fifth embodiments are assigned the same reference numerals and hence, the description thereof is not repeated.

An opening/closing section 9 in the sixth embodiment is separable into a pre-filter section 20 and a main filter section 21. A coarse-meshed pre-filter 22 is disposed in the pre-filter section 20. A filter 14 composed of urethane or the like is disposed in the main filter section 21. The pre-filter section 20 and the main filter section 21 are rotatable around a rotating shaft 13, and the pre-filter section 20 and the main filter section 21 cover a dust collecting chamber 8 in a state where they are opposed to each other with the opening/closing section 9 closed.

A dust collecting section 2 holds a disposable filter 15 between the pre-filter section 20 and the main filter section 21. The pre-filter section 20 is coarse in order to remove coarse dust. Therefore, the dust adhering to the pre-filter section 20 can be removed. The pre-filter section 20 makes it difficult to clog the disposable filter 15. As a result, the life of the disposable filter 15 can be extended. Further, the dust adhering to the pre-filter section 20 can be easily removed.

Seventh Embodiment

Figure 51:
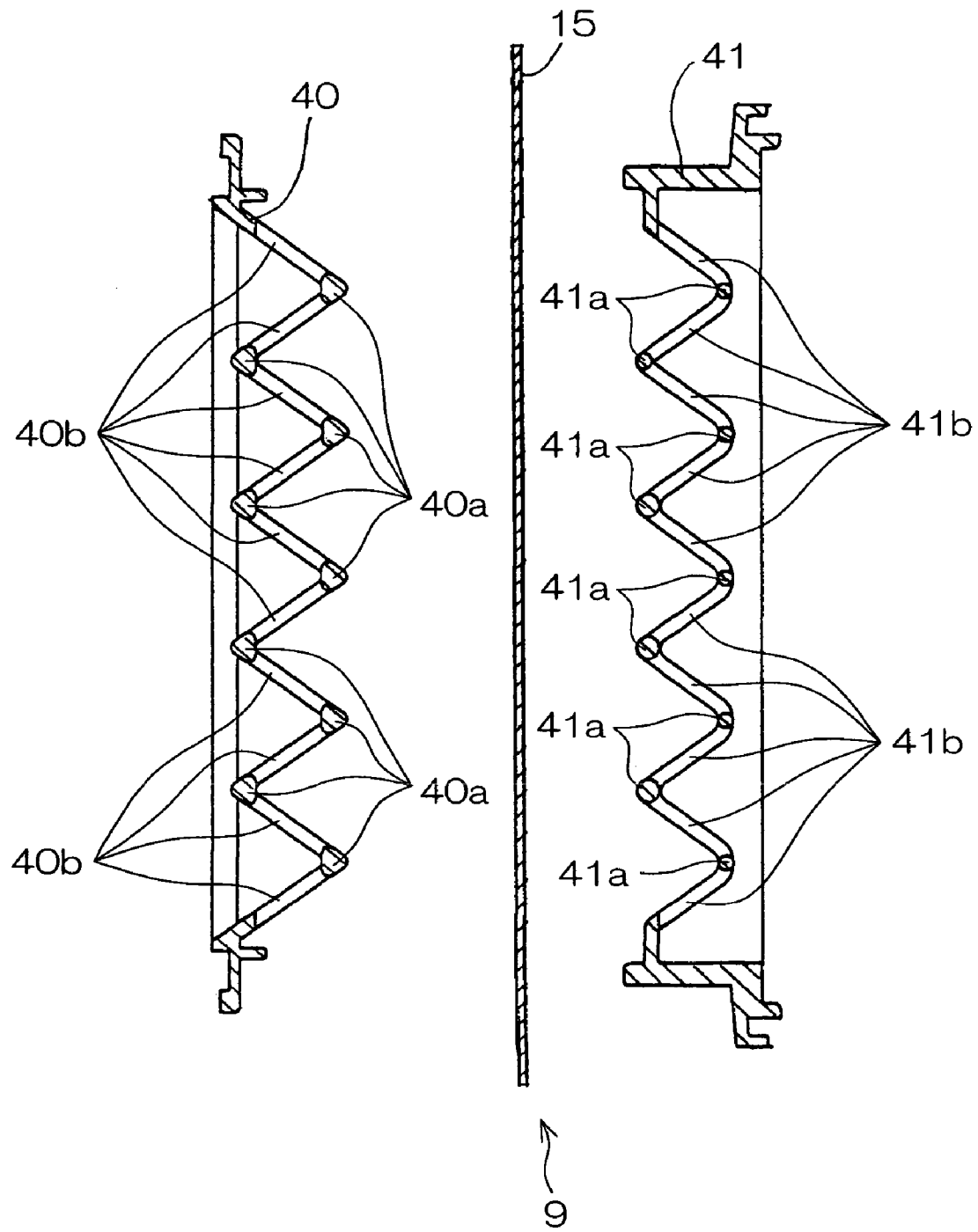
FIG. 51 is an exploded sectional view of an opening/closing section in a dust collecting section in an electric vacuum chamber according to a seventh embodiment of the present invention.
Figure 52:
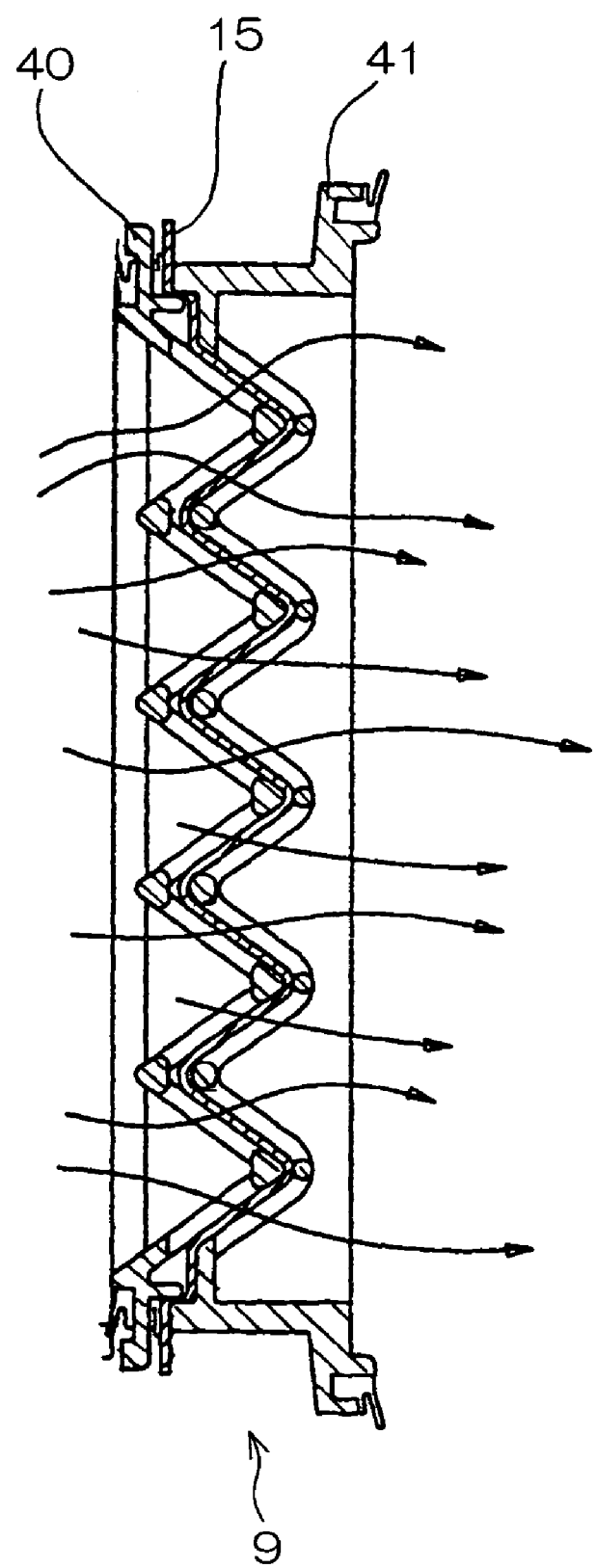
FIG. 52 is a cross-sectional view of the opening/closing section in the dust collecting section in the electric vacuum cleaner, showing a state where a disposable filter is held.

FIGS. 51 to 52 illustrate a seventh embodiment of the present invention. The same constituent elements as those in the first to sixth embodiments are assigned the same reference numerals and hence, the description thereof is not repeated.

An opening/closing section 9 in the seventh embodiment is separable into a front opening/closing section 40 and a rear opening/closing section 41. The opening/closing section 9 holds a disposable filter 15 between the front opening/closing section 40 and the rear opening/closing section 41 to form the disposable filter 15 in a pleated shape.

As shown in FIG. 51, the front opening/closing section 40 is formed in the shape of a wave having a plurality of bent portions 40a, and a through hole 40b is formed between the bent portions 40a. Further, the rear opening/closing section 41 is formed in the shape of a wave having a plurality of bent portions 41a corresponding to the bent portions 40a of the front opening/closing section 40, and a through hole 41b is formed between the bent portions 41a.

As a result, the disposable filter 15 has a pleated shape along the shapes of the front opening/closing section 40 and the rear opening/closing section 41 by being held between the front opening/closing section 40 and the rear opening/closing section 41 to cover the through holes 40b and 41b. Therefore, the surface area of the disposable filter 15 is increased, thereby allowing the life of the disposable filter 15 to be extended.

Eighth Embodiment

Figure 53:
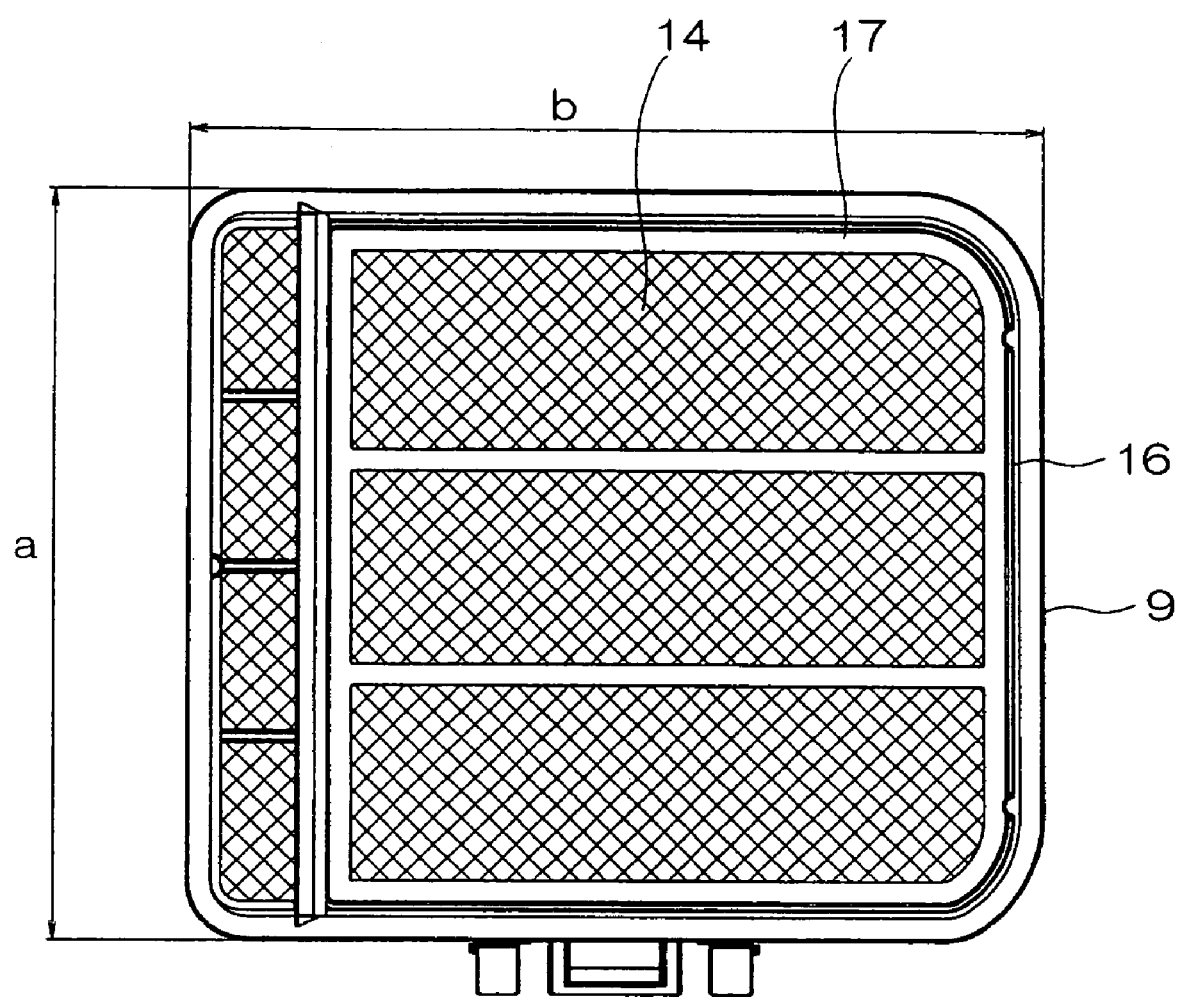
FIG. 53 is a plan view of an opening/closing section in a dust collecting section in an electric vacuum cleaner according to an eighth embodiment of the present invention, showing a state as viewed from its mounting surface.

FIG. 53 illustrates an eighth embodiment of the present invention. The same constituent elements as those in the first to seventh embodiments are assigned the same reference numerals and hence, the description thereof is not repeated.

In the eighth embodiment, the shape of a mounting surface 17 of an opening/closing section 9 is formed into a horizontally long rectangle (a<b). Generally used as a disposable filter 15 is a tissue. Generally, the dimensions of the tissue are 200 to 210 mm in length by 220 to 230 mm in breadth. Therefore, the dimensions of the mounting surface 17 are (a) 160 to 180 mm in length by (b) 180 to 200 mm in breadth which are smaller by approximately 10 to 40 mm than the tissue. As a result, the tissue can be relatively easily mounted on the mounting surface 17.

Ninth Embodiment

Figure 54:
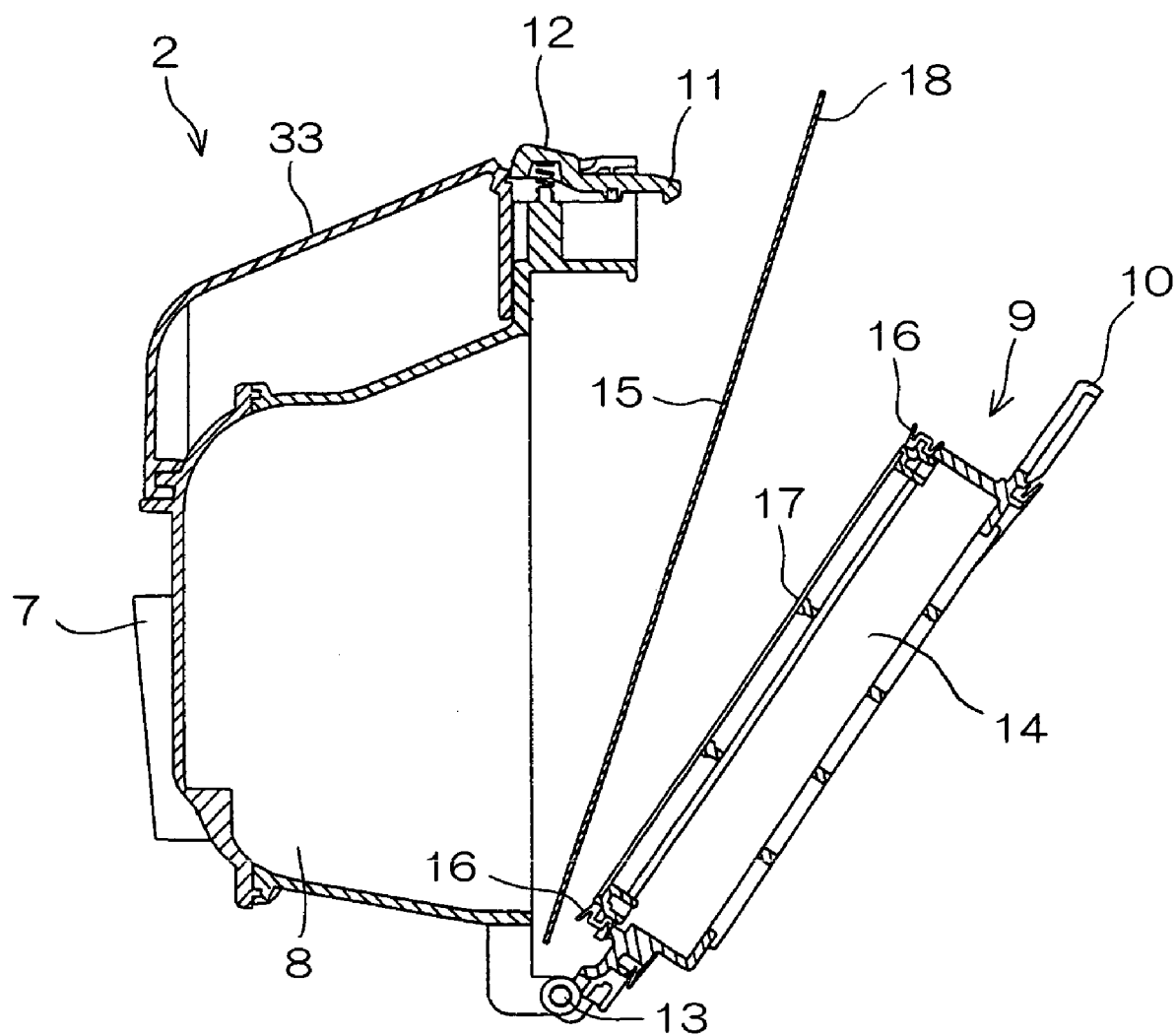
FIG. 54 is a cross-sectional view of a dust collecting section in an electric vacuum cleaner according to a ninth embodiment of the present invention, showing an expanded state.
Figure 55:
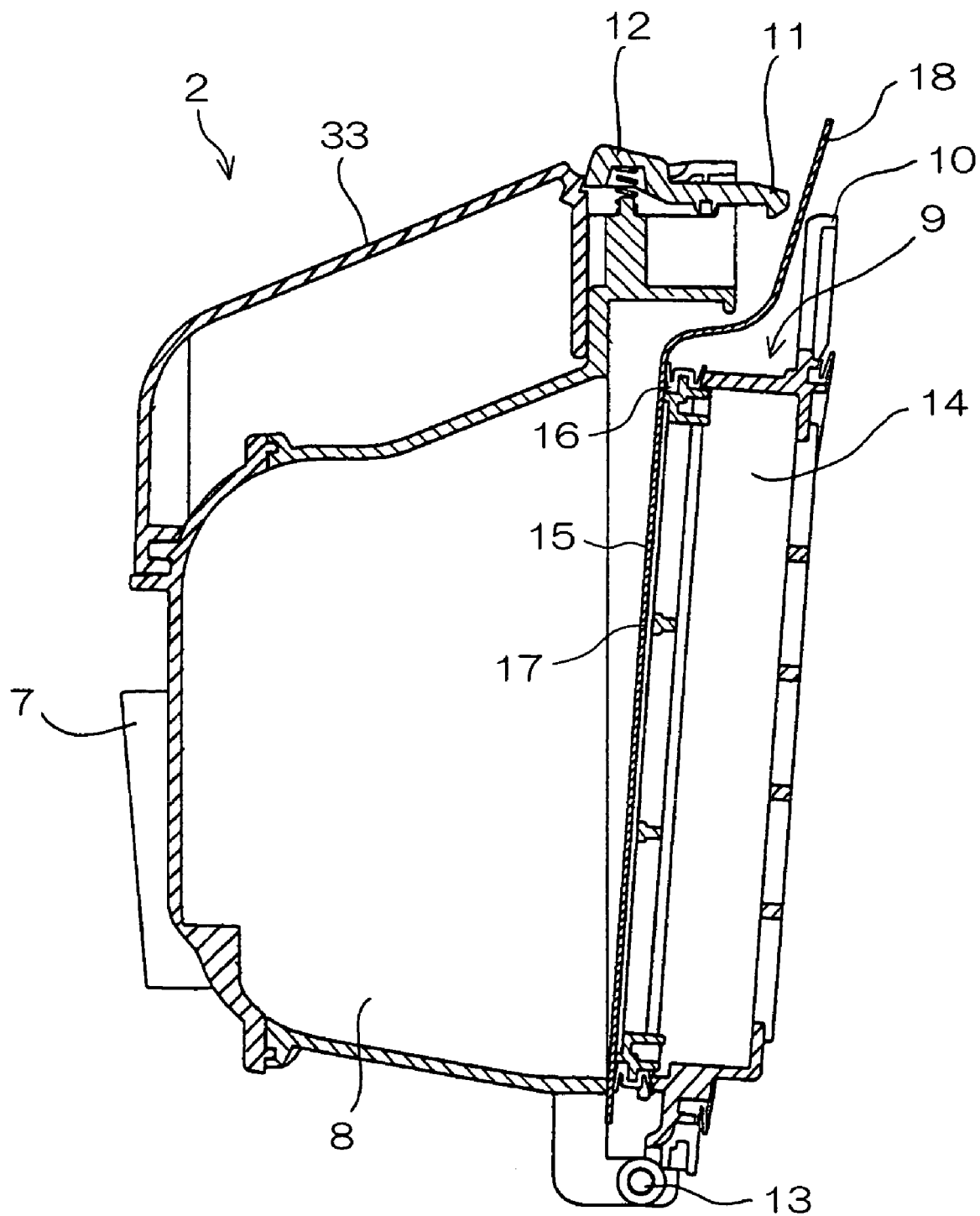
FIG. 55 is a cross-sectional view of the dust collecting section in the electric vacuum cleaner, showing an expanded state.
Figure 56:
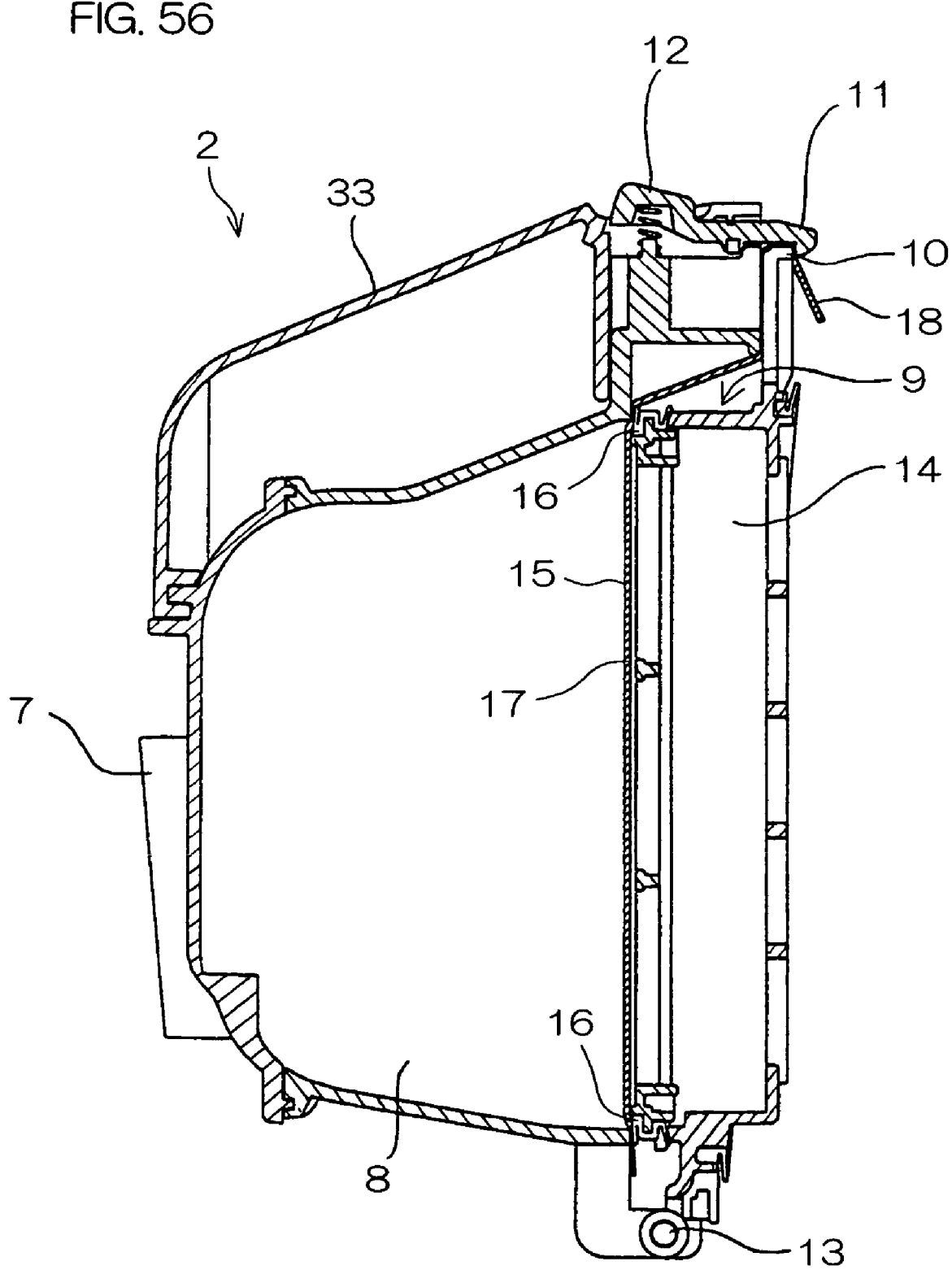
FIG. 56 is a cross-sectional view of the dust collecting section in the electric vacuum cleaner.

FIGS. 54 to 56 illustrate a ninth embodiment of the present invention. The same constituent elements as those in the first to eighth embodiments are assigned the same reference numerals and hence, the description thereof is not repeated.

In the ninth embodiment, a locking section 11 for holding an opening/closing section 9 in a closed state is in such a shape as to lock the opening/closing section 9 such that the opening/closing section 9 is held from its outer periphery (see FIG. 56).

This configuration allows the opening/closing section 9 to be locked by the locking section 11 while deforming a disposable filter 15 along the opening/closing section 9 because the locking section 11 does not pierce into the disposable filter 15 even when a peripheral edge 18 of the disposable filter 15 held between the opening/closing section 9 and a dust collecting chamber 8 is opposed to the locking section 11. Therefore, the disposable filter 15 can be prevented from being damaged. When dust in the dust collecting chamber 8 is thrown away, the engagement of the locking section 11 that has pieced into the disposable filter 15 need not be removed, thereby allowing the discarding workability of the disposable filter 15 to be improved.

Tenth Embodiment

Figure 57:
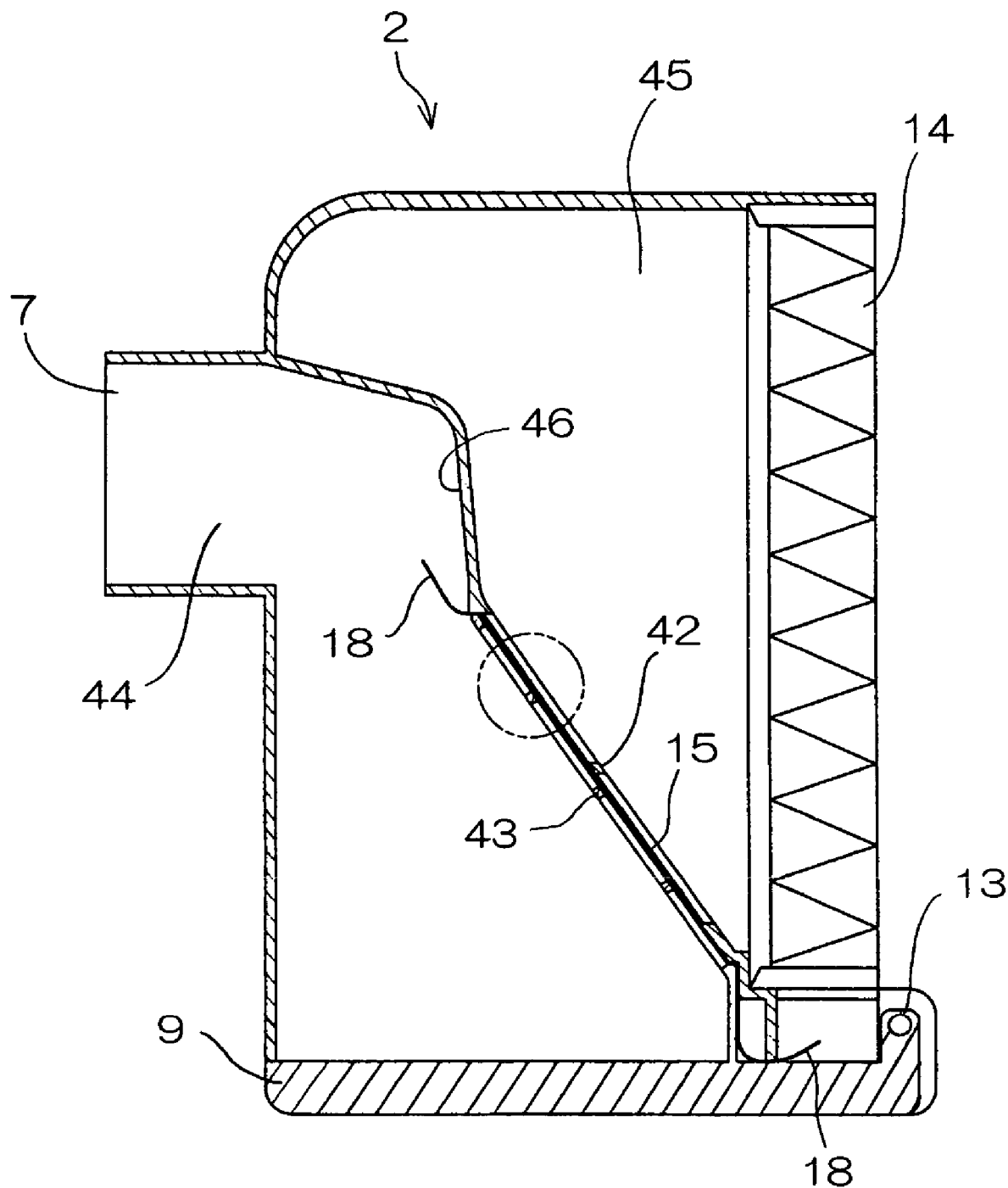
FIG. 57 is a cross-sectional view of a dust collecting section in an electric vacuum cleaner according to a tenth embodiment of the present invention.
Figure 58:
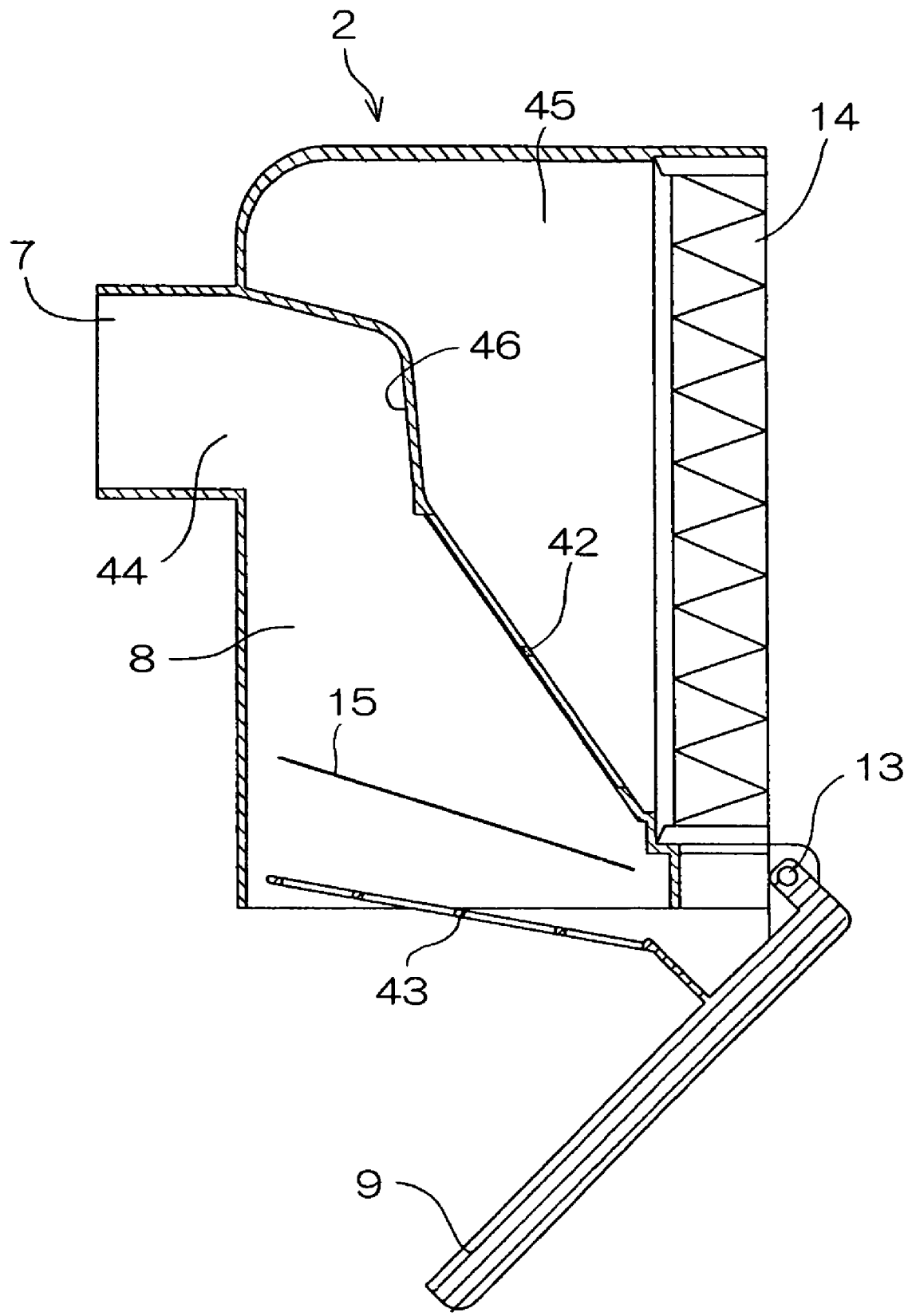
FIG. 58 is a cross-sectional view of the dust collecting section in the electric vacuum cleaner, showing a state where an opening/closing section is opened.
Figure 59:
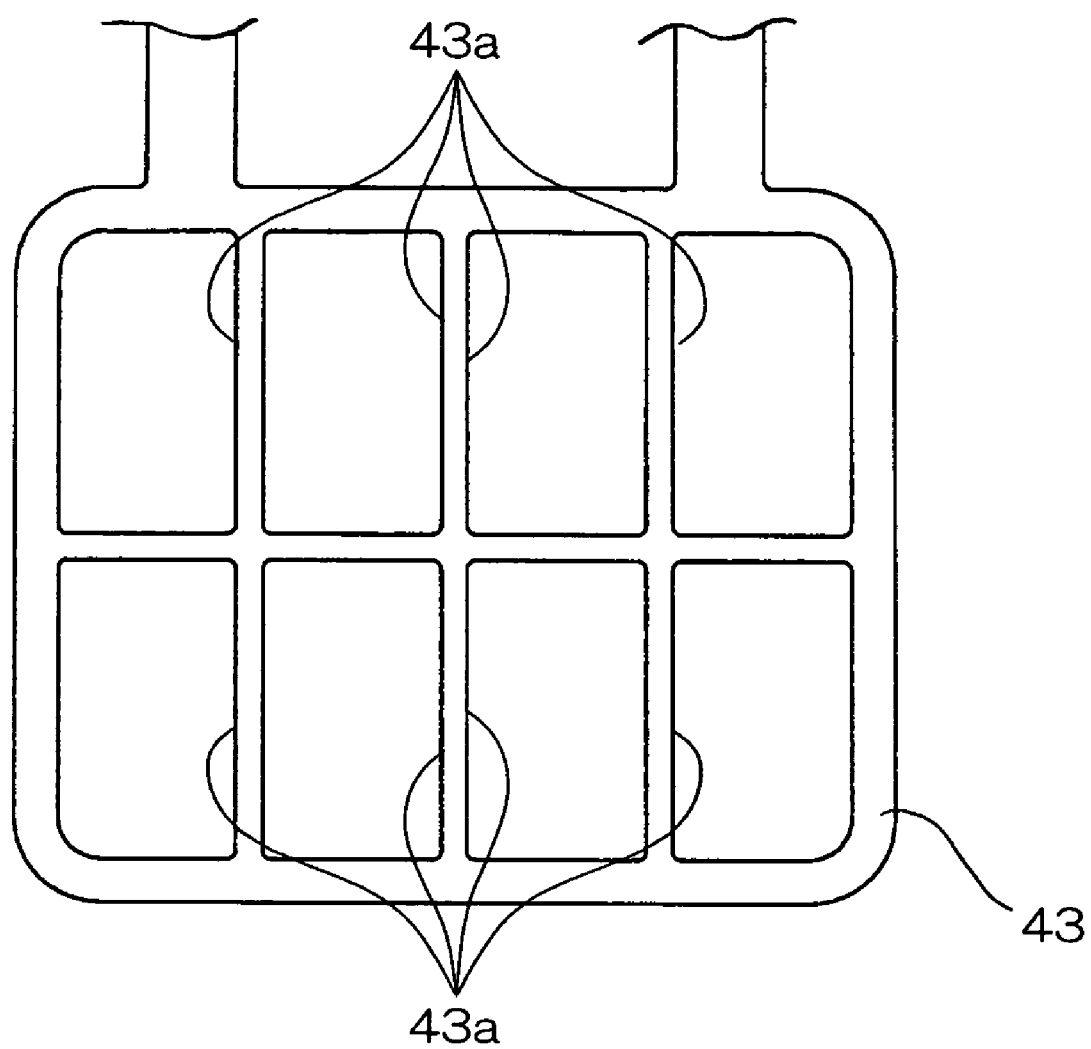
FIG. 59 is a plan view of a filter frame in the dust collecting section in the electric vacuum cleaner.

FIGS. 57 to 59 illustrate a tenth embodiment of the present invention. The same constituent elements as those in the first to ninth embodiments are assigned the same reference numerals and hence, the description thereof is not repeated.

Although in the first to ninth embodiments, the filter 14 is arranged so as to be opposed to the opening/closing section 9 rotatably held by the rotating shaft 13, a filter 14 is arranged at a position that is not opposed to an opening/closing section 9 in the tenth embodiment.

A space between a suction port 7 in a dust collecting section 2 and the filter 14 is partitioned by a partitioning wall 42 having an opening. The opening/closing section 9 is rotatably held around a rotating shaft 13, and a filter frame 43 is mounted on its surface on the side of its dust collecting chamber 8. The filter frame 43 is formed with a plurality of through holes 43a (see FIG. 59). An outlet of the dust collecting section 2 is formed at a position different from a portion opened and closed by the opening/closing section 9, and the filter 14 is arranged in the outlet.

The filter frame 43 comes close to the partitioning wall 42 when the opening/closing section 9 maintains the dust collecting chamber 8 in a closed state. A space between the suction port 7 and the partitioning wall 42 constitutes a first dust collecting chamber 44 for removing large dust by applying air sucked from the suction port 7 to a collision wall 46 opposed to the suction port 7. A space between the partitioning wall 42 and the filter 14 constitutes a second dust collecting chamber 45 for removing fine dust that has passed through the first dust collecting chamber 44 by the filter 14. A disposable filter 15 can be held between the partitioning wall 42 and the filter frame 40.

Since the dust collecting section 2 in the tenth embodiment is thus configured, relatively large dust is removed from air which is sucked from the suction port 7, in the first dust collecting chamber 44, and the removed dust is deposited on the opening/closing section 9. The air which has flowed into the second dust collecting chamber 45 through the disposable filter 15 and the partitioning wall 42 is exhausted outward from the dust collecting section 2 after fine dust is removed therefrom by the filter 14.

Since the dust included in the air flowing into the second dust collecting chamber 45 can be removed by the disposable filter 15, a load on the filter 14 is reduced, thereby allowing the life of the filter 14 to be extended. The disposable filter 15 can be easily discarded when the opening/closing section 9 is opened, thereby allowing the discarding workability of the disposable filter 15 to be improved. The filter frame 43 has the effect of sweeping out the dust within the first dust collecting chamber 44 because it is moved from the inside of the first dust collecting chamber 44 to the outside of the first dust collecting chamber 44 as the opening/closing section 9 is opened, thereby allowing the discarding workability of the dust to be improved.

Although the present invention has been described and illustrated in detail, it is completely understood that the same is by way of illustration and example only and is not to be taken by way of limitation, the spirit and scope of the present invention being limited only by the terms of the appended claims.

The disclosure of Japanese patent application Serial No. 2004-137057, filed on May 6, 2004, is incorporated herein by reference.

What is claimed is:

1. An electric vacuum cleaner, comprising:
a dust collection section, for removing dust, mounted in a main body of the vacuum cleaner;
an electric air blower mounted on a downstream side of the dust collection section in the main body;
an opening/closing section that is opened and closed when the dust deposited in the dust collecting section is discarded, and the opening/closing section is rotatable around a rotation shaft, and the rotation shaft is arranged at a position spaced apart from an outer peripheral surface of the dust collecting section;
a filter which is disposed in the opening/closing section for removing dust from air sucked into the dust collecting section; and
a disposable filter which is positioned on the upstream side of the filter, and which is mounted in a state where it is held by the opening/closing section.

2. The electric vacuum cleaner according to claim 1, further comprising:
   a locking section arranged to hold the opening/closing section in a closed state; and
   an operation section for operating the locking section.

3. The electric vacuum cleaner according to claim 2, wherein
   the disposable filter is mounted at a predetermined position by positioning means.

4. The electric vacuum cleaner according to claim 2, wherein
   the disposable filter has two layers.

5. The electric vacuum cleaner according to claim 4, wherein
   the first of said two layers is coarser than the second of said two layers.

6. The electric vacuum cleaner according to claim 4, wherein the disposable filter is formed in a bag shape.

7. The electric vacuum cleaner according to claim 4, wherein
   a forward/backward directionality of the disposable filter is regulated by positioning means.

8. The electric vacuum cleaner according to claim 2, wherein
   the disposable filter extends outwardly from the opening/closing section is protected by being covered with a protection section formed in the dust collecting section.

9. The electric vacuum cleaner according to claim 2, wherein
   the disposable filter extends outwardly from the opening/closing section is fixed by a frame formed in the dust collecting section.

10. The electric vacuum cleaner according to claim 2, wherein
    the disposable filter extends outwardly from the opening/closing section can be cut by the opening/closing section.

11. The electric vacuum cleaner according to claim 2, wherein
    the disposable filter is formed in a pleated shape when it is held by the opening/closing section.

* * * * *